US009410057B2

(12) United States Patent
Wood et al.

(10) Patent No.: US 9,410,057 B2
(45) Date of Patent: Aug. 9, 2016

(54) COATED CARBON FIBER REINFORCED PLASTIC PARTS

(71) Applicant: BASF SE, Ludwigshafen (DE)

(72) Inventors: Mervin Gale Wood, Maysville, KY (US); Don Barber, White Lake, MI (US); Syed Hasan, Mason, OH (US); Adalbert Braig, Binzen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/438,719

(22) PCT Filed: Mar. 31, 2014

(86) PCT No.: PCT/US2014/032356
§ 371 (c)(1),
(2) Date: Apr. 27, 2015

(87) PCT Pub. No.: WO2014/165434
PCT Pub. Date: Oct. 9, 2014

(65) Prior Publication Data
US 2016/0009952 A1    Jan. 14, 2016

Related U.S. Application Data
(60) Provisional application No. 61/898,156, filed on Oct. 31, 2013, provisional application No. 61/807,537, filed on Apr. 2, 2013.

(51) Int. Cl.
| | | |
|---|---|---|
| *C08G 64/00* | (2006.01) | |
| *C09D 175/06* | (2006.01) | |
| *C09D 5/03* | (2006.01) | |
| *C09D 7/12* | (2006.01) | |
| *C09D 133/14* | (2006.01) | |
| *C08G 63/02* | (2006.01) | |
| *C08K 5/00* | (2006.01) | |
| *C08K 5/3475* | (2006.01) | |

(52) U.S. Cl.
CPC ............. *C09D 175/06* (2013.01); *C09D 5/036* (2013.01); *C09D 7/1241* (2013.01); *C09D 133/14* (2013.01); *C08K 5/005* (2013.01); *C08K 5/3475* (2013.01)

(58) Field of Classification Search
CPC ............................ C07F 7/0879; C07D 249/20
USPC ........................ 528/196, 198; 548/259, 260
See application file for complete search history.

(56) References Cited

U.S. PATENT DOCUMENTS

| | | | |
|---|---|---|---|
| 6,344,505 B1 | 2/2002 | Valentine et al. | |
| 7,695,643 B2 * | 4/2010 | Fritzsche | C08K 5/3475 252/399 |
| 2002/0058812 A1 * | 5/2002 | Grubbs | C08G 61/06 546/2 |
| 2003/0165685 A1 * | 9/2003 | Conn | B32B 27/36 428/412 |
| 2004/0013619 A1 | 1/2004 | Reinehr et al. | |
| 2008/0157025 A1 | 7/2008 | Fritzsche et al. | |
| 2009/0317629 A1 * | 12/2009 | Wegner | C09D 4/00 428/336 |
| 2010/0233146 A1 * | 9/2010 | McDaniel | A01N 63/02 424/94.2 |
| 2011/0038816 A1 | 2/2011 | Chang et al. | |

OTHER PUBLICATIONS

International Search Report/written opinion dated Oct. 20, 2014.
Tinuvin CarboProtect, Industrial Coatings Technical Data Sheet, Oct. 2011, Rev 3, pp. 1-3.

* cited by examiner

*Primary Examiner* — Terressa Boykin
(74) *Attorney, Agent, or Firm* — Foley & Lardner LLP

(57) ABSTRACT

Carbon fiber reinforced plastic parts are advantageously coated with powder coating formulations comprising certain red-shifted hydroxyphenylbenzotriazole ultraviolet light absorbers (UVAs). The benzotriazole UVAs are of formulae (I) or (II) The coated carbon fiber reinforced plastic parts are suitable in aerospace applications, automotive parts and sporting goods.

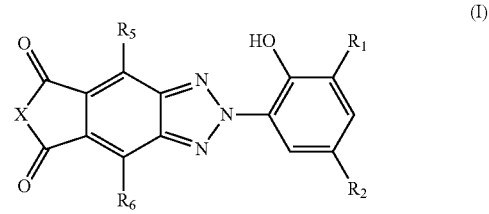

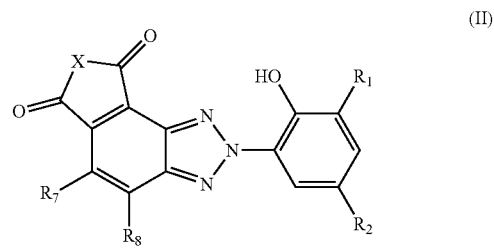

17 Claims, No Drawings

COATED CARBON FIBER REINFORCED PLASTIC PARTS

The present invention relates to carbon fiber reinforced plastic parts coated with a powder coating composition. The powder coating composition contains a red-shifted hydroxyphenylbenzotriazole ultraviolet light absorber (UVA).

Surprisingly, it has been found that certain red-shifted hydroxyphenylbenzotriazole UV absorbers are especially effective towards protecting carbon fiber reinforced plastic parts.

Accordingly, disclosed is a composition comprising a carbon fiber reinforced plastic part and a coating layer in adherence thereto, wherein the coating layer is a cured powder coating formulation comprising
a) a powder coating resin,
b) a red-shifted hydroxyphenylbenzotriazole ultraviolet light absorber,
c) a hindered amine light stabilizer and optionally
d) a compound selected from the group consisting of further ultraviolet light absorbers, phenolic antioxidants and organic or inorganic pigments.

The term "a" in components a)-d) can mean "one" or "one or more".

The red-shifted hydroxyphenylbenzotriazoles are of formulae (I) or (II)

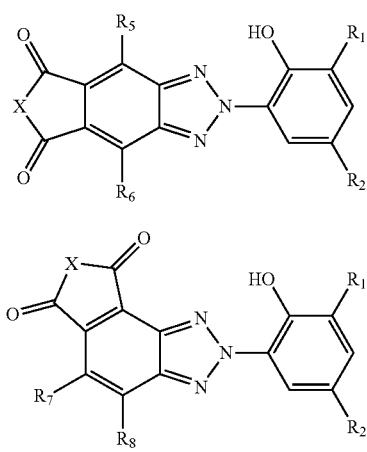

wherein
$R_1$ is hydrogen, straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms; or
$R_1$ is a group

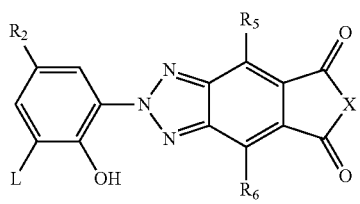

or a group

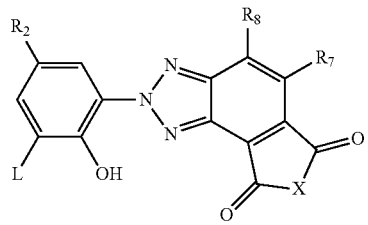

wherein L is alkylene of 1 to 12 carbon atoms, alkylidene of 2 to 12 carbon atoms, benzylidene, p-xylylene or cycloalkylene of 5 to 7 carbon atoms;
$R_2$ is straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or
said alkyl substituted by one or more —OH, —OCO—$R_{11}$, —$OR_{14}$, —NCO or —$NH_2$ groups or mixtures thereof, or
said alkyl or said alkenyl interrupted by one or more —O—, —NH— or —$NR_{14}$— groups or mixtures thereof and which can be unsubstituted or substituted by one or more —OH, —$OR_{14}$ or —$NH_2$ groups or mixtures thereof; where
$R_{11}$ is hydrogen, straight or branched chain $C_1$-$C_{18}$alkyl, $C_5$-$C_{12}$cycloalkyl, straight or branched chain $C_3$-$C_8$alkenyl, phenyl, naphthyl or $C_7$-$C_{15}$phenylalkyl; and
$R_{14}$ is hydrogen, straight or branched chain alkyl of 1 to 24 carbon atoms; or
$R_2$ is —$OR_{14}$, a group —C(O)—O—$R_{14}$, —C(O)—$NHR_{14}$ or —C(O)—$NR_{14}R'_{14}$ wherein $R'_{14}$ has the same meaning as $R_{14}$; or
$R_2$ is —$SR_{13}$, —$NHR_{13}$ or —$N(R_{13})_2$; or
$R_2$ is —$(CH_2)_m$—CO—$X_1$—$(Z)_p$—Y—$R_{15}$ wherein
$X_1$ is —O— or —$N(R_{16})$—,
Y is —O— or —$N(R_{17})$— or a direct bond,
Z is $C_2$-$C_{12}$-alkylene, $C_4$-$C_{12}$alkylene interrupted by one to three nitrogen atoms, oxygen atoms or a mixture thereof, or is $C_3$-$C_{12}$alkylene, butenylene, butynylene, cyclohexylene or phenylene, each of which may be additionally substituted by a hydroxyl group;
or a group

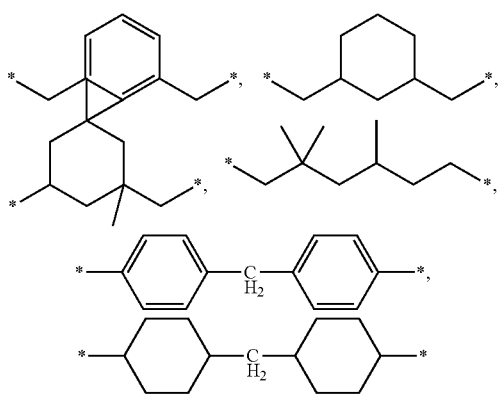

wherein * denotes a bond; or
when Y is a direct bond, Z can additionally also be a direct bond;
m is zero, 1 or 2, p is 1, or p is also zero when X and Y are —N($R_{16}$)— and —N($R_{17}$)—, respectively, $R_{15}$ is hydrogen, $C_1$-$C_{12}$alkyl, a group

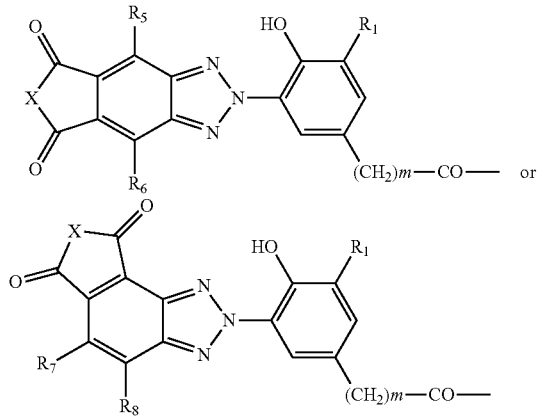

or a group —CO—C($R_{18}$)=C(H)$R_{19}$ or, when Y is —N($R_{17}$)—, forms together with $R_{17}$ a group —CO—CH=CH—CO— wherein $R_{18}$ is hydrogen or methyl and $R_{19}$ is hydrogen, methyl or —CO—$X_1$—$R_{20}$, wherein $R_{20}$ is hydrogen, $C_1$-$C_{12}$alkyl or a group of formulae

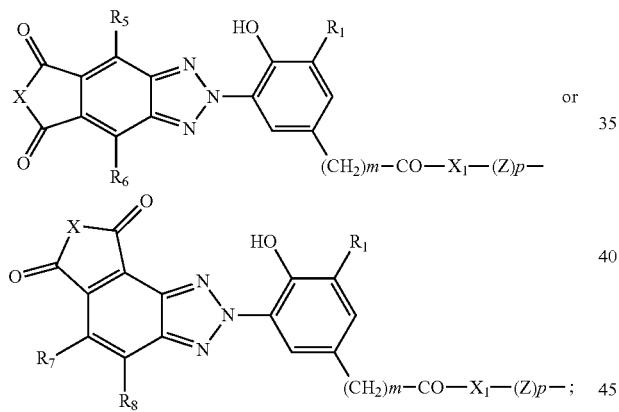

$R_5$, $R_6$, $R_7$ and $R_8$ are independently hydrogen, halogen, CN, $NO_2$ or $NH_2$;

$R_{13}$ is alkyl of 1 to 20 carbon atoms, hydroxyalkyl of 2 to 20 carbon atoms, alkenyl of 3 to 18 carbon atoms, cycloalkyl of 5 to 12 carbon atoms, phenylalkyl of 7 to 15 carbon atoms, phenyl or naphthyl, which both may be substituted by one or two alkyl of 1 to 4 carbon atoms;

$R_{16}$ and $R_{17}$ independently of one another are hydrogen, $C_1$-$C_{12}$-alkyl, $C_3$-$C_{12}$-alkyl interrupted by 1 to 3 oxygen atoms, or is cyclohexyl or $C_7$-$C_{15}$phenylalkyl and $R_{16}$ together with $R_{17}$ in the case where Z is ethylene, also forms ethylene;

X is O or $NE_1$ wherein $E_1$ is hydrogen, straight or branched chain $C_1$-$C_{24}$alkyl, straight or branched chain $C_2$-$C_{18}$alkenyl, $C_2$-$C_6$alkyinyl, $C_5$-$C_{12}$cycloalkyl, phenyl, naphthyl or $C_7$-$C_{15}$phenylalkyl; or said straight or branched chain $C_1$-$C_{24}$ alkyl, straight or branched chain $C_2$-$C_{24}$ alkenyl, $C_5$-$C_{12}$ cycloalkyl, $C_2$-$C_6$ alkinyl can be substituted by one or more —F, —OH, —$OR_{22}$, —$NH_2$, —$NHR_{22}$, —N($R_{22}$)$_2$, —$NHCOR_{23}$, —$NR_{22}COR_{23}$, —$OCOR_{24}$, —$COR_{25}$, —$SO_2R_{26}$, —PO($R_{27}$)$_n$($R_{28}$)$_{2-n}$, —Si($R_{29}$)$_n$($R_{30}$)$_{3-n}$, —Si($R_{22}$)$_3$, —$N^+$($R_{22}$)$_3A^-$, —$S^+$($R_{22}$)$_2A^-$, -oxiranyl groups or mixtures thereof; said straight or branched chain $C_1$-$C_{24}$ alkyl, straight or branched chain unsubstituted or substituted $C_2$-$C_{24}$ alkenyl, $C_5$-$C_{12}$ cycloalkyl or $C_2$-$C_6$ alkinyl can also be interrupted by one or more —O—, —S—, —NH— or —$NR_{22}$— groups or combinations thereof;

said phenyl, naphthyl or $C_7$-$C_{15}$phenylalkyl can also be substituted by one or more halogen, —CN, —$CF_3$, —$NO_2$, —$NHR_{22}$, —N($R_{22}$)$_2$, —$SO_2R_{26}$, —PO($R_{27}$)$_n$($R_{28}$)$_{2-n}$, —OH, —$OR_{22}$, —$COR_{25}$, —$R_{25}$; wherein n is 0, 1 or 2;

$R_{22}$ is straight or branched chain $C_1$-$C_{18}$ alkyl, straight or branched chain $C_2$-$C_{18}$ alkenyl, $C_5$-$C_{10}$ cycloalkyl, phenyl or naphthyl, $C_7$-$C_{15}$ phenylalkyl, or two $R_{22}$ when attached to an N or Si atom can form together with the atom to which they are bonded a pyrrolidine, piperidine or morpholine ring;

$R_{23}$ is hydrogen, $OR_{22}$, $NHR_{22}$, N($R_{22}$)$_2$ or has the same meaning as $R_{22}$, $R_{24}$ is $OR_{22}$, $NHR_{22}$, N($R_{22}$)$_2$ or has the same meaning as $R_{22}$, $R_{25}$ is hydrogen, OH, $OR_{22}$, $NHR_{22}$ or N($R_{22}$)$_2$, O-glycidyl or has the same meaning as $R_{22}$, $R_{26}$ is OH, $OR_{22}$, $NHR_{22}$ or N($R_{22}$)$_2$, $R_{27}$ is $NH_2$, $NHR_{22}$ or N($R_{22}$)$_2$, $R_{28}$ is OH or $OR_{22}$, $R_{29}$ is Cl or $OR_{22}$, $R_{30}$ is straight or branched chain $C_1$-$C_{18}$ alkyl; or $E_1$ is a group

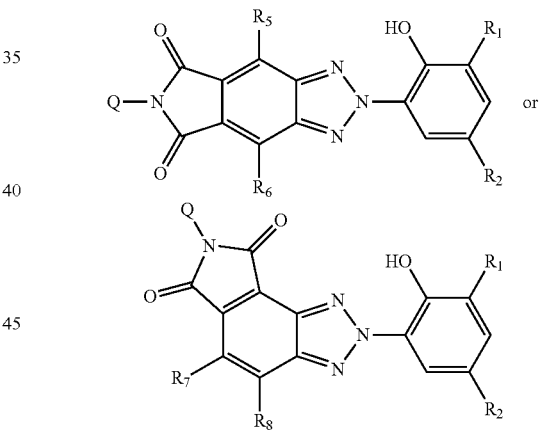

wherein $R_1$ to $R_8$ have the meanings as defined above and

Q is straight or branched $C_2$-$C_{12}$alkylene, $C_2$-$C_{12}$alkylene, which is interrupted by one or more —O—, NH or $NR_{14}$ atoms, $C_5$-$C_{10}$cycloalkylene, para-phenylene or a group

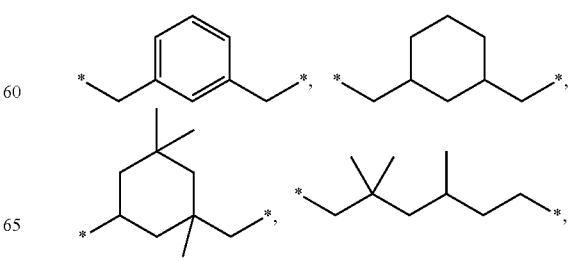

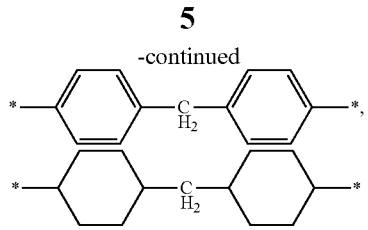

wherein * denotes a bond.

Halogen is, for example, fluorine, chlorine, bromine or iodine. Chlorine is preferred.

When any of the substituents are straight or branched chain alkyl of 1 to 24 carbon atoms, such groups are, for example, methyl, ethyl, isopropyl, n-butyl, isobutyl, sec-butyl, tert-butyl, tert-amyl, 2-ethylhexyl, tert-octyl, lauryl, tert-dodecyl, tridecyl, n-hexadecyl, n-octadecyl or eicosyl.

When any of said substituents are straight or branched chain alkenyl of 2 to 18 carbon atoms, such groups are, for example, allyl, pentenyl, hexenyl, doceneyl or oleyl.

Preference is given to alkenyl having from 3 to 16, especially from 3 to 12, for example from 2 to 6, carbon atoms.

When any of said substituents are cycloalkyl of 5 to 12 carbon atoms, such groups are, for example, cyclopentyl, cyclohexyl, cycloheptyl, cyclooctyl and cyclododecyl. $C_1$-$C_4$alkyl-substituted $C_5$-$C_8$cycloalkyl is, for example, methylcyclopentyl, dimethylcyclopentyl, methylcyclohexyl, dimethylcyclohexyl, trimethylcyclohexyl or tert-butylcyclohexyl.

When any of said radicals are phenylalkyl of 7 to 15 carbon atoms, such groups are, for example, benzyl, phenethyl, α-methylbenzyl or α,α-dimethylbenzyl.

When phenyl is substituted by alkyl, this is, for example, tolyl and xylyl.

Alkyl substituted by one or more —O— groups and/or substituted by one or more —OH can, for example, be —(OCH$_2$CH$_2$)$_w$OH or —(OCH$_2$CH$_2$)$_w$O(C$_1$-C$_{24}$alkyl) where w is 1 to 12.

Alkyl interrupted by one or more —O— can be derived from ethyleneoxide units or from propyleneoxide units or from mixtures of both.

When alkyl is interrupted by —NH— or —NR$_{14}$— the radicals are derived in analogy to the above —O— interrupted radicals. Preferred are repeating units of ethylenediamine.

Examples are CH$_3$—O—CH$_2$CH$_2$—, CH$_3$—NH—CH$_2$CH$_2$—, CH$_3$—N(CH$_3$)—CH$_2$—, CH$_3$—O—CH$_2$CH$_2$—O—CH$_2$CH$_2$—, CH$_3$—(O—CH$_2$CH$_2$—)$_2$O—CH$_2$CH$_2$—, CH$_3$—(O—CH$_2$CH$_2$—)$_3$O—CH$_2$CH$_2$— or CH$_3$—(O—CH$_2$CH$_2$—)$_4$O—CH$_2$CH$_2$—.

Alkylene is, for example, ethylene, tetramethylene, hexamethylene, 2-methyl-1,4-tetramethylene, hexamethylene, octamethylene, decamethylene and dodecamethylene.

Cycloalkylene is, for example, cyclopentylene, cyclohexylene, cycloheptylene, cyclooctylene and cyclododecylene. Preference is given to cyclohexylene.

Alkylene interrupted by oxygen, NH or —NR$_{14}$— is, for example, —CH$_2$CH$_2$—O—CH$_2$CH$_2$—, —CH$_2$CH$_2$—NH—CH$_2$CH$_2$—, —CH$_2$CH$_2$—N(CH$_3$)—CH$_2$CH$_2$—, —CH$_2$CH$_2$—O—CH$_2$CH$_2$—O—CH$_2$CH$_2$—, —CH$_2$CH$_2$—(O—CH$_2$CH$_2$—)$_2$O—CH$_2$CH$_2$—, —CH$_2$CH$_2$—(O—CH$_2$CH$_2$—)$_3$O—CH$_2$CH$_2$—, —CH$_2$CH$_2$—(O—CH$_2$CH$_2$—)$_4$O—CH$_2$CH$_2$— or —CH$_2$CH$_2$—NH—CH$_2$CH$_2$—.

The radical Q is straight or branched $C_1$-$C_{12}$alkylene, $C_5$-$C_{10}$cycloalkylene, para-phenylene or a group

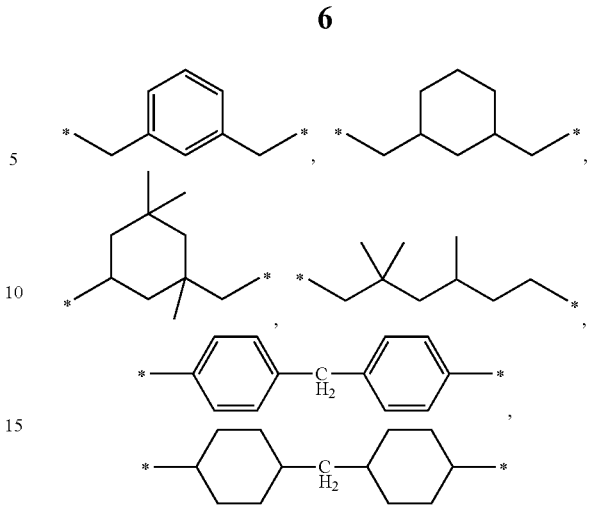

wherein * denotes a bond.

The radical can be derived from readily available diamines, for example, so called Jeffamines. Examples for diamines are ethylenediamine, propylenediamine, 2-methyl-1,5-pentamethylendiamine, isophorondiamine or 1,2-diaminocyclohexane.

In analogy the radical Z can also be derived from the same available diamines or from the corresponding diols.

Typical Jeffamines are, for example D-2000

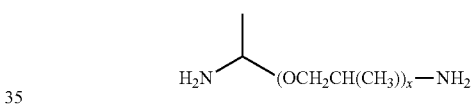

wherein x is 33.1 or ED-2003

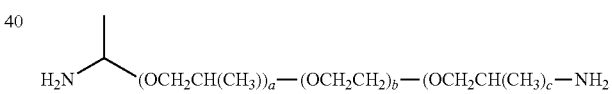

wherein a+c is 5 and b is 39.5.

Preference is given to a compound of formulae (I) or (II) wherein

R$_1$ is hydrogen, straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms; or R$_1$ is a group

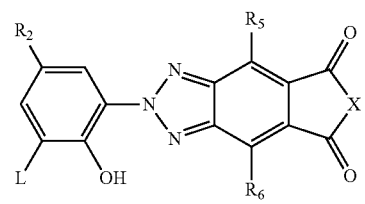

or a group

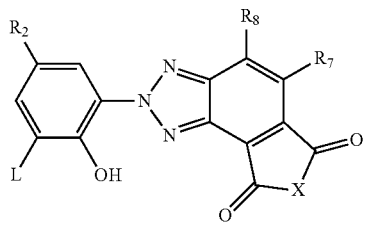

wherein L is alkylene of 1 to 12 carbon atoms, alkylidene of 2 to 12 carbon atoms, benzylidene, p-xylylene or cycloalkylene of 5 to 7 carbon atoms;

$R_2$ is straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or $R_2$ is $-(CH_2)_m-CO-X_1-(Z)_p-Y-R_{15}$ wherein
  $X_1$ is $-O-$,
  Y is $-O-$ or a direct bond,
  Z is $C_2$-$C_{12}$-alkylene, $C_4$-$C_{12}$alkylene interrupted by one to three nitrogen atoms, oxygen atoms or a mixture thereof, or when Y is a direct bond, Z can additionally also be a direct bond;
  m is 2,
  p is 1,
  $R_{15}$ is hydrogen, $C_1$-$C_{12}$alkyl or a group

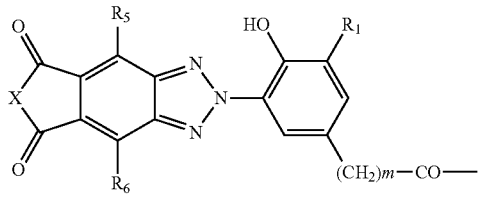

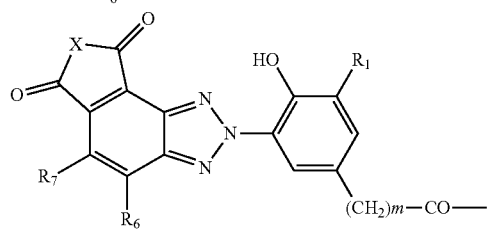

$R_5$, $R_6$, $R_7$ and $R_8$ are independently hydrogen, Cl or Br;
X is O or $NE_1$ wherein
  $E_1$ is hydrogen, straight or branched chain $C_1$-$C_{24}$alkyl, straight or branched chain $C_2$-$C_{18}$alkenyl, $C_2$-$C_6$alkyinyl, $C_5$-$C_{12}$cycloalkyl, phenyl, naphthyl or $C_7$-$C_{15}$phenylalkyl; or said straight or branched chain $C_1$-$C_{24}$ alkyl, straight or branched chain $C_2$-$C_{24}$ alkenyl, $C_5$-$C_{12}$ cycloalkyl, $C_2$-$C_6$ alkinyl can be substituted by one or more $-F$, $-OH$, $-OR_{22}$, $-NH_2$, $-NHR_{22}$, $-N(R_{22})_2$, $-NHCOR_{23}$, $-NR_{22}COR_{23}$, $-OCOR_{24}$, $-COR_{25}$, $-SO_2R_{26}$, $-PO(R_{27})_n(R_{28})_{2-n}$, $-Si(R_{29})_n(R_{30})_{3-n}$, $-Si(R_{22})_3$, $-N^+(R_{22})_3A^-$, $-S^+(R_{22})_2A^-$, -oxiranyl groups or mixtures thereof; said straight or branched chain $C_1$-$C_{24}$ alkyl, straight or branched chain unsubstituted or substituted $C_2$-$C_{24}$ alkenyl, $C_5$-$C_{12}$ cycloalkyl or $C_2$-$C_6$ alkinyl can also be interrupted by one or more $-O-$, $-S-$, $-NH-$ or $-NR_{22}-$ groups or combinations thereof;

said phenyl, naphthyl or $C_7$-$C_{15}$phenylalkyl can also be substituted by one or more halogen, $-CN$, $-CF_3$, $-NO_2$, $-NHR_{22}$, $-N(R_{22})_2$, $-SO_2R_{26}$, $-PO(R_{27})_n(R_{28})_{2-n}$, $-OH$, $-OR_{22}$, $-COR_{25}$, $-R_{25}$; wherein n is 0, 1 or 2;

$R_{22}$ is straight or branched chain $C_1$-$C_{18}$ alkyl, straight or branched chain $C_2$-$C_{18}$ alkenyl, $C_5$-$C_{10}$ cycloalkyl, phenyl or naphthyl, $C_7$-$C_{15}$ phenylalkyl, or two $R_{22}$ when attached to an N or Si atom can form together with the atom to which they are bonded a pyrrolidine, piperidine or morpholine ring;

$R_{23}$ is hydrogen, $OR_{22}$, $NHR_{22}$, $N(R_{22})_2$ or has the same meaning as $R_{22}$, $R_{24}$ is $OR_{22}$, $NHR_{22}$, $N(R_{22})_2$ or has the same meaning as $R_{22}$, $R_{25}$ is hydrogen, OH, $OR_{22}$, $NHR_{22}$ or $N(R_{22})_2$, O-glycidyl or has the same meaning as $R_{22}$, $R_{26}$ is OH, $OR_{22}$, $NHR_{22}$ or $N(R_{22})_2$, $R_{27}$ is $NH_2$, $NHR_{22}$ or $N(R_{22})_2$, $R_{28}$ is OH or $OR_{22}$, $R_{29}$ is Cl or $OR_{22}$, $R_{30}$ is straight or branched chain $C_1$-$C_{18}$ alkyl; or $E_1$ is a group

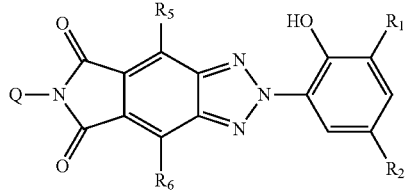

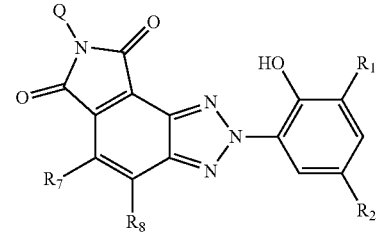

wherein
$R_1$ to $R_8$ have the meanings as defined above and
Q is straight or branched $C_2$-$C_{12}$alkylene, $C_5$-$C_{10}$cycloalkylene or para-phenylene or a group.

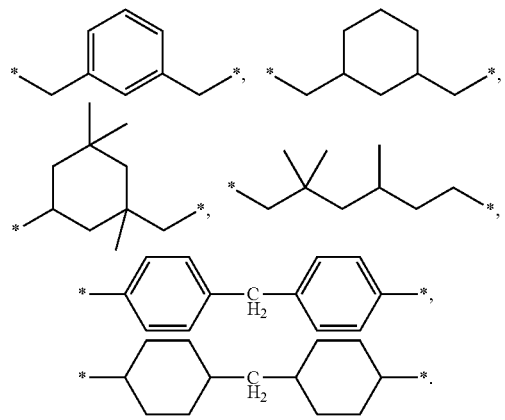

For example, in the compound of formula (I) or (II)

$R_1$ is hydrogen, straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms $R_2$ is straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or $R_2$ is —$(CH_2)_2$—CO—O—(Z)—O—$R_{15}$ wherein Z is $C_2$-$C_{12}$-alkylene, $C_4$-$C_{12}$alkylene interrupted by one to three oxygen atoms;

$R_{15}$ is hydrogen, $C_1$-$C_{12}$alkyl or a group

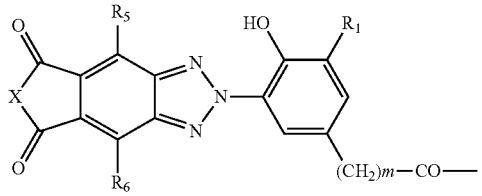

or

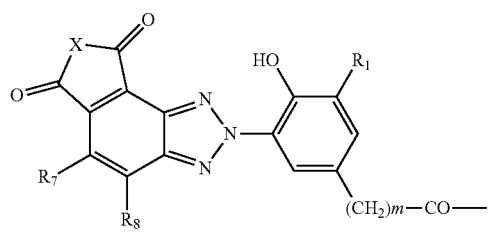

$R_5$, $R_6$, $R_7$ and $R_8$ are independently hydrogen, Cl or Br;

X is O or N$E_1$ wherein $E_1$ is hydrogen, straight or branched chain $C_1$-$C_{24}$alkyl, $C_5$-$C_{12}$cycloalkyl, phenyl or $C_7$-$C_{15}$phenylalkyl; or said straight or branched chain $C_1$-$C_{24}$ alkyl or $C_5$-$C_{12}$ cycloalkyl can be substituted by one or more —F, —OH, —$OR_{22}$, —$NH_2$, —$NHR_{22}$, —$N(R_{22})_2$;

said phenyl or $C_7$-$C_{15}$phenylalkyl can also be substituted by one or more halogen, —CN, —$CF_3$, —OH, —$OR_{22}$, —$COR_{22}$, —$R_{22}$; wherein $R_{22}$ is straight or branched chain $C_1$-$C_{18}$ alkyl, straight or branched chain $C_2$-$C_{18}$ alkenyl, $C_5$-$C_{10}$ cycloalkyl, $C_6$-$C_{16}$ phenyl or naphthyl, $C_7$-$C_{15}$ phenylalkyl; or $E_1$ is a group

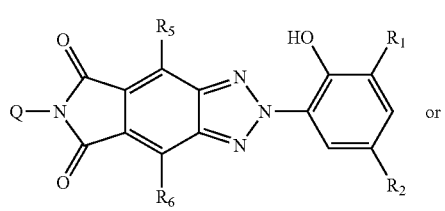

or

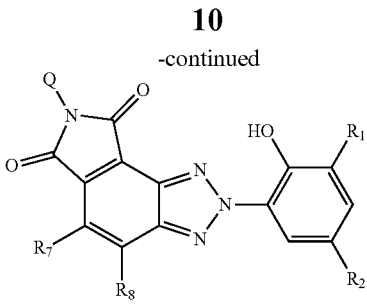

wherein $R_1$ to $R_8$ have the meanings as defined above and

Q is $C_2$-$C_{12}$alkylene, $C_5$-$C_7$cycloalkylene, para-phenylene or a group

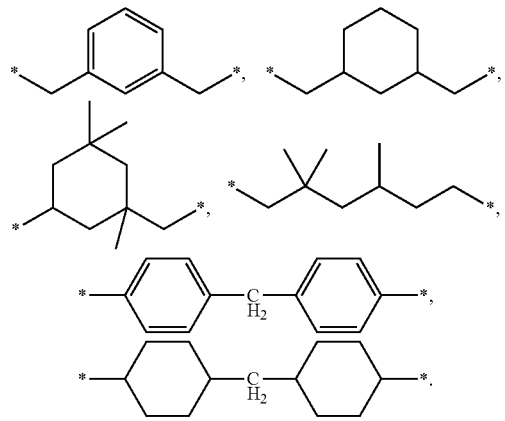

Particular preference is given to a compound of formula (I) or (II) wherein $R_1$ is hydrogen, straight or branched chain alkyl of 1 to 12 carbon atoms or phenylalkyl of 7 to 15 carbon atoms;

$R_2$ is straight or branched chain alkyl of 1 to 12 carbon atoms or phenylalkyl of 7 to 15 carbon atoms, phenyl, or said phenyl or said phenylalkyl substituted on the phenyl ring by 1 to 3 alkyl of 1 to 4 carbon atoms;

$R_5$ and $R_6$ are hydrogen or one of both is Cl or Br;

$R_7$ and $R_8$ are independently hydrogen, Cl or Br;

X is O or N$E_1$ wherein $E_1$ is hydrogen, straight or branched chain $C_1$-$C_6$alkyl, which is unsubstituted or substituted by 1 to 4 OH, phenyl which is unsubstituted or substituted by F, $CF_3$, CN or Cl, or $C_7$-$C_9$phenylalkyl.

A compound of formula (I) is in general preferred.

Individual useful compounds are for example selected from the group consisting of UVA1-UVA12

UVA1

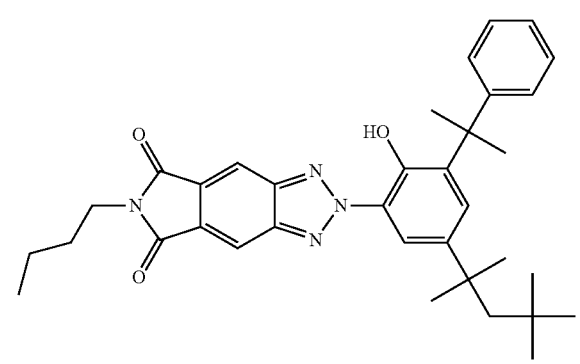

UVA2 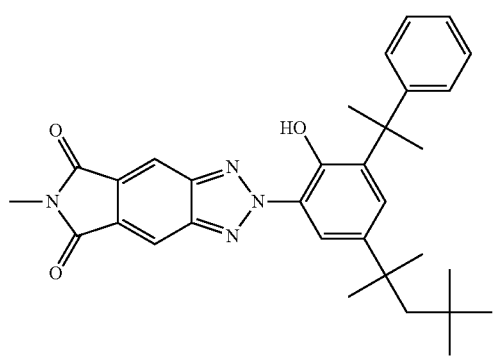
UVA3 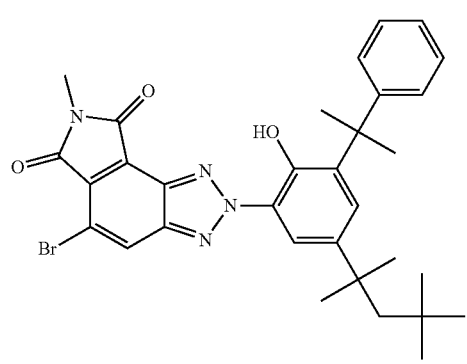
UVA4 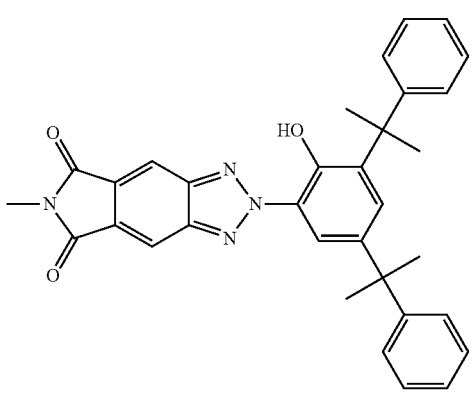
UVA5 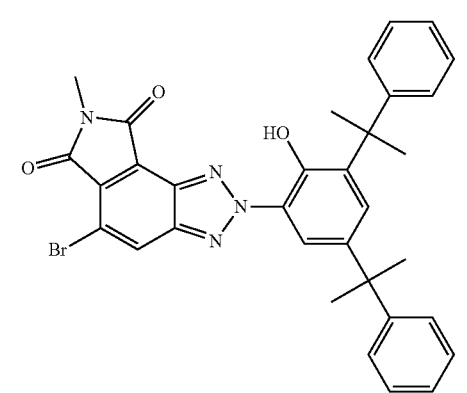
UVA6 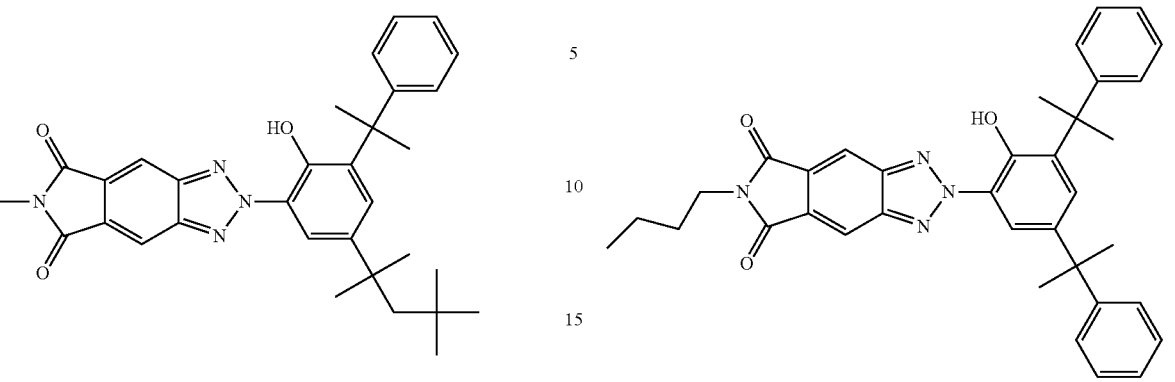
UVA7 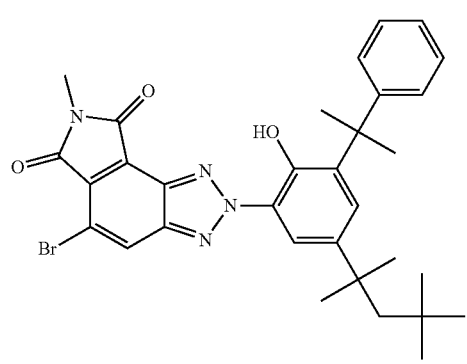
UVA8 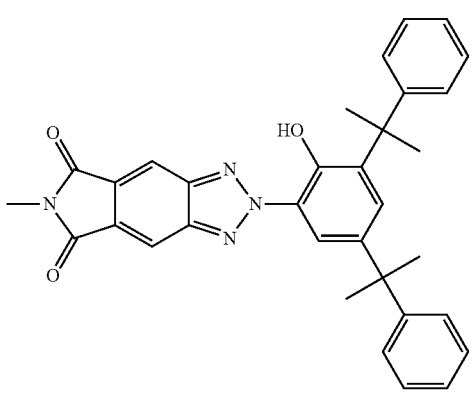
UVA9 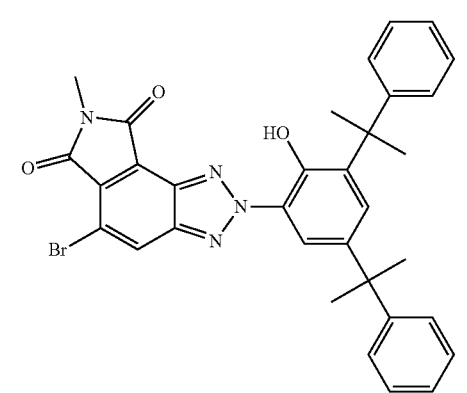

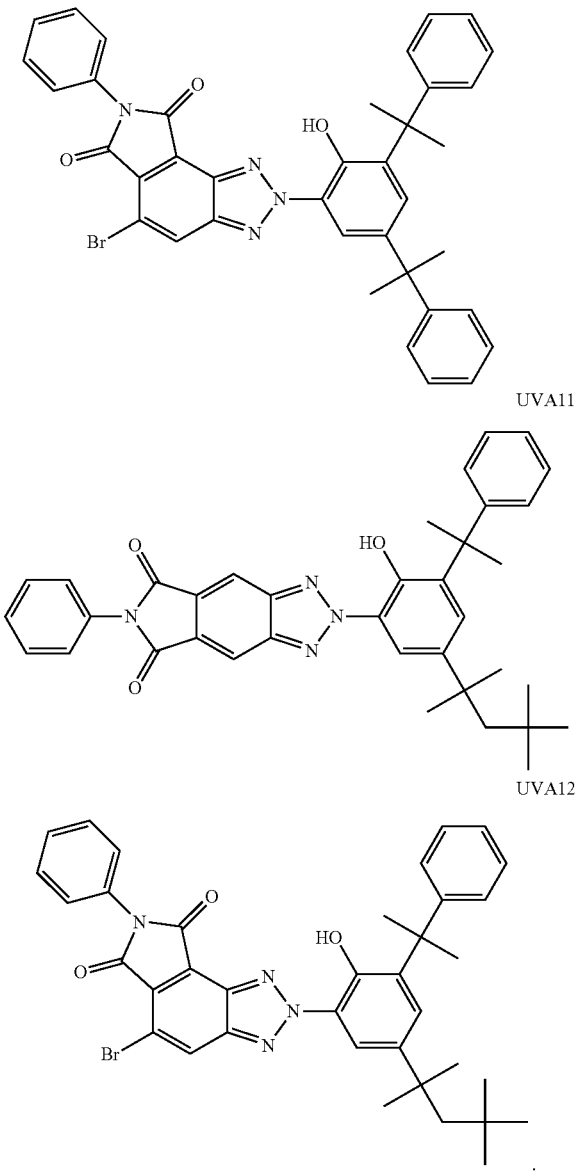

The red-shifted hydroxyphenylbenzotriazole UV absorbers are disclosed in U.S. Pat. No. 7,695,643 and U.S. Pub. No. 2009/0317629, the contents of which are incorporated herein by reference.

The amount of the red-shifted hydroxyphenylbenzotriazole present is from about 0.1% to about 25% by weight, based on the weight of the powder coating resin solids, preferably from about 0.25% to about 15% by weight, more preferably from about 0.5% to about 10% by weight, most preferably from about 0.5% to about 5% by weight, based on the weight of the powder coating resin solids. Very advantageously, the red-shifted hydroxyphenylbenzotriazoles are present at very low levels, from about 0.05% to about 3% by weight, more advantageously from about 0.05% to about 0.5% by weight, most advantageously from about 0.05% to about 0.3% by weight, based on the weight of the powder coating resin solids.

The present powder coating formulation is solvent free.

The powder coating resins are for instance disclosed in U.S. Pat. Nos. 7,468,401, 4,608,421 and 5,302,462 and U.S. Pub. Nos. 2012/0289642 and 2012/0238668, the contents of which disclosures are hereby incorporated by reference.

The powder coating resins are typically thermoset resins used in conjunction with a crosslinking agent and/or a curing catalyst. Suitable resins for use as the polymeric binder include epoxy resins, polyester resins, polyurethane resins, epoxy/polyester hybrid resins, acrylic resins, polysiloxane resins and acrylate resins.

Epoxy resins may be cured by dicyanamides or anhydrides. Hydroxyl functional polyester resins may be cured with multi-functional isocyantes to form urethane polyesters. Acid functional polyester resins can be cured with isocyanurates. Epoxy-polyester hybrids may be cured by reaction with each other. Hydroxy functional acrylic resins may be cured with multi-functional isocyanates. The amount of crosslinking agent or curative depends on the resin and may be for example from about 3% to about 20% by weight based on the weight of the resin.

Curing takes place for instance thermally.

Acrylate resins are for example prepared from glycidyl acrylate or glycidyl methacrylate.

Other conventional additives may be included in the powder coating formulation such as fluidizing agents, lubricants and the like.

The powder coating resins are present in the powder coating formulation from about 20% to about 98% by weight, preferably from about 30% to about 96% by weight, more preferably from about 50% by weight to about 96% by weight based on the total powder coating formulation.

The preparation and application of powder coatings is well known. The powder coating formulations may be sprayed or applied via a fluidized bed method or by electrostatic methods.

The coating layer may be applied in one coat to achieve a coating thickness of from about 2 mil to about 15 mil, preferably from about 2 mil to about 10 mil, most preferably from about 4 mil to about 9 mil. The powder coating formulation is generally applied directly to the carbon fiber reinforced plastic part. Alternatively, an intermediate primer layer may exist between the carbon fiber reinforced plastic part and the powder coating layer.

The present coating layers achieve a transmission of ≤0.1% at 290 nm-360 nm, ≤0.5% at 400 nm and ≤12% at 420 nm. These transmissions are achieved for 1 cured coating layer at a thickness of about 3 mil, about 4 mil, about 5, mil, about 6 mil, about 7 mil, about 8, mil or about 9 mil. The transmission of a cured coating layer is conveniently measured in adherence to a fused silica glass plate that is UV transparent.

The present coatings exhibit enhanced durability and superior exterior weathering performance.

Also a subject of this invention is a powder coating formulation comprising
  a) a powder coating resin,
  b) a red-shifted hydroxyphenylbenzotriazole ultraviolet light absorber,
  c) a hindered amine light stabilizer and optionally
  d) a compound selected from the group consisting of further ultraviolet light absorbers, phenolic antioxidants and organic or inorganic pigments.

The powder coating formulation contains no solvent, that is no organic solvent or water.

The present sterically hindered amine light stabilizers (HALS) contain at least one moiety of formula

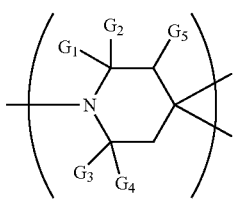

where $G_1$, $G_2$, $G_3$, $G_4$ and $G_5$ are independently alkyl of 1 to 8 carbon atoms or $G_1$ and $G_2$ or $G_3$ and $G_4$ together are pentamethylene.

The hindered amines are disclosed for example in U.S. Pat. Nos. 5,004,770, 5,204,473, 5,096,950, 5,300,544, 5,112,890, 5,124,378, 5,145,893, 5,216,156, 5,844,026, 5,980,783, 6,046,304, 6,117,995, 6,271,377, 6,297,299, 6,392,041, 6,376,584 and 6,472,456. The relevant disclosures of these patents are hereby incorporated by reference.

U.S. Pat. Nos. 6,271,377, 6,392,041 and 6,376,584, cited above disclose hindered hydroxyalkoxyamine stabilizers.

Suitable hindered amine light stabilizers include for example:

(1) 1-cyclohexyloxy-2,2,6,6-tetramethyl-4-octadecylaminopiperidine,
(2) bis(2,2,6,6-tetramethylpiperidin-4-yl) sebacate,
(3) bis(1-acetoxy-2,2,6,6-tetramethylpiperidin-4-yl) sebacate,
(4) bis(1,2,2,6,6-pentamethyl-4-yl) sebacate,
(5) bis(1-cyclohexyloxy-2,2,6,6-tetramethylpiperidin-4-yl) sebacate,
(6) bis(1-octyloxy-2,2,6,6-tetramethylpiperidin-4-yl) sebacate;
(7) bis(1-acyl-2,2,6,6-tetramethylpiperidin-4-yl) sebacate,
(8) bis(1,2,2,6,6-pentamethyl-4-piperidyl) n-butyl-3,5-di-tert-butyl-4-hydroxybenzylmalonate,
(9) 2,4-bis[(1-cyclohexyloxy-2,2,6,6-tetramethylpiperidin-4-yl)butylamino]-6-(2-hydroxy-ethylamino-s-triazine,
(10) bis(1-cyclohexyloxy-2,2,6,6-tetramethylpiperidin-4-yl) adipate,
(11) 2,4-bis[(1-cyclohexyloxy-2,2,6,6-piperidin-4-yl)butylamino]-6-chloro-s-triazine,
(12) 1-(2-hydroxy-2-methylpropoxy)-4-hydroxy-2,2,6,6-tetramethylpiperidine,
(13) 1-(2-hydroxy-2-methylpropoxy)-4-oxo-2,2,6,6-tetramethylpiperidine,
(14) 1-(2-hydroxy-2-methylpropoxy)-4-octadecanoyloxy-2,2,6,6-tetramethylpiperidine,
(15) bis(1-(2-hydroxy-2-methylpropoxy)-2,2,6,6-tetramethylpiperidin-4-yl) sebacate,
(16) bis(1-(2-hydroxy-2-methylpropoxy)-2,2,6,6-tetramethylpiperidin-4-yl) adipate,
(17) 2,4-bis{N-[1-(2-hydroxy-2-methylpropoxy)-2,2,6,6-tetramethylpiperidin-4-yl]-N-butyl-amino}-6-(2-hydroxyethylamino)-s-triazine,
(18) 4-benzoyl-2,2,6,6-tetramethylpiperidine,
(19) di-(1,2,2,6,6-pentamethylpiperidin-4-yl) p-methoxybenzylidenemalonate,
(20) 4-stearyloxy-2,2,6,6-tetramethylpiperidine,
(21) bis(1-octyloxy-2,2,6,6-tetramethylpiperidyl) succinate,
(22) 1,2,2,6,6-pentamethyl-4-aminopiperidine,
(23) 2-undecyl-7,7,9,9-tetramethyl-1-oxa-3,8-diaza-4-oxo-spiro[4,5]decane,
(24) tris(2,2,6,6-tetramethyl-4-piperidyl) nitrilotriacetate,
(25) tris(2-hydroxy-3-(amino-(2,2,6,6-tetramethylpiperidin-4-yl)propyl) nitrilotriacetate,
(26) tetrakis(2,2,6,6-tetramethyl-4-piperidyl)-1,2,3,4-butane-tetracarboxylate,
(27) tetrakis(1,2,2,6,6-pentamethyl-4-piperidyl)-1,2,3,4-butane-tetracarboxylate,
(28) 1,1'-(1,2-ethanediyl)-bis(3,3,5,5-tetramethylpiperazinone),
(29) 3-n-octyl-7,7,9,9-tetramethyl-1,3,8-triazaspiro[4.5]decan-2,4-dione,
(30) 8-acetyl-3-dodecyl-7,7,9,9-tetramethyl-1,3,8-triazaspiro[4.5]decane-2,4-dione,
(31) 3-dodecyl-1-(2,2,6,6-tetramethyl-4-piperidyl)pyrrolidin-2,5-dione,
(32) 3-dodecyl-1-(1,2,2,6,6-pentamethyl-4-piperidyl)pyrrolidine-2,5-dione and
(33) N,N'-bis-formyl-N,N'-bis(2,2,6,6-tetramethyl-4-piperidyl)hexamethylenediamine.
(34) the reaction product of 2,4-bis[(1-cyclohexyloxy-2,2,6,6-piperidin-4-yl)butylamino]-6-chloro-s-triazine with N,N'-bis(3-aminopropyl)ethylenediamine),
(35) the condensate of 1-(2-hydroxyethyl)-2,2,6,6-tetramethyl-4-hydroxypiperidine and succinic acid,
(36) linear or cyclic condensates of N,N'-bis(2,2,6,6-tetramethyl-4-piperidyl)-hexamethylenediamine and 4-tert-octylamino-2,6-dichloro-1,3,5-triazine,
(37) linear or cyclic condensates of N,N'-bis(2,2,6,6-tetramethyl-4-piperidyl)-hexamethylenediamine and 4-cyclohexylamino-2,6-dichloro-1,3,5-triazine,
(38) linear or cyclic condensates of N,N'-bis-(2,2,6,6-tetramethyl-4-piperidyl)-hexamethylenediamine and 4-morpholino-2,6-dichloro-1,3,5-triazine,
(39) linear or cyclic condensates of N,N'-bis-(1,2,2,6,6-pentamethyl-4-piperidyl)-hexamethylenediamine and 4-morpholino-2,6-dichloro-1,3,5-triazine,
(40) the condensate of 2-chloro-4,6-bis(4-n-butylamino-2,2,6,6-tetramethylpiperidyl)-1,3,5-triazine and 1,2-bis(3-aminopropylamino)ethane,
(41) the condensate of 2-chloro-4,6-di-(4-n-butylamino-1,2,2,6,6-pentamethylpiperidyl)-1,3,5-triazine and 1,2-bis-(3-aminopropylamino)ethane,
(42) a reaction product of 7,7,9,9-tetramethyl-2-cycloundecyl-1-oxa-3,8-diaza-4-oxospiro[4,5]decane and epichlorohydrin,
(43) poly[methyl,(3-oxy-(2,2,6,6-tetramethylpiperidin-4-yl)propyl)]siloxane, CAS#182635-99-0,
(44) reaction product of maleic acid anhydride-$C_{18}$-$C_{22}$-α-olefin-copolymer with 2,2,6,6-tetramethyl-4-aminopiperidine,
(45) the oligomeric compound which is the condensation product of 4,4'-hexamethylene-bis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine,
(46) the oligomeric compound which is the condensation product of 4,4'-hexamethylene-bis(amino-1,2,2,6,6-pentaamethylpiperidine) and 2,4-dichloro-6-[(1,2,2,6,6-pentaamethyl-piperidin-4-yl)butylamino]-s-triazine end-capped with 2-chloro-4,6-bis(dibutylamino)-s-triazine,
(47) the oligomeric compound which is the condensation product of 4,4'-hexamethylene-bis(amino-1-propoxy-2,2,6,6-tetramethylpiperidine) and 2,4-dichloro-6-[(1-propoxy-2,2,6,6-tetramethylpiperidin-4-yl)butylamino]-s-triazine end-capped with 2-chloro-4,6-bis(dibutylamino)-s-triazine,
(48) the oligomeric compound which is the condensation product of 4,4'-hexamethylene-bis(amino-1-acyloxy-2,2,6,6-tetramethylpiperidine) and 2,4-dichloro-6-[(1-acyloxy-2,2,6,6-tetramethylpiperidin-4-yl)butylamino]-s-triazine end-capped with 2-chloro-4,6-bis(dibutylamino)-s-triazine and
(49) product obtained by reacting a product, obtained by reacting 1,2-bis(3-amino-propylamino)ethane with cyanuric chloride, with (2,2,6,6-tetramethylpiperidin-4-yl)butylamine.

Also included are the sterically hindered N—H, N-methyl, N-methoxy, N-propoxy, N-octyloxy, N-cyclohexyloxy, N-acyloxy and N-(2-hydroxy-2-methylpropoxy) analogues of any of the above mentioned compounds. For example, replacing an N—H hindered amine with an N-methyl hindered amine would be employing the N-methyl analogue in place of the N—H.

For illustrative purposes, some of the structures for the above-named compounds are shown below:

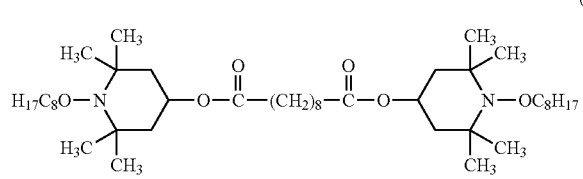
(6)

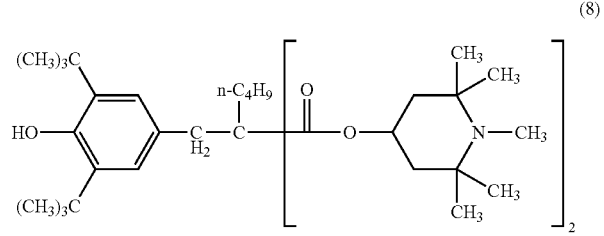
(8)

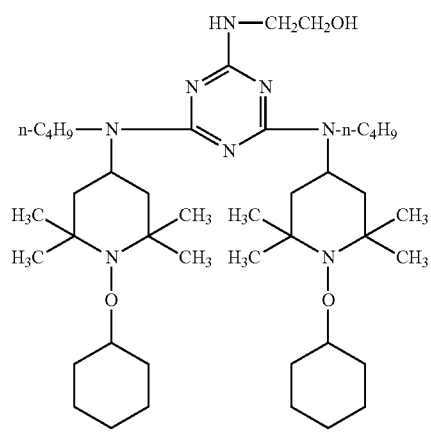
(9)

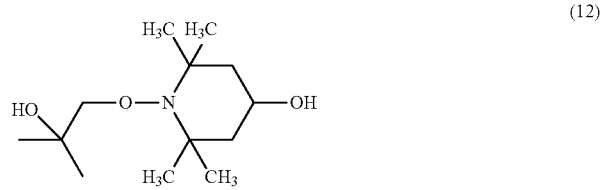
(12)

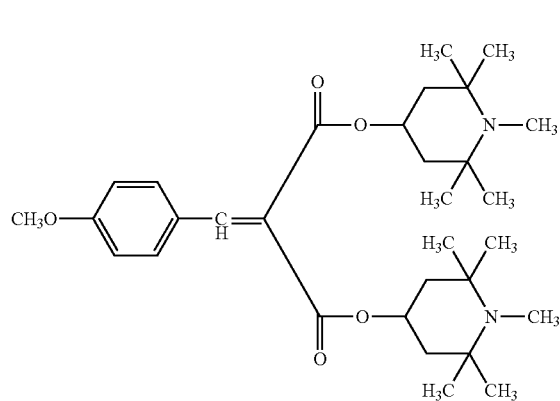
(19)

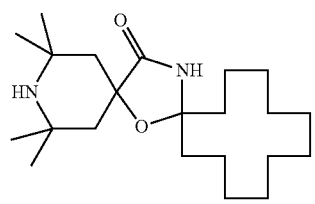
(23)

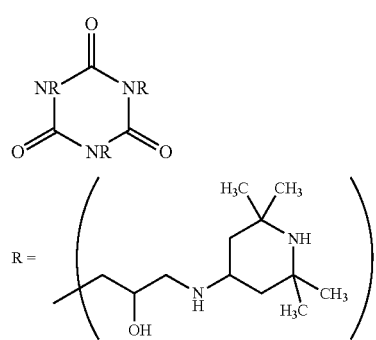
(25)

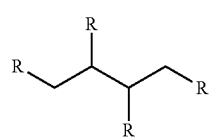
(26)

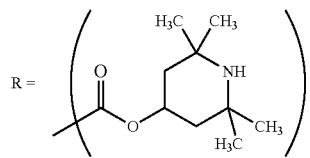

-continued
(28) 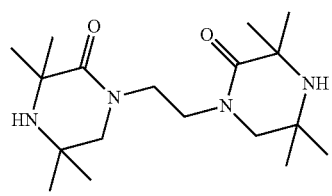
(29) 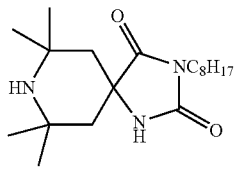
(31) 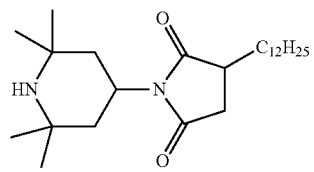
(33) 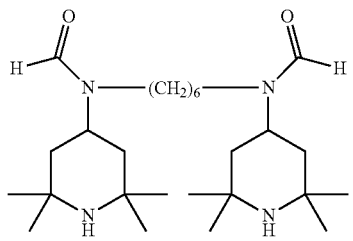
(34) 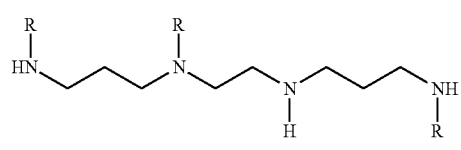
(35) 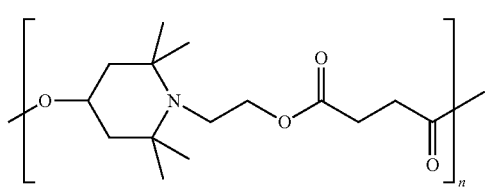
R = 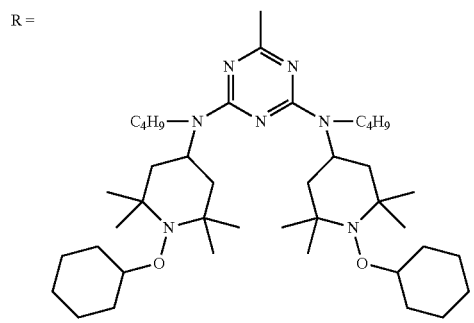
(36) 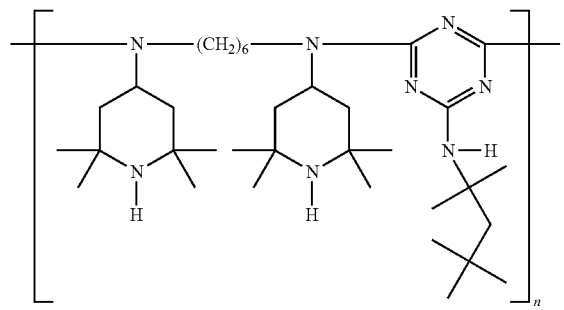
(38) 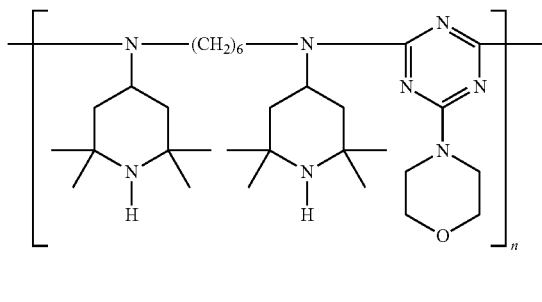
(41) 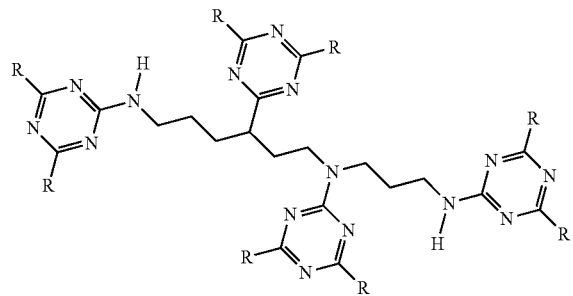
(42) 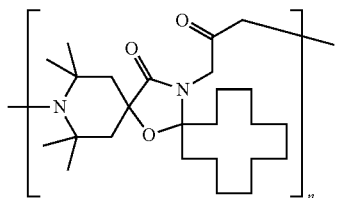

R = 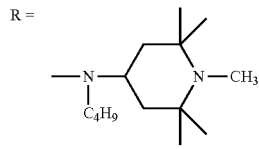

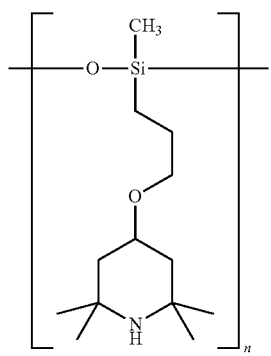
(43)

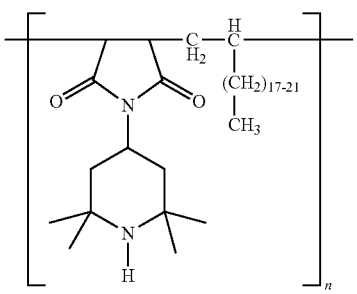
(44)

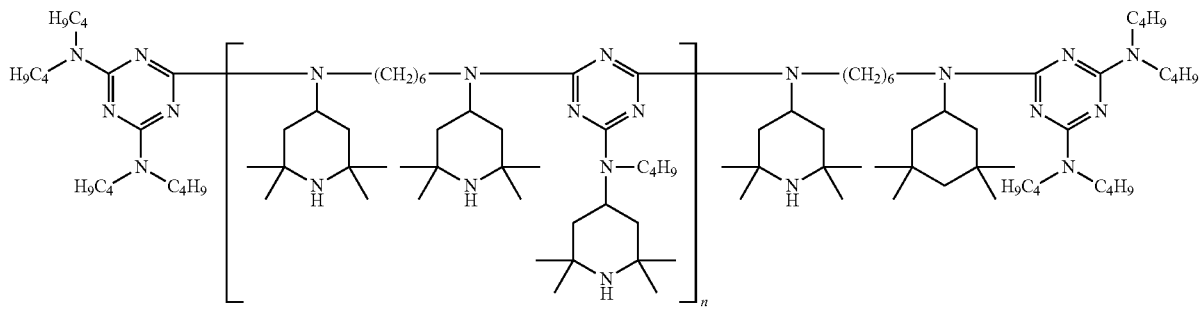
(45)

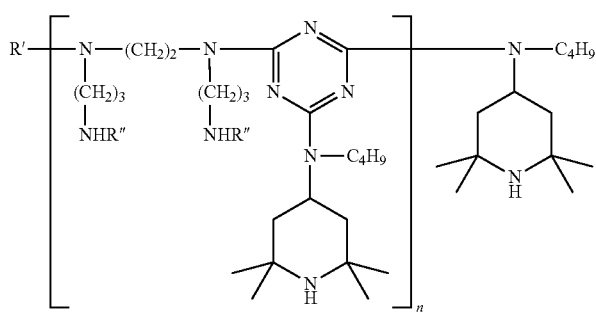
(49)

where R' = R" or H
and where R" =

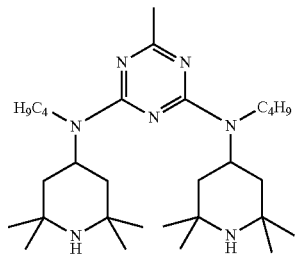

In the oligomeric hindered amine compounds, n is an integer such that the molecular weight is greater than about 1200.

The hindered amine compounds are advantageously contained in the powder coating formulation in an amount from about 0.05 to about 20% by weight based on the weight of the powder coating resin solids; for example from about 0.1 to about 10% by weight; for example from about 0.2 to about 8% by weight; preferably from about 0.5 to about 3% by weight, based on the weight of the powder coating resin solids.

Further ultraviolet light absorbers are selected from other hydroxyphenylbenzotriazoles, hydroxyphenyl-s-triazines, benzophenones, esters of benzoic acids, acrylates, malonates and oxamides. For example:

Known commercial hydroxyphenyl-2H-benzotriazoles as disclosed in, U.S. Pat. Nos. 3,004,896; 3,055,896; 3,072,585; 3,074,910; 3,189,615; 3,218,332; 3,230,194; 4,127,586; 4,226,763; 4,275,004; 4,278,589; 4,315,848; 4,347,180; 4,383,863; 4,675,352; 4,681,905, 4,853,471; 5,268,450;

5,278,314; 5,280,124; 5,319,091; 5,410,071; 5,436,349; 5,516,914; 5,554,760; 5,563,242; 5,574,166; 5,607,987, 5,977,219 and 6,166,218 such as 2-(2-hydroxy-5-methylphenyl)-2H-benzotriazole, 2-(3,5-di-t-butyl-2-hydroxyphenyl)-2H-benzotriazole, 2-(2-hydroxy-5-t-butylphenyl)-2H-benzotriazole, 2-(2-hydroxy-5-t-octylphenyl)-2H-benzotriazole, 5-chloro-2-(3,5-di-t-butyl-2-hydroxyphenyl)-2H-benzotriazole, 5-chloro-2-(3-t-butyl-2-hydroxy-5-methylphenyl)-2H-benzotriazole, 2-(3-sec-butyl-5-t-butyl-2-hydroxyphenyl)-2H-benzotriazole, 2-(2-hydroxy-4-octyloxyphenyl)-2H-benzotriazole, 2-(3,5-di-t-amyl-2-hydroxyphenyl)-2H-benzotriazole, 2-(3,5-bis-α-cumyl-2-hydroxyphenyl)-2H-benzotriazole, 2-(3-t-butyl-2-hydroxy-5-(2-(ω-hydroxy-octa-(ethyleneoxy)carbonyl-ethyl)-, phenyl)-2H-benzotriazole, 2-(3-dodecyl-2-hydroxy-5-methylphenyl)-2H-benzotriazole, 2-(3-t-butyl-2-hydroxy-5-(2-octyloxycarbonyl)ethylphenyl)-2H-benzotriazole, dodecylated 2-(2-hydroxy-5-methylphenyl)-2H-benzotriazole, 2-(3-t-butyl-2-hydroxy-5-(2-octyloxycarbonylethyl)phenyl)-5-chloro-2H-benzotriazole, 2-(3-tert-butyl-5-(2-(2-ethylhexyloxy)-carbonylethyl)-2-hydroxyphenyl)-5-chloro-2H-benzotriazole, 2-(3-t-butyl-2-hydroxy-5-(2-methoxycarbonylethyl)phenyl)-5-chloro-2H-benzotriazole, 2-(3-t-butyl-2-hydroxy-5-(2-methoxycarbonylethyl)phenyl)-2H-benzotriazole, 2-(3-t-butyl-5-(2-(2-ethylhexyloxy) carbonylethyl)-2-hydroxyphenyl)-2H-benzotriazole, 2-(3-t-butyl-2-hydroxy-5-(2-isooctyloxycarbonylethyl)phenyl-2H-benzotriazole, 2,2'-methylene-bis(4-t-octyl-(6-2H-benzotriazol-2-yl)phenol), 2-(2-hydroxy-3-α-cumyl-5-t-octylphenyl)-2H-benzotriazole, 2-(2-hydroxy-3-t-octyl-5-α-cumylphenyl)-2H-benzotriazole, 5-fluoro-2-(2-hydroxy-3, 5-di-α-cumyl-phenyl)-2H-benzotriazole, 5-chloro-2-(2-hydroxy-3,5-di-α-cumylphenyl)-2H-benzotriazole, 5-chloro-2-(2-hydroxy-3-α-cumyl-5-t-octylphenyl)-2H-benzotriazole, 2-(3-t-butyl-2-hydroxy-5-(2-isooctyloxycarbonylethyl)phenyl)-5-chloro-2H-benzotriazole, 5-trifluoromethyl-2-(2-hydroxy-3-cumyl-5-t-octylphenyl)-2H-benzotriazole, 5-trifluoromethyl-2-(2-hydroxy-5-t-octylphenyl)-2H-benzotriazole, 5-trifluoromethyl-2-(2-hydroxy-3,5-di-t-octylphenyl)-2H-benzotriazole, methyl 3-(5-trifluoromethyl-2H-benzotriazol-2-yl)-5-t-butyl-4-hydroxyhydrocinnamate, 5-butylsulfonyl-2-(2-hydroxy-3-α-cumyl-5-t-octylphenyl)-2H-benzotriazole, 5-trifluoromethyl-2-(2-hydroxy-3-α-cumyl-5-t-butylphenyl)-2H-benzotriazole, 5-trifluoromethyl-2-(2-hydroxy-3,5-di-t-butylphenyl)-2H-benzotriazole, 5-trifluoromethyl-2-(2-hydroxy-3,5-di-α-cumylphenyl)-2H-benzotriazole, 5-butylsulfonyl-2-(2-hydroxy-3,5-di-t-butylphenyl)-2H-benzotriazole and 5-phenylsulfonyl-2-(2-hydroxy-3,5-di-t-butylphenyl)-2H-benzotriazole.

2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

Esters of substituted and unsubstituted benzoic acids, as for example 4-tert-butylphenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

Acrylates and malonates, for example, α-cyano-β,β-diphenylacrylic acid ethyl ester or isooctyl ester, α-carbomethoxy-cinnamic acid methyl ester, α-cyano-β-methyl-p-methoxy-cinnamic acid methyl ester or butyl ester, α-carbomethoxy-p-methoxy-cinnamic acid methyl ester, N-(β-carbomethoxy-β-cyanovinyl)-2-methyl-indoline, SANDUVOR PR25, dimethyl p-methoxybenzylidenemalonate (CAS#7443-25-6) and SAN DUVOR PR31, di-(1,2,2, 6,6-pentamethylpiperidin-4-yl) p-methoxybenzylidenemalonate (CAS #147783-69-5).

Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

Tris-aryl-o-hydroxyphenyl-s-triazines, for example known commercial hydroxyphenyl-s-triazines and triazines as disclosed in, U.S. Pat. Nos. 3,843,371; 4,619,956; 4,740, 542; 5,096,489; 5,106,891; 5,298,067; 5,300,414; 5,354,794; 5,461,151; 5,476,937; 5,489,503; 5,543,518; 5,556,973; 5,597,854; 5,681,955; 5,726,309; 5,736,597; 5,942,626; 5,959,008; 5,998,116; 6,013,704; 6,060,543; 6,242,598 and 6,255,483, for example 4,6-bis-(2,4-dimethylphenyl)-2-(2-hydroxy-4-octyloxyphenyl)-s-triazine, 4,6-bis-(2,4-dimethylphenyl)-2-(2,4-dihydroxyphenyl)-s-triazine, 2,4-bis(2,4-dihydroxyphenyl)-6-(4-chlorophenyl)-s-triazine, 2,4-bis[2-hydroxy-4-(2-hydroxyethoxy)phenyl]-6-(4-chlorophenyl)-s-triazine, 2,4-bis[2-hydroxy-4-(2-hydroxy-4-(2-hydroxyethoxy)phenyl]-6-(2,4-dimethylphenyl)-s-triazine, 2,4-bis[2-hydroxy-4-(2-hydroxyethoxy)phenyl]-6-(4-bromophenyl)-s-triazine, 2,4-bis[2-hydroxy-4-(2-acetoxyethoxy)-phenyl]-6-(4-chlorophenyl)-s-triazine, 2,4-bis(2,4-dihydroxyphenyl)-6-(2,4-dimethylphenyl)-s-triazine, 2,4-bis(4-biphenylyl)-6-(2-hydroxy-4-octyloxycarbonylethylideneoxyphenyl)-s-triazine, 2-phenyl-4-[2-hydroxy-4-(3-sec-butyloxy-2-hydroxypropyloxy)phenyl]-6-[2-hydroxy-4-(3-sec-amyloxy-2-hydroxypropyloxy)phenyl]-s-triazine, 2,4-bis(2,4-dimethylphenyl)-6-[2-hydroxy-4-(3-benzyloxy-2-hydroxypropyloxy) phenyl]-s-triazine, 2,4-bis(2-hydroxy-4-n-butyloxyphenyl)-6-(2,4-di-n-butyloxyphenyl)-s-triazine, 2,4-bis(2,4-dimethylphenyl)-6-[2-hydroxy-4-(3-nonyloxy*-2-hydroxypropyloxy)-5-α-cumylphenyl]-s-triazine (* denotes a mixture of octyloxy, nonyloxy and decyloxy groups), methylenebis-{2,4-bis(2,4-dimethylphenyl)-6-[2-hydroxy-4-(3-butyloxy-2-hydroxypropoxy)phenyl]-s-triazine}, methylene bridged dimer mixture bridged in the 3:5', 5:5' and 3:3' positions in a 5:4:1 ratio, 2,4,6-tris(2-hydroxy-4-isooctyloxycarbonylisopropylideneoxy-phenyl)-s-triazine, 2,4-bis(2,4-dimethylphenyl)-6-(2-hydroxy-4-hexyloxy-5-α-cumylphenyl)-s-triazine, 2-(2,4,6-trimethylphenyl)-4,6-bis [2-hydroxy-4-(3-butyloxy-2-hydroxypropyloxy)phenyl]-s-triazine, 2,4,6-tris[2-hydroxy-4-(3-sec-butyloxy-2-hydroxypropyloxy)phenyl]-s-triazine, mixture of 4,6-bis-(2, 4-dimethylphenyl)-2-(2-hydroxy-4-(3-dodecyloxy-2-hydroxypropoxy)-phenyl)-s-triazine and 4,6-bis-(2,4-dimethylphenyl)-2-(2-hydroxy-4-(3-tridecyloxy-2-hydroxypropoxy)-phenyl)-s-triazine, 4,6-bis-(2,4-dimethylphenyl)-2-(2-hydroxy-4-(3-(2-ethylhexyloxy)-2-hydroxypropoxy)-phenyl)-s-triazine and 4,6-diphenyl-2-(4-hexyloxy-2-hydroxyphenyl)-s-triazine.

The phenolic antioxidants are for example compounds selected from 1.1-1.17:
  1.1. Alkylated monophenols for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6- dioctadecyl-4-methylphenol, 2,4,6-tricyclohexylphenol, 2,6-di-tert-butyl-4-methoxymethylphenol, nonylphenols which are linear or branched in the side chains, for example, 2,6-dinonyl-4-methylphenol, 2,4-dimethyl-6-(1-methylundec-1-yl)phenol, 2,4-dimethyl-6-(1-methylheptadec-1-yl)phenol, 2,4-dimethyl-6-(1-methyltridec-1-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

1.4. Tocopherols for example α-tocopherol, β-tocopherol, γ-tocopherol, δ-tocopherol and mixtures thereof (Vitamin E).

1.5. Hydroxylated thiodiphenyl ethers for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide.

1.6. Alkylidenebisphenols for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3-tert-butyl-4-hydroxyphenyl)butyrate], bis(3-tert-butyl-4-hydroxy-5-methylphenyl)dicyclopentadiene, bis[2-(3'tert-butyl-2-hydroxy-5-methylbenzyl)-6-tert-butyl-4-methylphenyl] terephthalate, 1,1-bis-(3,5-dimethyl-2-hydroxyphenyl) butane, 2,2-bis-(3,5-di-tert-butyl-4-hydroxyphenyl) propane, 2,2-bis-(5-tert-butyl-4-hydroxy2-methylphenyl)-4-n-dodecylmercaptobutane, 1,1,5,5-tetra-(5-tert-butyl-4-hydroxy-2-methylphenyl)pentane.

1.7. Benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, 1,3,5-tri-(3,5-di-tert-butyl-4-hydroxybenzyl)-2,4,6-trimethylbenzene, di-(3,5-di-tert-butyl-4-hydroxybenzyl) sulfide, 3,5-di-tert-butyl-4-hydroxybenzyl-mercapto-acetic acid isooctyl ester, bis-(4-tert-butyl-3-hydroxy-2,6-dimethylbenzyl)dithiol terephthalate, 1,3,5-tris-(3,5-di-tert-butyl-4-hydroxybenzyl) isocyanurate, 1,3,5-tris-(4-tert-butyl-3-hydroxy-2,6-dimethylbenzyl) isocyanurate, 3,5-di-tert-butyl-4-hydroxybenzyl-phosphoric acid dioctadecyl ester and 3,5-di-tert-butyl-4-hydroxybenzyl-phosphoric acid monoethyl ester, calcium-salt.

1.8. Hydroxybenzylated malonates for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds for example 1,3,5-tris-(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris-(3,5-di-tert-butyl-4-hydroxy-benzyl) isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris (3,5-di-tert-butyl-4-hydroxy-phenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxy-lauric acid anilide, 4-hydroxy-stearic acid anilide, 2,4-bis-octylmercapto-6-(3,5-tert-butyl-4-hydroxyanilino)-s-triazine and octyl-N-(3,5-di-tert-butyl-4-hydroxyphenyl)-carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard® XL-1 supplied by Uniroyal).

The optional further UV absorbers and hindered phenolic antioxidants are for instance present from about 0.01% to about 5%, preferably from about 0.025% to about 2% and especially from about 0.1% to about 1% by weight, based on the weight of the powder coating resin solids. The optional further UV absorbers may be employed in very low levels, as outlined for the present red-shifted UVAs.

The carbon fiber reinforced polymer (CFRP) is also known as carbon fiber reinforced materials (CFRM) and are employed for instance in aerospace applications due to their high strength to weight ratio. The carbon fiber composites generally comprise carbon fiber embedded in a thermoset aromatic epoxy matrix.

The parts are also suitable in automobile parts, sporting goods, audio components, boats, etc.

Such composite plastic parts are taught for instance in U.S. Pat. Nos. 5,472,653 and 5,686,521 and U.S. Pub. No. 2012/0231202, the contents of which are hereby incorporated by reference.

Other polymers may be employed as the matrix, for instance phenolics, urethanes, isocyanates, polyesters, vinyl esters or polyamides. The composites may contain other fibers, for instance aramid, aluminum or glass fibers.

The carbon fiber reinforced polymer parts may be prepared for instance by known molding, vacuum bagging or compression molding techniques. In these methods, prepregs may be employed.

The polymer matrix may comprise for instance from about 15% to about 50% by weight of the carbon fiber reinforced polymer part (uncoated).

Most advantageously, the present powder coatings are clear coats.

In addition to clear coat powder coatings, also subject of this invention are tinted and pigmented powder coatings.

Clear powder coatings are defined as containing essentially no pigments. The clear powder coatings for instance contain no pigments.

Tinted powder coatings are defined as having a pigment loading of from about 1 part per million (ppm) to 2% by weight pigment, based on the weight of the resin solids. For instance, tinted powder coatings have from about 5 ppm to about 1.5%, from about 10 ppm to about 1.5%, from about 50 ppm to about 1.0%, from about 100 ppm to about 1.0% or from about 0.1% to about 0.5% by weight pigment, based on the weight of the resin solids.

Pigmented powder coatings are defined as having >2% and up to about 40% by weight pigment, based on the weight of the resin solids.

Suitable pigments are organic or inorganic and are for instance selected from the group consisting of quinacridone, benzimidazalone, rutile $TiO_2$ coated mica, $TiO_2$ coated synthetic mica, bismuth oxychloride, bismuth oxychloride coated mica, $Se_2O_3$ coated alumina ($Al_2O_3$), phthalocyanine, diketopyrrolopyrrole (DPP), isoindolinone, iron oxide coated mica, indanthrone, perylene, isoindoline, bismuth vanadate, quinophthalone, benzimidazolone, pyrazolone-quinazolone, Sn/Zn/Ti oxide, dianisidine, dioxazine, cobalt blue, indanthrone, cobalt green and iron chrome oxide pigments.

Especially suitable are pigments selected from the group consisting of effect pigments. Effect pigments comprise for instance natural or synthetic mica, $SiO_2$, glass or alumina platelets coated with one or more metal oxides, for instance rutile $TiO_2$ coated mica, $TiO_2$ coated synthetic mica, iron oxide coated mica, $Se_2O_3$ coated alumina or bismuth oxychloride coated mica.

Effect pigments are taught for example in U.S. Pat. Nos. 3,553,001, 4,948,631, 4,084,983, 4,434,010, 5,759,255, 5,246,492, 6,630,018 and 7,169,222 and U.S. Pub. No. 2010/075031, each incorporated by reference.

The U.S. patents, U.S. published patent applications and U.S. patent applications discussed herein are hereby incorporated by reference.

The following embodiments are disclosed.

Embodiment 1. A composition comprising a carbon fiber reinforced plastic part and a coating layer in adherence thereto, wherein the coating layer is a cured powder coating formulation comprising a) a powder coating resin, b) a red-shifted hydroxyphenylbenzotriazole ultraviolet light absorber, c) a hindered amine light stabilizer and optionally d) a compound selected from the group consisting of further ultraviolet light absorbers, phenolic antioxidants and organic or inorganic pigments, where the red-shifted hydroxyphenylbenzotriazoles are of formulae (I) or (II)

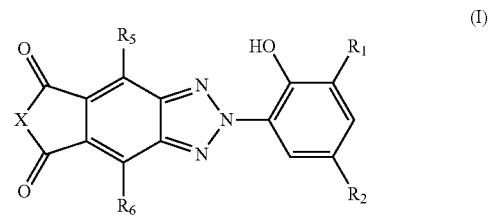

(I)

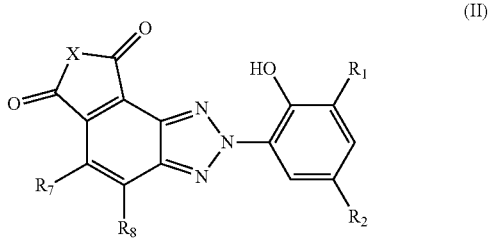

(II)

wherein $R_1$ is hydrogen, straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms; or $R_1$ is a group

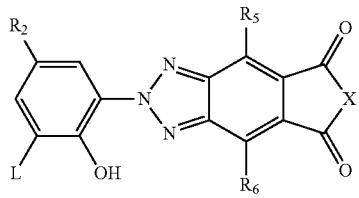

or a group

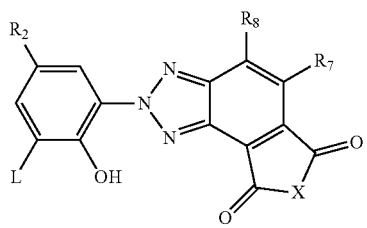

wherein L is alkylene of 1 to 12 carbon atoms, alkylidene of 2 to 12 carbon atoms, benzylidene, p-xylylene or cycloalkylene of 5 to 7 carbon atoms;

$R_2$ is straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or said alkyl substituted by one or more —OH, —OCO—$R_{11}$, —$OR_{14}$, —NCO or —$NH_2$ groups or mixtures thereof, or said alkyl or said alkenyl interrupted by one or more —O—, —NH— or —$NR_{14}$— groups or mixtures thereof and which can be unsubstituted or substituted by one or more —OH, —$OR_{14}$ or —$NH_2$ groups or mixtures thereof; where $R_{11}$ is hydrogen, straight or branched chain $C_1$-$C_{18}$alkyl, $C_5$-$C_{12}$cycloalkyl, straight or branched chain $C_3$-$C_8$alkenyl, phenyl, naphthyl or $C_7$-$C_{15}$phenylalkyl; and $R_{14}$ is hydrogen, straight or branched chain alkyl of 1 to 24 carbon atoms; or $R_2$ is —$OR_{14}$, a group —C(O)—O—$R_{14}$, —C(O)—$NHR_{14}$ or —C(O)—$NR_{14}R'_{14}$ wherein $R'_{14}$ has the same meaning as $R_{14}$; or $R_2$ is —$SR_{13}$, —$NHR_{13}$ or —$N(R_{13})_2$; or $R_2$ is —$(CH_2)_m$—CO—$X_1$—$(Z)_p$—Y—$R_{15}$ wherein $X_1$ is —O— or —$N(R_{16})$—, Y is —O— or —$N(R_{17})$— or a direct bond, Z is $C_2$-$C_{12}$-alkylene, $C_4$-$C_{12}$alkylene interrupted by one to three nitrogen atoms, oxygen atoms or a mixture thereof, or is $C_3$-$C_{12}$alkylene, butenylene, butynylene, cyclohexylene or phenylene, each of which may be additionally substituted by a hydroxyl group;

or a group

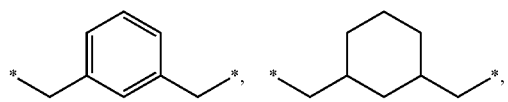

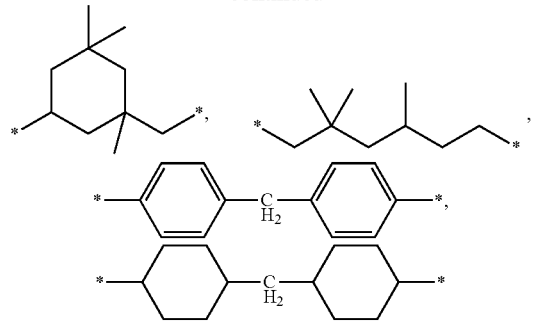

wherein * denotes a bond; or when Y is a direct bond, Z can additionally also be a direct bond;

m is zero, 1 or 2, p is 1, or p is also zero when X and Y are —$N(R_{16})$— and —$N(R_{17})$—, respectively, $R_{15}$ is hydrogen, $C_1$-$C_{12}$alkyl, a group

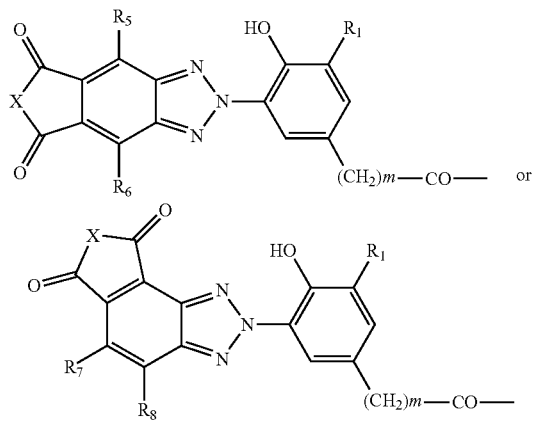

or a group —CO—C($R_{18}$)=C(H)$R_{19}$ or, when Y is —$N(R_{17})$—, forms together with $R_{17}$ a group —CO—CH=CH—CO— wherein $R_{18}$ is hydrogen or methyl and $R_{19}$ is hydrogen, methyl or —CO—$X_1$—$R_{20}$, wherein $R_{20}$ is hydrogen, $C_1$-$C_{12}$alkyl or a group of formulae

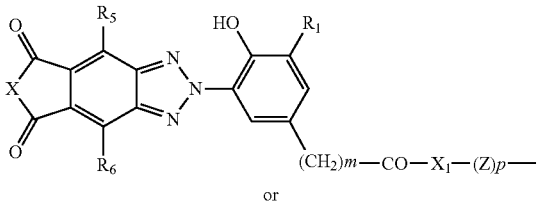

or

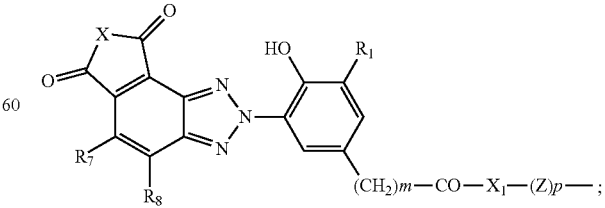

$R_5$, $R_6$, $R_7$ and $R_8$ are independently hydrogen, halogen, CN, $NO_2$ or $NH_2$;

$R_{13}$ is alkyl of 1 to 20 carbon atoms, hydroxyalkyl of 2 to 20 carbon atoms, alkenyl of 3 to 18 carbon atoms, cycloalkyl of 5 to 12 carbon atoms, phenylalkyl of 7 to 15 carbon atoms, phenyl or naphthyl, which both may be substituted by one or two alkyl of 1 to 4 carbon atoms;

$R_{16}$ and $R_{17}$ independently of one another are hydrogen, $C_1$-$C_{12}$-alkyl, $C_3$-$C_{12}$-alkyl interrupted by 1 to 3 oxygen atoms, or is cyclohexyl or $C_7$-$C_{15}$phenylalkyl and $R_{16}$ together with $R_{17}$ in the case where Z is ethylene, also forms ethylene;

X is O or $NE_1$ wherein $E_1$ is hydrogen, straight or branched chain $C_1$-$C_{24}$alkyl, straight or branched chain $C_2$-$C_{18}$alkenyl, $C_2$-$C_6$alkyinyl, $C_5$-$C_{12}$cycloalkyl, phenyl, naphthyl or $C_7$-$C_{16}$phenylalkyl; or said straight or branched chain $C_1$-$C_{24}$ alkyl, straight or branched chain $C_2$-$C_{24}$ alkenyl, $C_5$-$C_{12}$ cycloalkyl, $C_2$-$C_6$ alkinyl can be substituted by one or more —F, —OH, —$OR_{22}$, —$NH_2$, —$NHR_{22}$, —$N(R_{22})_2$, —$NHCOR_{23}$, —$NR_{22}COR_{23}$, —$OCOR_{24}$, —$COR_{25}$, —$SO_2R_{26}$, —$PO(R_{27})_n(R_{28})_{2-n}$, —$Si(R_{29})_n(R_{30})_{3-n}$, —$Si(R_{22})_3$, —$N^+(R_{22})_3A^-$, —$S^+(R_{22})_2A^-$, -oxiranyl groups or mixtures thereof; said straight or branched chain $C_1$-$C_{24}$ alkyl, straight or branched chain unsubstituted or substituted $C_2$-$C_{24}$ alkenyl, $C_5$-$C_{12}$ cycloalkyl or $C_2$-$C_6$ alkinyl can also be interrupted by one or more —O—, —S—, —NH— or —$NR_{22}$— groups or combinations thereof;

said phenyl, naphthyl or $C_7$-$C_{15}$phenylalkyl can also be substituted by one or more halogen, —CN, —$CF_3$, —$NO_2$, —$NHR_{22}$, —$N(R_{22})_2$, —$SO_2R_{26}$, —$PO(R_{27})_n(R_{28})_{2-n}$, —OH, —$OR_{22}$, —$COR_{25}$, —$R_{25}$; wherein n is 0, 1 or 2;

$R_{22}$ is straight or branched chain $C_1$-$C_{18}$ alkyl, straight or branched chain $C_2$-$C_{18}$ alkenyl, $C_5$-$C_{10}$ cycloalkyl, phenyl or naphthyl, $C_7$-$C_{15}$ phenylalkyl, or two $R_{22}$ when attached to an N or Si atom can form together with the atom to which they are bonded a pyrrolidine, piperidine or morpholine ring;

$R_{23}$ is hydrogen, $OR_{22}$, $NHR_{22}$, $N(R_{22})_2$ or has the same meaning as $R_{22}$, $R_{24}$ is $OR_{22}$, $NHR_{22}$, $N(R_{22})_2$ or has the same meaning as $R_{22}$, $R_{25}$ is hydrogen, OH, $OR_{22}$, $NHR_{22}$ or $N(R_{22})_2$, O-glycidyl or has the same meaning as $R_{22}$, $R_{26}$ is OH, $OR_{22}$, $NHR_{22}$ or $N(R_{22})_2$, $R_{27}$ is $NH_2$, $NHR_{22}$ or $N(R_{22})_2$, $R_{28}$ is OH or $OR_{22}$, $R_{29}$ is Cl or $OR_{22}$, $R_{30}$ is straight or branched chain $C_1$-$C_{18}$ alkyl; or $E_1$ is a group

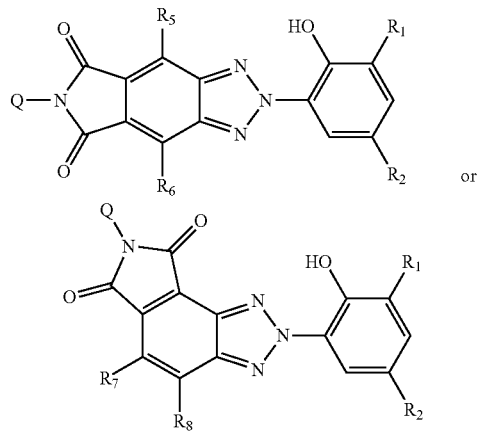

wherein $R_1$ to $R_8$ have the meanings as defined above and

Q is straight or branched $C_2$-$C_{12}$alkylene, $C_2$-$C_{12}$alkylene, which is interrupted by one or more —O—, NH or $NR_{14}$ atoms, $C_5$-$C_{10}$cycloalkylene, para-phenylene or a group

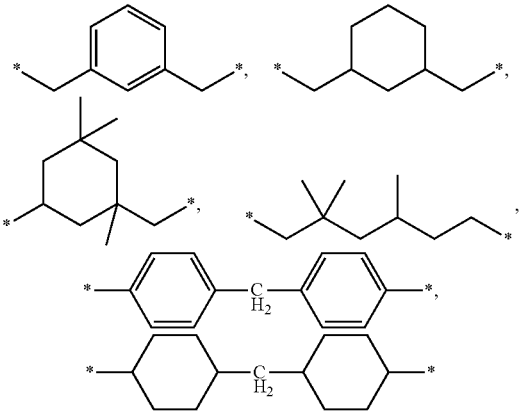

wherein * denotes a bond.

Embodiment 2. A composition according to embodiment 1 where in the compounds of formulae (I) or (II), $R_1$ is hydrogen, straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms; or $R_1$ is a group

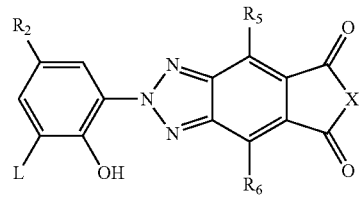

or a group

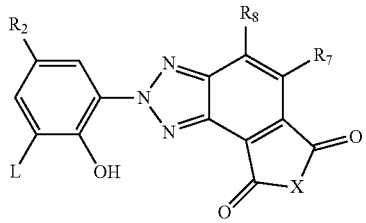

wherein L is alkylene of 1 to 12 carbon atoms, alkylidene of 2 to 12 carbon atoms, benzylidene, p-xylylene or cycloalkylene of 5 to 7 carbon atoms;

$R_2$ is straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or $R_2$ is —$(CH_2)_m$—CO—$X_1$—$(Z)_p$—Y—$R_{15}$ wherein
  $X_1$ is —O—,
  Y is —O— or a direct bond,
  Z is $C_2$-$C_{12}$-alkylene, $C_4$-$C_{12}$alkylene interrupted by one to three nitrogen atoms, oxygen atoms or a mixture thereof, or when Y is a direct bond, Z can additionally also be a direct bond;

m is 2,
p is 1,
$R_{15}$ is hydrogen, $C_1$-$C_{12}$alkyl or a group

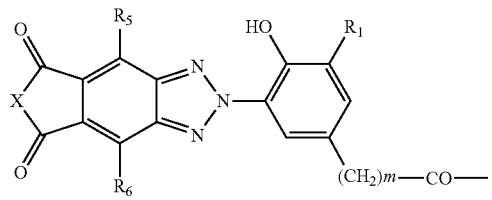

or

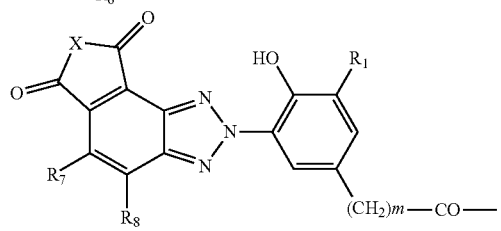

$R_5$, $R_6$, $R_7$ and $R_8$ are independently hydrogen, Cl or Br;
X is O or $NE_1$ wherein
$E_1$ is hydrogen, straight or branched chain $C_1$-$C_{24}$alkyl, straight or branched chain $C_2$-$C_{18}$alkenyl, $C_2$-$C_6$alkyinyl, $C_5$-$C_{12}$cycloalkyl, phenyl, naphthyl or $C_7$-$C_{15}$phenylalkyl; or said straight or branched chain $C_1$-$C_{24}$ alkyl, straight or branched chain $C_2$-$C_{24}$ alkenyl, $C_5$-$C_{12}$ cycloalkyl, $C_2$-$C_6$ alkinyl can be substituted by one or more —F, —OH, —$OR_{22}$, —$NH_2$, —$NHR_{22}$, —$N(R_{22})_2$, —$NHCOR_{23}$, —$NR_{22}COR_{23}$, —$OCOR_{24}$, —$COR_{25}$, —$SO_2R_{26}$, —PO $(R_{27})_n(R_{28})_{2-n}$, —$Si(R_{29})_n(R_{30})_{3-n}$, —$Si(R_{22})_3$, —$N^+(R_{22})_3A^-$, —$S^+(R_{22})_2A^-$, -oxiranyl groups or mixtures thereof; said straight or branched chain $C_1$-$C_{24}$ alkyl, straight or branched chain unsubstituted or substituted $C_2$-$C_{24}$ alkenyl, $C_5$-$C_{12}$ cycloalkyl or $C_2$-$C_6$ alkinyl can also be interrupted by one or more —O—, —S—, —NH— or —$NR_{22}$— groups or combinations thereof;
said phenyl, naphthyl or $C_7$-$C_{15}$phenylalkyl can also be substituted by one or more halogen, —CN, —$CF_3$, —$NO_2$, —$NHR_{22}$, —$N(R_{22})_2$, —$SO_2R_{26}$, —$PO(R_{27})_n(R_{28})_{2-n}$, —OH, —$OR_{22}$, —$COR_{25}$, —$R_{25}$; wherein n is 0, 1 or 2;
$R_{22}$ is straight or branched chain $C_1$-$C_{18}$ alkyl, straight or branched chain $C_2$-$C_{18}$ alkenyl, $C_5$-$C_{10}$ cycloalkyl, phenyl or naphthyl, $C_7$-$C_{15}$ phenylalkyl, or two $R_{22}$ when attached to an N or Si atom can form together with the atom to which they are bonded a pyrrolidine, piperidine or morpholine ring;
$R_{23}$ is hydrogen, $OR_{22}$, $NHR_{22}$, $N(R_{22})_2$ or has the same meaning as $R_{22}$,
$R_{24}$ is $OR_{22}$, $NHR_{22}$, $N(R_{22})_2$ or has the same meaning as $R_{22}$,
$R_{25}$ is hydrogen, OH, $OR_{22}$, $NHR_{22}$ or $N(R_{22})_2$, O-glycidyl or has the same meaning as $R_{22}$,
$R_{26}$ is OH, $OR_{22}$, $NHR_{22}$ or $N(R_{22})_2$,
$R_{27}$ is $NH_2$, $NHR_{22}$ or $N(R_{22})_2$,
$R_{28}$ is OH or $OR_{22}$,
$R_{29}$ is Cl or $OR_{22}$,
$R_{30}$ is straight or branched chain $C_1$-$C_{18}$ alkyl; or
$E_1$ is a group

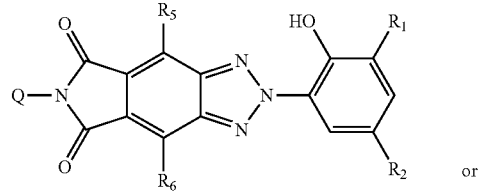

or

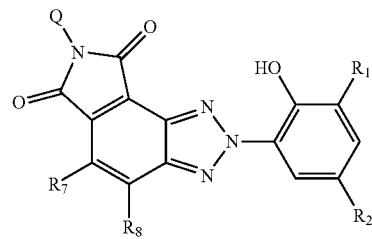

wherein
$R_1$ to $R_8$ have the meanings as defined above and
Q is straight or branched $C_2$-$C_{12}$alkylene, $C_5$-$C_{10}$cycloalkylene or para-phenylene or a group.

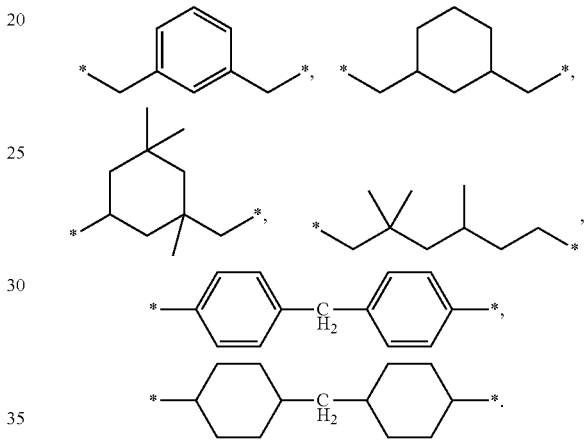

Embodiment 3. A composition according to embodiment 1 where in the compounds of formula (I) or (II),
$R_1$ is hydrogen, straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms
$R_2$ is straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or
$R_2$ is —$(CH_2)_2$—CO—O—(Z)—O—$R_{15}$ wherein
Z is $C_2$-$C_{12}$-alkylene, $C_4$-$C_{12}$alkylene interrupted by one to three oxygen atoms;
$R_{15}$ is hydrogen, $C_1$-$C_{12}$alkyl or a group

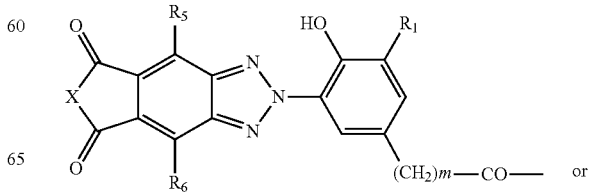

or

-continued

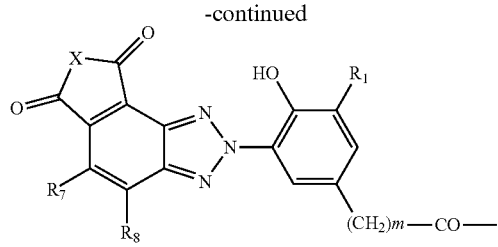

$R_5$, $R_6$, $R_7$ and $R_8$ are independently hydrogen, Cl or Br;
X is O or $NE_1$ wherein
$E_1$ is hydrogen, straight or branched chain $C_1$-$C_{24}$alkyl, $C_5$-$C_{12}$cycloalkyl, phenyl or $C_7$-$C_{15}$phenylalkyl; or said straight or branched chain $C_1$-$C_{24}$ alkyl or $C_5$-$C_{12}$ cycloalkyl can be substituted by one or more —F, —OH, —$OR_{22}$, —$NH_2$, —$NHR_{22}$, —$N(R_{22})_2$;
said phenyl or $C_7$-$C_{15}$phenylalkyl can also be substituted by one or more -halogen, —CN, —$CF_3$, —OH, —$OR_{22}$, —$COR_{22}$, —$R_{22}$; wherein
$R_{22}$ is straight or branched chain $C_1$-$C_{18}$ alkyl, straight or branched chain $C_2$-$C_{18}$ alkenyl, $C_5$-$C_{10}$ cycloalkyl, $C_6$-$C_{16}$ phenyl or naphthyl, $C_7$-$C_{15}$ phenylalkyl; or
$E_1$ is a group

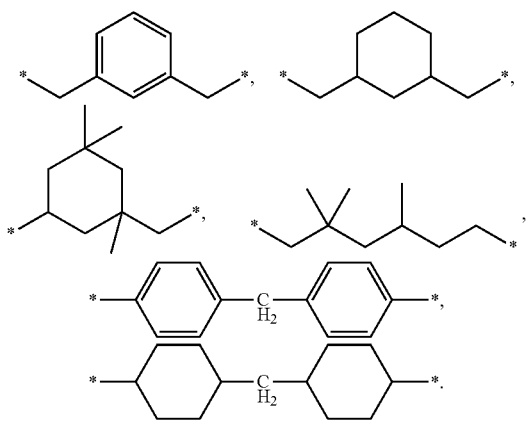

wherein
$R_1$ to $R_8$ have the meanings as defined above and
Q is $C_2$-$C_{12}$alkylene, $C_5$-$C_7$cycloalkylene, para-phenylene or a group Embodiment 4. A composition according to embodiment 1 where in the compounds of formula (I) or (II),
$R_1$ is hydrogen, straight or branched chain alkyl of 1 to 12 carbon atoms or phenylalkyl of 7 to 15 carbon atoms;
$R_2$ is straight or branched chain alkyl of 1 to 12 carbon atoms or phenylalkyl of 7 to 15 carbon atoms, phenyl, or said phenyl or said phenylalkyl substituted on the phenyl ring by 1 to 3 alkyl of 1 to 4 carbon atoms;
$R_5$ and $R_6$ are hydrogen or one of both is Cl or Br;
$R_7$ and $R_8$ are independently hydrogen, Cl or Br;
X is O or $NE_1$ wherein
$E_1$ is hydrogen, straight or branched chain $C_1$-$C_6$alkyl, which is unsubstituted or substituted by 1 to 4 OH, phenyl which is unsubstituted or substituted by F, $CF_3$, CN or Cl, or $C_7$-$C_9$phenylalkyl.

Embodiment 5. A composition according to embodiment 4 where the red-shifted hydroxyphenylbenzotriazoles are of formula (I).

Embodiment 6. A composition according to embodiment 1 where the red-shifted hydroxyphenylbenzotriazole is selected from the group consisting of UVA1-UVA12

UVA1

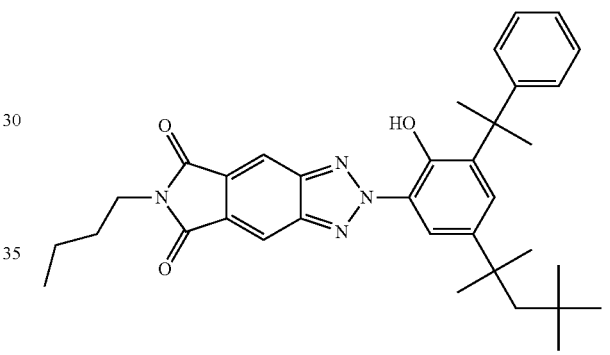

UVA2

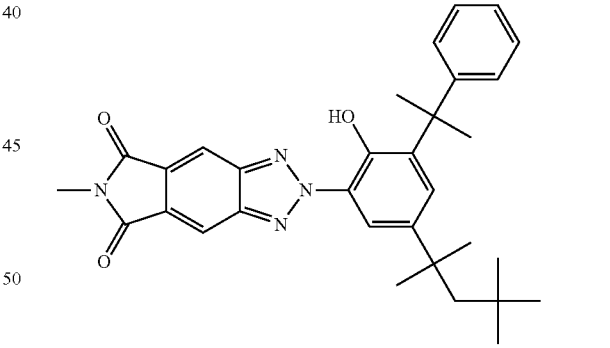

UVA3

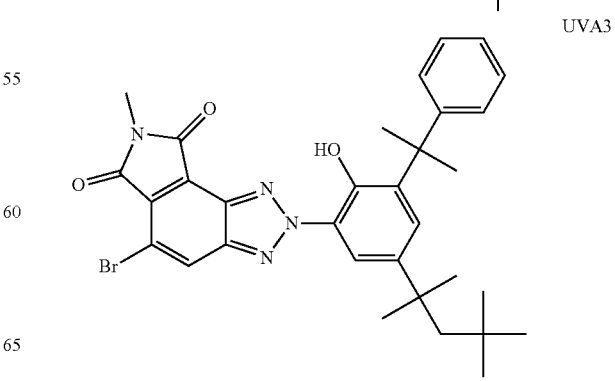

UVA4
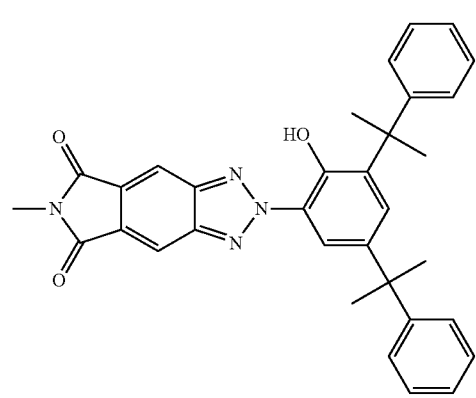
UVA5
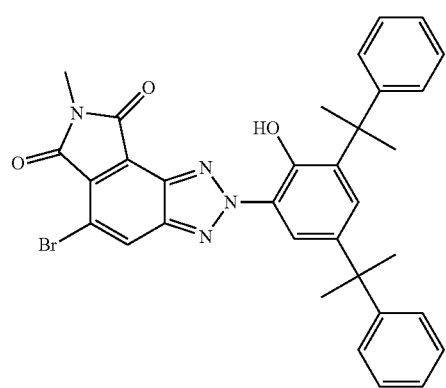
UVA6
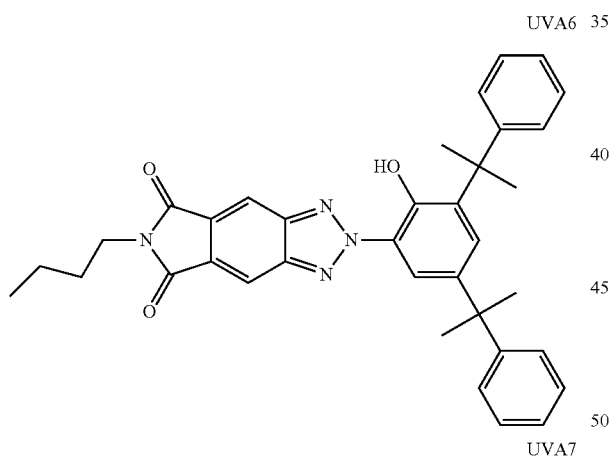
UVA7
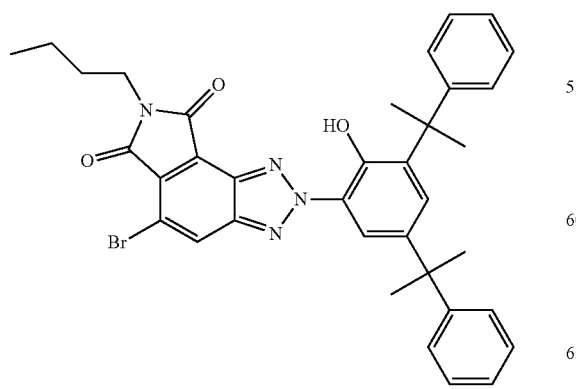
UVA8
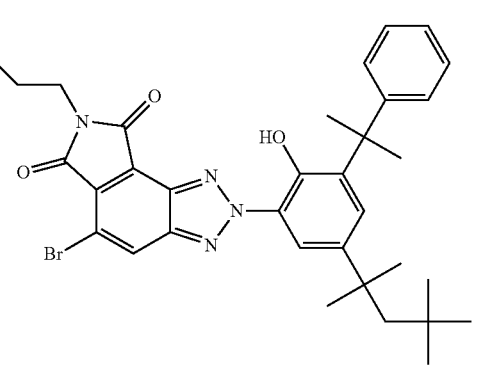
UVA9
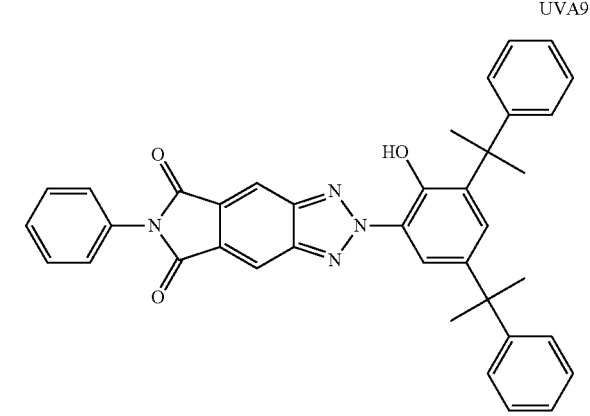
UVA10
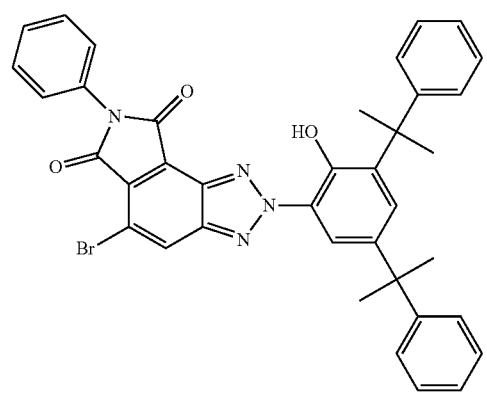
UVA11
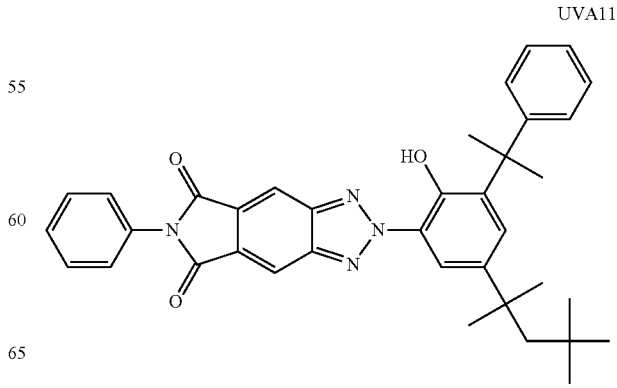

-continued

UVA12

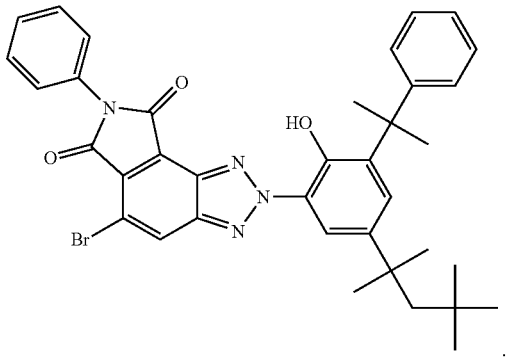

Embodiment 7. A composition according to any of the preceding embodiments where the powder coating resin is selected from the group consisting of epoxy resins, polyester resins, polyurethane resins, epoxy/polyester hybrid resins, acrylic resins, polysiloxane resins and acrylate resins.

Embodiment 8. A composition according to any of the preceding embodiments where the hindered amine light stabilizers are selected from the group consisting of
(1) 1-cyclohexyloxy-2,2,6,6-tetramethyl-4-octadecylaminopiperidine,
(2) bis(2,2,6,6-tetramethylpiperidin-4-yl) sebacate,
(3) bis(1-acetoxy-2,2,6,6-tetramethylpiperidin-4-yl) sebacate,
(4) bis(1,2,2,6,6-pentamethyl-4-yl) sebacate,
(5) bis(1-cyclohexyloxy-2,2,6,6-tetramethylpiperidin-4-yl) sebacate,
(6) bis(1-octyloxy-2,2,6,6-tetramethylpiperidin-4-yl) sebacate;
(7) bis(1-acyl-2,2,6,6-tetramethylpiperidin-4-yl) sebacate,
(8) bis(1,2,2,6,6-pentamethyl-4-piperidyl) n-butyl-3,5-di-tert-butyl-4-hydroxybenzylmalonate,
(9) 2,4-bis[(1-cyclohexyloxy-2,2,6,6-tetramethylpiperidin-4-yl)butylamino]-6-(2-hydroxy-ethylamino-s-triazine,
(10) bis(1-cyclohexyloxy-2,2,6,6-tetramethylpiperidin-4-yl) adipate,
(11) 2,4-bis[(1-cyclohexyloxy-2,2,6,6-piperidin-4-yl)butylamino]-6-chloro-s-triazine,
(12) 1-(2-hydroxy-2-methylpropoxy)-4-hydroxy-2,2,6,6-tetramethylpiperidine,
(13) 1-(2-hydroxy-2-methylpropoxy)-4-oxo-2,2,6,6-teramethylpiperidine,
(14) 1-(2-hydroxy-2-methylpropoxy)-4-octadecanoyloxy-2,2,6,6-tetramethylpiperidine,
(15) bis(1-(2-hydroxy-2-methylpropoxy)-2,2,6,6-tetramethylpiperidin-4-yl) sebacate,
(16) bis(1-(2-hydroxy-2-methylpropoxy)-2,2,6,6-tetramethylpiperidin-4-yl) adipate,
(17) 2,4-bis{N-[1-(2-hydroxy-2-methylpropoxy)-2,2,6,6-tetramethylpiperidin-4-yl]-N-butyl-amino}-6-(2-hydroxy-ethylamino)-s-triazine,
(18) 4-benzoyl-2,2,6,6-tetramethylpiperidine,
(19) di-(1,2,2,6,6-pentamethylpiperidin-4-yl) p-methoxybenzylidenemalonate,
(20) 4-stearyloxy-2,2,6,6-tetramethylpiperidine,
(21) bis(1-octyloxy-2,2,6,6-tetramethylpiperidyl) succinate,
(22) 1,2,2,6,6-pentamethyl-4-aminopiperidine,
(23) 2-undecyl-7,7,9,9-tetramethyl-1-oxa-3,8-diaza-4-oxo-spiro[4,5]decane,
(24) tris(2,2,6,6-tetramethyl-4-piperidyl) nitrilotriacetate,
(25) tris(2-hydroxy-3-(amino-(2,2,6,6-tetramethylpiperidin-4-yl)propyl) nitrilotriacetate,
(26) tetrakis(2,2,6,6-tetramethyl-4-piperidyl)-1,2,3,4-butane-tetracarboxylate,
(27) tetrakis(1,2,2,6,6-pentamethyl-4-piperidyl)-1,2,3,4-butane-tetracarboxylate,
(28) 1,1'-(1,2-ethanediyl)-bis(3,3,5,5-tetramethylpiperazinone),
(29) 3-n-octyl-7,7,9,9-tetramethyl-1,3,8-triazaspiro[4.5]decan-2,4-dione,
(30) 8-acetyl-3-dodecyl-7,7,9,9-tetramethyl-1,3,8-triazaspiro[4.5]decane-2,4-dione,
(31) 3-dodecyl-1-(2,2,6,6-tetramethyl-4-piperidyl)pyrrolidin-2,5-dione,
(32) 3-dodecyl-1-(1,2,2,6,6-pentamethyl-4-piperidyl)pyrrolidine-2,5-dione and
(33) N,N'-bis-formyl-N,N'-bis(2,2,6,6-tetramethyl-4-piperidyl)hexamethylenediamine.
(34) the reaction product of 2,4-bis[(1-cyclohexyloxy-2,2,6,6-piperidin-4-yl)butylamino]-6-chloro-s-triazine with N,N'-bis(3-aminopropyl)ethylenediamine),
(35) the condensate of 1-(2-hydroxyethyl)-2,2,6,6-tetramethyl-4-hydroxypiperidine and succinic acid,
(36) linear or cyclic condensates of N,N'-bis(2,2,6,6-tetramethyl-4-piperidyl)-hexamethylenediamine and 4-tert-octylamino-2,6-dichloro-1,3,5-triazine,
(37) linear or cyclic condensates of N,N'-bis(2,2,6,6-tetramethyl-4-piperidyl)-hexamethylenediamine and 4-cyclohexylamino-2,6-dichloro-1,3,5-triazine,
(38) linear or cyclic condensates of N,N'-bis-(2,2,6,6-tetramethyl-4-piperidyl)-hexamethylenediamine and 4-morpholino-2,6-dichloro-1,3,5-triazine,
(39) linear or cyclic condensates of N,N'-bis-(1,2,2,6,6-pentamethyl-4-piperidyl)-hexamethylenediamine and 4-morpholino-2,6-dichloro-1,3,5-triazine,
(40) the condensate of 2-chloro-4,6-bis(4-n-butylamino-2,2,6,6-tetramethylpiperidyl)-1,3,5-triazine and 1,2-bis(3-aminopropylamino)ethane,
(41) the condensate of 2-chloro-4,6-di-(4-n-butylamino-1,2,2,6,6-pentamethylpiperidyl)-1,3,5-triazine and 1,2-bis-(3-aminopropylamino)ethane,
(42) a reaction product of 7,7,9,9-tetramethyl-2-cycloundecyl-1-oxa-3,8-diaza-4-oxospiro[4,5]decane and epichlorohydrin,
(43) poly[methyl,(3-oxy-(2,2,6,6-tetramethylpiperidin-4-yl)propyl)]siloxane, CAS#182635-99-0,
(44) reaction product of maleic acid anhydride-$C_{18}$-$C_{22}$-α-olefin-copolymer with 2,2,6,6-tetramethyl-4-aminopiperidine,
(45) the oligomeric compound which is the condensation product of 4,4'-hexamethylene-bis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine,
(46) the oligomeric compound which is the condensation product of 4,4'-hexamethylene-bis(amino-1,2,2,6,6-pentaamethylpiperidine) and 2,4-dichloro-6-[(1,2,2,6,6-pentaamethyl-piperidin-4-yl)butylamino]-s-triazine end-capped with 2-chloro-4,6-bis(dibutylamino)-s-triazine,
(47) the oligomeric compound which is the condensation product of 4,4'-hexamethylene-bis(amino-1-propoxy-2,2,6,6-tetramethylpiperidine) and 2,4-dichloro-6-[(1-propoxy-2,2,6,6-tetramethylpiperidin-4-yl)butylamino]-s-triazine end-capped with 2-chloro-4,6-bis(dibutylamino)-s-triazine,
(48) the oligomeric compound which is the condensation product of 4,4'-hexamethylene-bis(amino-1-acyloxy-2,2,6,6-tetramethylpiperidine) and 2,4-dichloro-6-[(1-acyloxy-2,2,6,6-tetramethylpiperidin-4-yl)butylamino]-s-triazine end-capped with 2-chloro-4,6-bis(dibutylamino)-s-triazine and

(49) product obtained by reacting a product, obtained by reacting 1,2-bis(3-amino-propylamino)ethane with cyanuric chloride, with (2,2,6,6-tetramethylpiperidin-4-yl)butylamine.

Embodiment 9. A composition according to any of the preceding embodiments where the powder coating formulation comprises a further ultraviolet light absorber selected from the groups consisting of other hydroxyphenylbenzotriazoles, hydroxyphenyl-s-triazines, benzophenones, esters of benzoic acids, acrylates, malonates and oxamides.

Embodiment 10. A composition according to any of the preceding embodiments where the powder coating formulation comprises a further ultraviolet light absorber selected from the group consisting of hydroxyphenyl-s-triazines.

Embodiment 11. A composition according to any of the preceding embodiments where the powder coating formulation comprises a phenolic antioxidant.

Embodiment 12. A composition according to any of the preceding embodiments where the coating layer is from about 2 mil to about 10 mil thick.

Embodiment 13. A composition according to any of the preceding embodiments where the red-shifted hydroxyphenylbenzotriazoles are present from about 0.05% to about 1.0% by weight and the hindered amine light stabilizers are present from about 0.5% to about 3.0% by weight, each based on the weight of the powder coating resin solids.

Embodiment 14. A composition according to any of the preceding embodiments where the coating layer exhibits a UV transmission of ≤0.1% at 290 nm to 360 nm, ≤0.5% at 400 nm and ≤12% at 420 nm.

Embodiment 15. A composition according to any of the preceding embodiments where the coating layer is a tinted coating layer.

Embodiment 16. A composition according to any of embodiments 1-14 where the coating layer is a pigmented coating layer.

Embodiment 17. A composition according to any of the preceding embodiments where the coating layer comprises an effect pigment.

Embodiment 18. A composition according to any of embodiments 1-14 where the coating layer is a clear coat layer.

Embodiment 19. A powder coating formulation comprising
a) a powder coating resin,
b) a red-shifted hydroxyphenylbenzotriazole ultraviolet light absorber according to embodiment 1,
c) a hindered amine light stabilizer and optionally
d) a compound selected from the group consisting of further ultraviolet light absorbers, phenolic antioxidants and organic or inorganic pigments.

The following Examples illustrate the invention.

EXAMPLE A1

Preparation of Hydroxyphenylbenzotriazole 1b (UVA2)

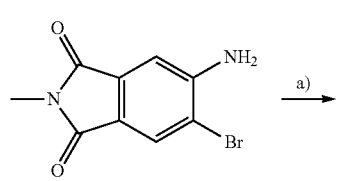

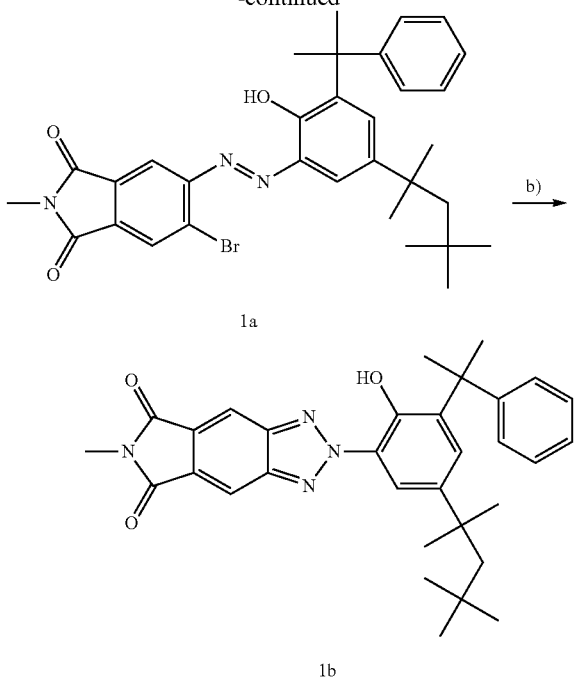

CAS Reg no. 59683-52-2 a) Nitrosylsulfuric acid (40% in sulfuric acid; 14.0 g, 44.1 mmol) is slowly added at 15° C. to a stirred suspension of 4-amino-5-bromophtalimide (95%; 10.7 g, 39.9 mmol) in acetic acid (200 ml). During the addition the temperature of the reaction mixture is kept between 15° C. and 17° C. by means of an ice bath. After the addition is complete (three quarters of an hour), stirring is continued for two hours. The reaction mixture is then transferred into a dropping funnel and slowly added at −15° C. to a stirred solution of 2-cumyl-4-t-octylphenol (95%; 13.7 g, 40.1 mmol) in methanol/m-xylene (85/15 by volume; 200 ml) containing sodium hydroxide microprills (1.8 g, 45.0 mmol) and sodium acetate (13.1 g, 159.7 mmol). During the addition, the temperature of the reaction mixture is kept between −15° C. and −9° C. by means of an isopropanol-dry ice bath; the pH is measured by means of an electrode and held above 5 by concomitant addition of sodium hydroxide (30% in water; total of 250 ml). After the addition is complete (two hours; initial pH 13.7, final pH 5.6), the cooling bath is removed and the red suspension stirred overnight. Water (150 ml) and toluene (250 ml) are added, the water phase split off and washed with toluene (1×250 ml). The combined organic phases are washed with water (2×250 ml), dried ($MgSO_4$), filtered and the solvent evaporated affording 30 g of a red oil. Methanol (60 g) is added and the suspension heated to reflux. Upon cooling (ice bath), compound 1a crystallizes as red solid, which is filtered off, washed with methanol and dried. Yield 16.2 g (27.4 mmol, 68.8%).

Melting point: 178-179° C.

$^1$H-NMR (300 MHz, $CD_2Cl_2$), δ(ppm): 13.14 (s, 1H), 8.34 (s, 1H), 8.18 (s, 1H), 7.92 (d-like, 1H), 7.76 (d-like, 1H), 7.28-7.24 (m, 4H), 7.20-7.15 (m, 1H), 3.20 (s, 3H), 1.87 (s, 2H), 1.82 (s, 6H), 1.51 (s, 6H), 0.86 (s, 9H).

b) A stirred mixture of compound 1a (17.2 g, 29.1 mmol), sodium azide (99%; 2.5 g, 38.1 mmol) and 1-methyl-2-pyrrolidinone (60 ml) is heated to 120° C. The temperature is maintained until evolution of nitrogen ceases (1.5 hours). The dark solution is cooled to 25° C. followed by the addition of water (100 ml) and toluene (150 ml). The water phase is split off and washed with toluene (1×50 ml). The combined organic phases are washed with water (3×50 ml), dried (MgSO₄), filtered and the solvent evaporated affording 17 g of a viscous red oil which solidifies upon standing. The crude material is dissolved in hot toluene. Hexane is added and the solution cooled whereas compound 1b crystallizes as yellowish solid, which is filtered off and dried (8 g). The filtrate is evaporated to dryness and the residue crystallized from hexane to afford another 3.5 g. Yield 11.5 g (21.9 mmol, 75.3%).

Melting point: 198-199° C.

$^1$H-NMR (300 MHz, CD$_2$Cl$_2$), δ(pmm): 10.97 (s, 1H), 8.40-8.39 (m, 3H), 7.76 (d-like, 1H), 7.31-7.24 (m, 4H), 7.20-7.15 (m, 1H), 3.25 (s, 3H), 1.91 (s, 2H), 1.83 (s, 6H), 1.54 (s, 6H), 0.86 (s, 9H).

EXAMPLE A2

Preparation of Hydroxyphenylbenzotriazole 2c (UVA3)

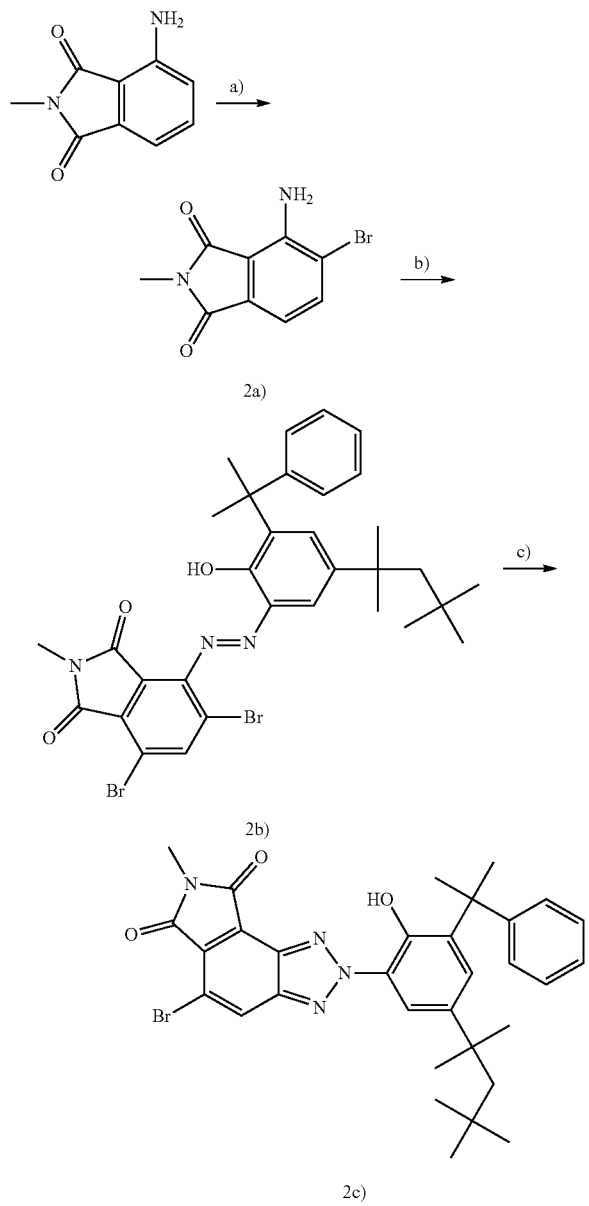

CAS Regno 2257-85-4 a) A mixture of 4-amino-N-methylphthalimide (17.8 g, 10.0 mmol), sodium acetate (1.64 g, 20 mmol) and acetic acid (30 g) are stirred together at room temperature. Bromine (3.22 g, 20 mmol) in acetic acid (10 ml) is added dropwise with good stirring. A precipitate forms after about one-half of the bromine has been added. Stirring is continued for 16 h after the complete addition of the bromine. Then water is added (40 ml) and the product is collected by filtration, washed with water (10 ml) and dried.

Yield: 3.18 g (95%).

Melting point: 216° C.-218° C.

$^1$H-NMR (300 MHz, DMSO-d$_6$), δ(ppm): 7.92 (s, 1H), 6.46 (s, broad, 2H), 2.96 (s, 3H).

b) Nitrosylsulfuric acid (40% in sulfuric acid; 14.0 g, 44.1 mmol) is slowly added at 15° C. to a stirred suspension of 3-amino-4,6-dibromophtalimide (13.4 g, 40.0 mmol) in acetic acid (200 ml). During the addition the temperature of the reaction mixture is kept between 15° C. and 17° C. by means of an ice bath. After the addition is complete (three quarters of an hour), stirring is continued for one hour. The reaction mixture is then transferred into a dropping funnel and slowly added at −15° C. to a stirred solution of 2-cumyl-4-t-octylphenol (95%; 13.7 g, 40.1 mmol) in methanol/m-xylene (85/15 by volume; 200 ml) containing sodium hydroxide microprills (1.8 g, 45.0 mmol) and sodium acetate (13.1 g, 159.7 mmol). During the addition, the temperature of the reaction mixture is kept between −15° C. and −9° C. by means of an isopropanol-dry ice bath; the pH is measured by means of an electrode and held above 5 by concomitant addition of sodium hydroxide (30% in water; total of 250 ml). After the addition is complete (two hours; initial pH 13.7, final pH 5.6), the cooling bath is removed and the red suspension stirred overnight. Compound 2b, which crystallizes as red solid, is filtered off, washed with isopropanolol and dried.

Yield 16.6 g (62.0%).

Melting point: 180° C. (dec.)

$^1$H-NMR (300 MHz, CDCl$_3$), δ(ppm): 11.70 (s, 1H), 8.14 (s, 1H), 7.78 (d-like, 1H), 7.70 (d-like, 1H), 7.30-7.28 (m, 4H), 7.21-7.17 (m, 1H), 3.16 (s, 3H), 1.82 (s, 6H), 1.81 (s, 2H), 1.46 (s, 6H), 0.83 (s, 9H).

c) A stirred mixture of compound 2b (6.70 g, 10 mmol), sodium azide (99%; 0.85 g, 13 mmol) and 1-methyl-2-pyrrolidinone (25 ml) is heated to 50° C. The temperature is maintained until evolution of nitrogen ceases (2 hours). The dark solution is cooled to 25° C. followed by the addition of water (25 ml) and ethyl acetate (50 ml). The water phase is split off and the product, which precipitates in the ethyl acetate, is collected by filtration. The crude material is recrystallized from hot toluene (20 ml), filtered off and dried.

Yield 1.05 g (17.4%).

Melting point: 221° C.-225° C. (dec.).

$^1$H-NMR (300 MHz, CDCl$_3$), δ(ppm): 10.89 (s, 1H), 8.41 (s, 1H) 8.39 (d-like, 1H), 7.74 (d-like, 1H), 7.29-7.26 (m, 4H), 7.22-7.17 (m, 1H), 3.26 (s, 3H), 1.87 (s, 2H), 1.84 (s, 6H), 1.53 (s, 6H), 0.84 (s, 9H).

Example A3

Preparation of Hydroxyphenlybenzotriazoles 3d(I)-3d(V) FROM IMIDE 1b via Dicarboxylic Acid 3a and Anhydride 3b, without Isolation of Intermediate Amic Acids 3c(I)-3c(V)

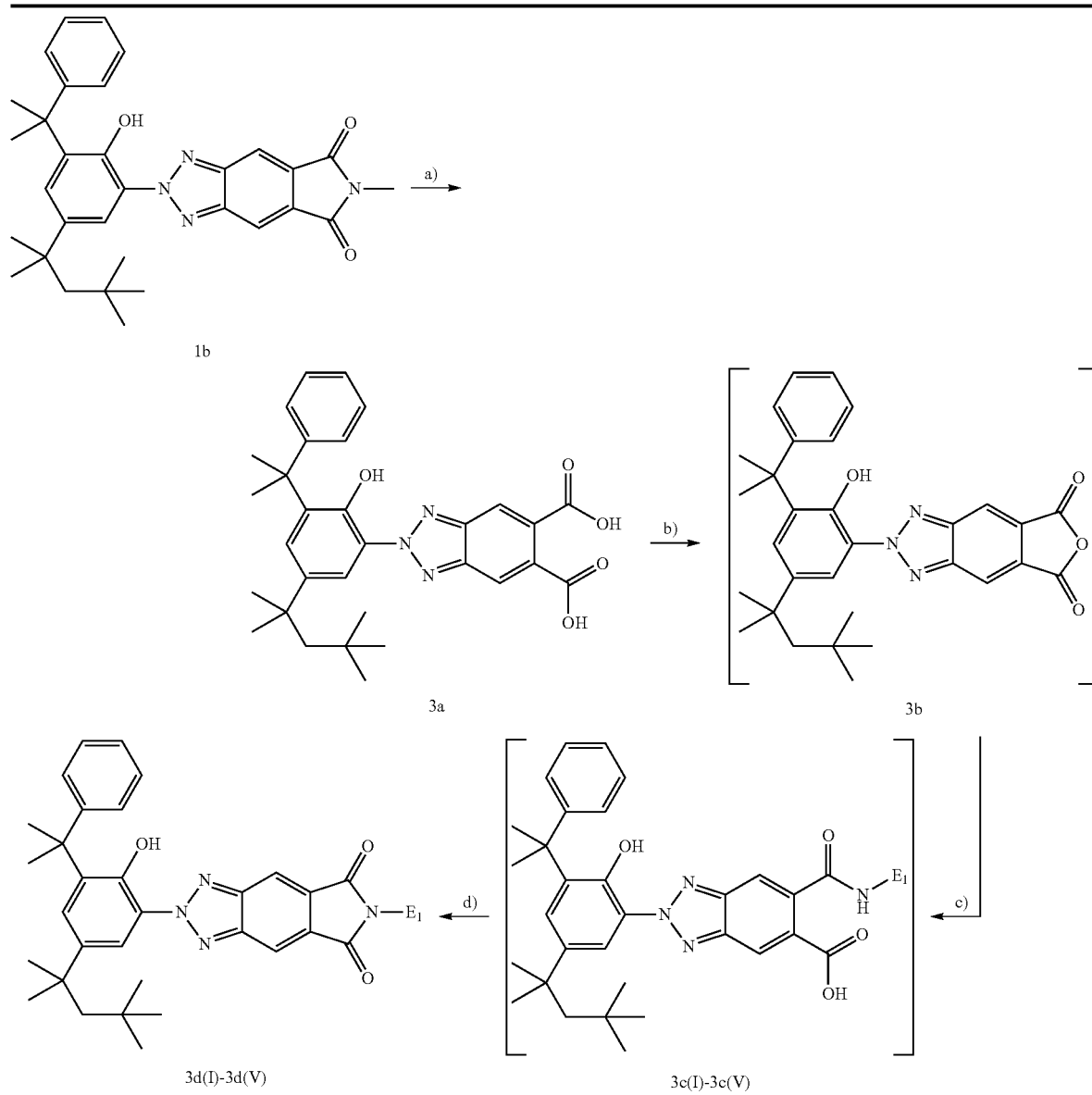

| Compound # | $E_1$ |
|---|---|
| 3d(I) | $C_6H_5$ |
| 3d(II) | $C_6H_4$—4-CN |
| 3d(III) | $C_6H_4$—2-Cl |
| 3d(IV) | $C_6H_3$—2,6-$(^iPr)_2$ |
| 3d(V) | $CH_2CH_2OH$ |

The intermediate compound of formula 3a and their analogous compounds are also useful as UV-absorbers.

a) KOH (53.3 g, 950 mmol) is added slowly at 25° C. to a stirred mixture of 1b (49.8 g, 94.9 mmol) and ethanol/water (1/1 by volume; total of 200 g plus 40 ml). After further dilution with ethanol (50 ml) the mixture is brought to 80° C., where it is held for 19.75 hours. Further KOH (2.65 g, 47.2 mmol) is added and stirring at 80° C. continued for another 29 hours. Ethanol is then distilled off on a rotary evaporator and the resulting orange suspension diluted with water (500 ml). The mixture is acidified (pH 2) by slow addition of HCl (aqueous 32% w/w) and the yellow precipitate filtered off. The filter-cake is washed with water (3×100 ml) and dried in a vacuum oven at 40° C. to afford 3a as a yellow solid (53.3 g).

Melting point: 150-175° C. (dec.)

HPLC-UV/APCl-MS (negative): 529.3 (M); calcd. for $C_{31}H_{35}N_3O_5$: 529.3

$^1$H-NMR (300 MHz, DMSO-$d_6$), δ(ppm): 10.38 (s, 1H), 8.57 (br s, 2H), 7.98 (d, J=1.9 Hz, 1H), 7.64 (d, J=1.9 Hz, 1H), 7.26-7.18 (m, 4H), 7.14-7.08 (m, 1H), 1.80 (s, 2H), 1.75 (s, 6H), 1.43 (s, 6H), 0.78 (s, 9H).

b)-d); 3d(I): A stirred mixture of 3a (4.2 g, 7.9 mmol) and toluene (40 g) is brought to and held at reflux until formation of water, which is separated off by means of a Dean-Stark trap, has ceased (3.75 hours; $t_1$). Aniline (98%; 0.83 g, 8.7 mmol) is then added and the mixture refluxed for another 1.25 hours ($t_2$). Toluene is distilled off on a rotary evaporator and the residue purified by chromatography (silica gel, hexane/toluene/ethylacetate 9/0.5/1) to afford 3d(I) as yellow solid (2.4 g, 51.6%).

Melting point: 220-221° C.

Anal. calcd. for $C_{37}H_{38}N_4O_3$ (586.74): C, 75.74; H, 6.53; N, 9.55. Found: C, 75.52; H, 6.53; N, 9.28.

$^1$H-NMR (400 MHz, DMSO-$d_6$), δ(ppm): 10.26 (br s, 1H), 8.68 (s, 2H), 7.96 (d, J=1.8 Hz, 1H), 7.69 (d, J=1.8 Hz, 1H), 7.56-7.45 (m, 5H), 7.26-7.20 (m, 4H), 7.14-7.10 (m, 1H), 1.82 (s, 2H), 1.76 (s, 6H), 1.45 (s, 6H), 0.79 (s, 9H).

b)-d); 3d(II): Prepared similarly to 3d(I) from 3a (6.35 g, 12.0 mmol), toluene (70 g) and 4-aminobenzonitrile (97%; 1.6 g, 13.1 mmol), reflux lasting 1.1 hours ($t_1$) and 2.25 hours ($t_2$), respectively. Purification of the residue by chromatography (silica gel, toluene) affords 3d(II) as yellow solid (4.2 g, 57.3%).

Melting point: 252-253° C.

Anal. calcd. for $C_{38}H_{37}N_5O_3$ (611.75): C, 74.61; H, 6.10; N, 11.45. Found: C, 74.04; H, 5.83; N, 11.37.

$^1$H-NMR (400 MHz, DMSO-$d_6$), δ(ppm): 10.24 (br s, 1H), 8.72 (s, 2H), 8.05 (d, J=8.5 Hz, 2H), 7.95 (d, J=1.8 Hz, 1H), 7.76 (d, J=8.5 Hz, 2H), 7.69 (d, J=1.8 Hz, 1H), 7.26-7.18 (m, 4H), 7.16-7.10 (m, 1H), 1.82 (s, 2H), 1.76 (s, 6H), 1.44 (s, 6H), 0.79 (s, 9H).

b)-d); 3d(III): Prepared similarly to 3d(I) from 3a (6.35 g, 12.0 mmol), toluene (70 g) and 2-chloroaniline (98%; 1.7 g, 13.1 mmol), reflux lasting 1.0 hour ($t_1$) and 3.25 hours ($t_2$), respectively. Purification of the residue by chromatography (silica gel, toluene/ethylacetate 9/1) affords 3d(III) as yellow solid (2.2 g, 29.5%).

Melting point: 179-180° C.

Anal. calcd. for $C_{37}H_{37}ClN_4O_3$ (621.19): C, 71.54; H, 6.00; Cl, 5.71; N, 9.02. Found: C, 71.04; H, 5.90; Cl, 5.93; N, 8.89.

$^1$H-NMR (300 MHz, DMSO-$d_6$), δ(ppm): 10.22 (s, 1H), 8.76 (s, 2H), 7.95 (d, J=2.1 Hz, 1H), 7.75-7.67 (m, 3H), 7.62-7.53 (m, 2H), 7.27-7.19 (m, 4H), 7.15-7.09 (m, 1H), 1.82 (s, 2H), 1.76 (s, 6H), 1.45 (s, 6H), 0.79 (s, 9H).

b)-d); 3d(IV): Prepared similarly to 3d(I) from 3a (6.35 g, 12.0 mmol), toluene (70 g) and 2,6-diisopropylaniline (90%; 2.6 g, 13.2 mmol), reflux lasting 1.0 hour ($t_1$) and 3.0 hours ($t_2$), respectively. Purification of the residue by chromatography (silica gel, toluene) affords 3d(IV) as yellow solid (3.3 g, 41.0%).

Melting point: 210-211° C.

Anal. calcd. for $C_{43}H_{50}N_4O_3$ (670.90): C, 76.98; H, 7.51; N, 8.35. Found: C, 76.70; H, 7.47; N, 8.29.

$^1$H-NMR (300 MHz, CD$_2$Cl$_2$), δ(ppm): 11.03 (s, 1H), 8.53 (s, 2H), 8.45 (d, J=2.4 Hz, 1H), 7.79 (d, J=2.4 Hz, 1H), 7.58-7.53 (m, 1H), 7.39-7.36 (m, 2H), 7.33-7.26 (m, 4H), 7.22-7.16 (m, 1H), 2.78 (septet, J=6.8 Hz, 2H), 1.93 (s, 2H), 1.85 (s, 6H), 1.56 (s, 6H), 1.19 (d, J=6.8 Hz, 12H), 0.88 (s, 9H).

b)-d); 3d(V): Prepared similarly to 3d(I) from 3a (6.35 g, 12.0 mmol), toluene (70 g) and ethanolamine (99%; 0.81 g, 13.1 mmol), reflux lasting 1.25 hours ($t_1$) and 1.5 hours ($t_2$), respectively. Purification of the residue by chromatography (silica gel, toluene) affords 3d(V) as yellow solid (2.8 g, 42.1%).

Melting point: 161-162° C.

Anal. calcd. for $C_{33}H_{38}N_4O_4$ (554.70): C, 71.46; H, 6.90; N, 10.10. Found: C, 71.07; H, 6.92; N, 10.03.

$^1$H-NMR (300 MHz, DMSO-$d_6$), δ(ppm): 10.23 (s, 1H), 8.57 (s, 2H), 7.94 (d, J=2.2 Hz, 1H), 7.67 (d, J=2.2 Hz, 1H), 7.26-7.18 (m, 4H), 7.14-7.08 (m, 1H), 4.88 (t, J=5.9 Hz, 1H), 3.72-3.59 (m, 4H), 1.81 (s, 2H), 1.75 (s, 6H), 1.44 (s, 6H), 0.78 (s, 9H).

b) A mixture of N,N'-dicyclohexylcarbodiimide (99%; 2.7 g, 13.0 mmol), 3a (6.35 g, 12.0 mmol) and dichloromethane (40 ml) is stirred at 25° C. for one hour. N,N'-dicyclohexylurea is filtered off and the dichloromethane distilled off on a rotary evaporator to afford 3b as yellow solid (5.5 g, 89.6%).

Melting point: 145-160° C. (dec.)

HPLC-UV/APCl-MS (negative): 511.2 (M); calcd. for $C_{31}H_{33}N_3O_4$ 511.2

$^1$H-NMR (300 MHz, CD$_2$Cl$_2$), δ(ppm): 10.89 (s, 1H), 8.63 (s, 2H), 8.44 (d, J=2.3 Hz, 1H), 7.81 (d, J=2.3 Hz, 1H), 7.31-7.24 (m, 4H), 7.22-7.15 (m, 1H), 1.91 (s, 2H), 1.84 (s, 6H), 1.55 (s, 6H), 0.86 (s, 9H).

EXAMPLE A4

Preparation of Hydroxyphenylbenzotriazole 4b

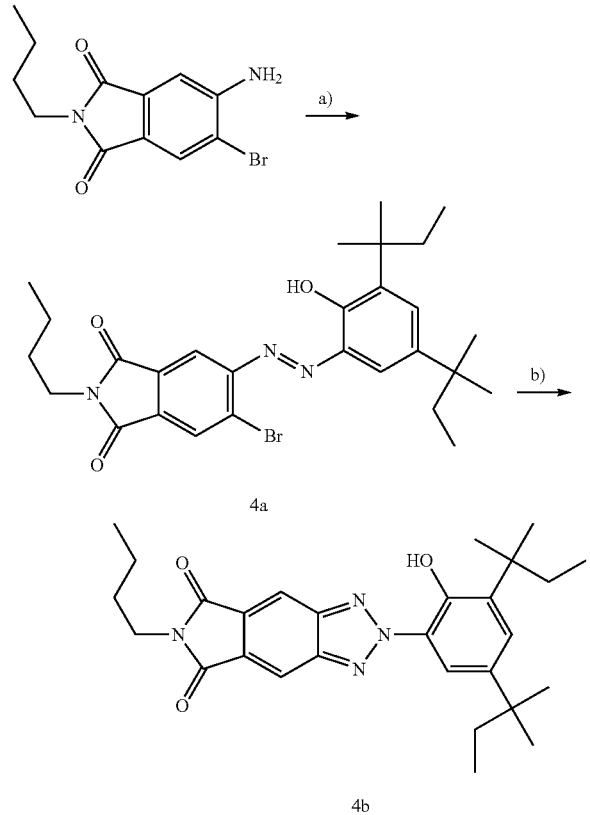

Hydroxyphenylbenzotriazole 4b is prepared similarly to compound 1b via steps a) and b) but from 4-amino-5-bromo-N-butylphtalimide instead.

Compound 4b. Melting point: 138-140° C.

$^1$H-NMR (300 MHz, CDCl$_3$), δ(ppm): 11.32 (s, 1H), 8.43 (s, 2H), 8.25 (d, 1H), 7.36 (d, 1H), 3.78 (t, 2H), 1.99 (m, 2H), 1.75-1.67 (m, 4H), 1.47 (s, 6H), 1.43-1.41 (m, 2H), 1.37 (s, 6H), 0.98 (t, 3H), 0.72-0.67 (dt, 6H).

EXAMPLE A5

Preparation of Hydroxyphenylbenzotriazole 5b
(UVA6)

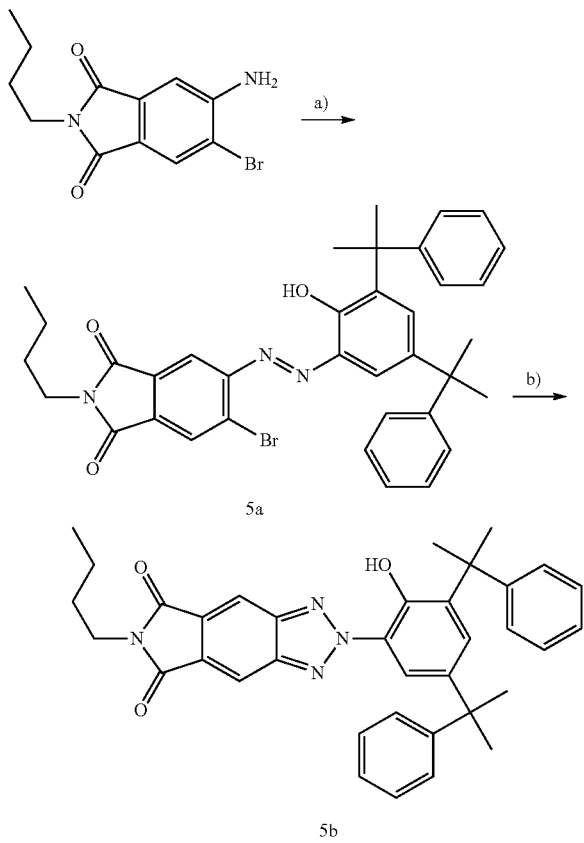

Hydroxyphenylbenzotriazole 5b is prepared similar to compound 1b via steps a) and b) but from 4-amino-5-bromo-N-butylphtalimide instead.

Compound 5b Melting point: 104-106° C.

$^1$H-NMR (300 MHz, CDCl$_3$), δ(ppm): 10.96 (s, 1H), 8.33 (d, 1H), 8.33 (s, 1H), 8.32 (s, 1H), 7.45 (d, 1H), 7.34-7.13 (m, 10H), 3.75 (t, 2H), 1.83 (s, 6H), 1.70 (s, 6H), 1.75-1.63 (m, 2H), 1.46-1.33 (m, 2H), 0.96 (t, 3H).

Application Examples follow. Unless indicated otherwise, all parts and percentages in the disclosure, Examples and claims are by weight.

The following resins are employed in the application Examples.

Resin 1: commercial carboxyl functional acrylic resin having a molecular weight of 5000-7200 Daltons, clear flake, acid number 195-215, equivalent weight 275 and Tg 86° C.

Resin 2: commercial carboxyl functional acrylic resin having a molecular weight of 4000-5000 Daltons, clear flake, acid number 210-225, equivalent weight 261 and Tg 67° C.

Resin 3: commercial carboxyl functional acrylic resin having a molecular weight of 10,000-11,500 Daltons, light yellow clear flake, acid number 67-73, equivalent weight 800 and Tg 62° C.

Resin 4: commercial carboxyl functional acrylic resin having a molecular weight 13,000-15,500 Daltons, light yellow clear flake, acid number 70-80, equivalent weight 748 and Tg 57° C.

Resin 5: commercial carboxyl functional acrylic resin having a molecular weight of 13,100-15,500 Daltons, clear flake, acid number 70-80, equivalent weight 748 and Tg 57° C.

Resin 6: commercial carboxyl functional acrylic resin, clear flake, acid number 48-62, equivalent weight 1020 and Tg 68° C.

Resin 7: commercial hydroxyl functional acrylic polyol, clear flake, hydroxyl number 40-50, equivalent weight 1250 as supplied based on solids and Tg 70° C.

Resin 8: commercial acrylic polyol resin, clear flake, hydroxyl number 88-96, equivalent weight 610 as supplied based on solids and Tg 57° C.

Resin 9: commercial glycidylmethacrylate (GMA) acrylic resin, epoxy equivalent 300-330, melt index >110 g/10 minutes at 125° C. and Tg 40-43° C.

Resin 10: commercial glycidylmethacrylate (GMA) acrylic resin, epoxy equivalent 300-330, melt index >110 g/10 minutes at 125° C. and Tg 41-45° C.

Resin 11: commercial glycidylmethacrylate (GMA) acrylic resin, epoxy equivalent=350-380, melt index 60-80 g/10 minutes at 125° C. and Tg 42-46° C.

Resin 12: commercial glycidylmethacrylate (GMA) acrylic resin, epoxy equivalent 360-400, melt index 50-70 g/10 minutes at 125° C. and Tg 45-50° C.

Resin 13: commercial glycidylmethacrylate (GMA) acrylic resin, Tg 44° C., synthesized in accordance with U.S. Pat. No. 4,042,645.

The UV absorbers and hindered amine light stabilizers are as listed above in the specification.

Fused silica glass rectangular plates with UV transparency are purchased from Specialty Glass Products.

MODAFLOW III is a flow agent, Cytec.

ARALDITE GT, epoxy resins, Huntsman.

ACTIRON NXJ 60 is a catalyst, Protex International.

RAVEN 5000, carbon black, Columbian Chemicals.

LANCOL 362D, Lubrizol.

TI-PURE, titanium dioxide, DuPont.

VESTAGON B-1530, epsilon-caprolactam-blocked polyisocyanate, NCO content 14.8 to 15.7%, Evonik Degussa.

VESTAGON BF-1540, uretdione polyisocyanate, NCO content 11.5 to 13.0%, Evonik Degussa.

URAFLOW B, flow aid, GCA Chemical.

SPECIAL BLACK 4A, carbon black, Evonik Degussa.

RESIFLOW PL200, Estron, a flow and leveling aid based on a liquid acrylic polymer which has been converted into free-flowing powder by adsorption onto silica-type filler.

LUMINA ROYAL EXTERIOR BLUE, BASF, an interference effect pigment.

GLACIER FROST WHITE, BASF, a TiO$_2$ coated mica white effect pigment.

The UV transmission of the comparative and inventive Examples is measured. The present coatings exhibit a transmission of ≤0.1% at 290 nm-360 nm, ≤0.5% transmission at 400 nm and ≤12% transmission at 420 nm (present coatings UV transmission levels).

COMPARATIVE EXAMPLE 1

Clear Powder Coating Formula

| Materials | Parts by Weight |
|---|---|
| Resin 9 | 71.41 |
| dodecanedioic acid | 26.08 |
| MODAFLOW III | 1.00 |
| triphenyltin hydroxide | 1.01 |
| benzoin | 0.50 |
| total | 100 |

The components are blended in a Henschel blender for 30 to 60 seconds. The mixtures are then extruded through an APV MP19PC twin screw extruder at a temperature of 100° C. to 130° C. The extruded material is then ground using a Strand Lab Grinder S-101 to a particle size of 17-27 microns. The finished powder is electrostatically sprayed using a powder spray gun GX 3600M from Onoda onto a fused silica glass plate, backed with aluminum foil for conductivity, to a specified coating thickness. Glass plates having ultraviolet light transparency are obtained from Specialty Glass Products. The coated fused silica glass plate is baked in an oven at 285° F. for 30 minutes. The UV absorbance is measured for the clear coated fused silica glass plate and converted to percent transmission.

| Coating Thickness | % T at 360 nm | % T at 400 nm | % T at 420 nm |
|---|---|---|---|
| 1.85 mil | 87.76 | 90.05 | 89.87 |
| 3.25 mil | 90.12 | 90.65 | 90.85 |
| 5.20 mil | 91.80 | 92.30 | 92.54 |
| 7.05 mil | 87.11 | 87.97 | 87.99 |

This formulation does not achieve the present UV transmission levels after four coating layers.

COMPARATIVE EXAMPLE 2

Clear Powder Coating Formula

Following the procedure of Comparative Example 1, 2-[2-hydroxy-4-[3-(2-ethylhexyl-1-oxy)-2-hydroxypropyloxy]phenyl]-4,6-bis(2,4-dimethylphenyl)-1,3,5-triazine, a commercial UV absorber, is added to the formulation at a concentration of three weight percent relative to resin solids. The UV absorbance is measured for the clear coated fused silica glass plate and converted to percent transmission.

| Coating Thickness | % T at 360 nm | % T at 400 nm | % T at 420 nm |
|---|---|---|---|
| 1.85 mil | 3.03 | 88.76 | 90.00 |
| 3.25 mil | 0.19 | 82.83 | 85.36 |
| 5.20 mil | 0.08 | 80.34 | 84.84 |
| 7.05 mil | 0.06 | 79.57 | 88.26 |

This formulation does not achieve the present UV transmission levels after four coating layers.

COMPARATIVE EXAMPLE 3

Clear Powder Coating Formula

Following the procedure of Comparative Example 1, 2-(2H-benzotriazol-2-yl)-6-(1-methyl-1-phenylethyl)-4-(1,1,3,3-tetramethylbutyl) phenol, a commercial UV absorber, is added to the formulation at a concentration of three weight percent relative to resin solids. The UV absorbance is measured for the clear coated fused silica glass plate and converted to percent transmission.

| Coating Thickness | % T at 360 nm | % T at 400 nm | % T at 420 nm |
|---|---|---|---|
| 1.85 mil | 0.21 | 78.13 | 88.11 |
| 3.25 mil | 0.05 | 68.20 | 89.48 |
| 5.20 mil | 0.03 | 52.55 | 89.62 |
| 7.05 mil | 0.03 | 37.56 | 87.44 |

This formulation does not achieve the present UV transmission levels after four coating layers.

COMPARATIVE EXAMPLE 4

Clear Powder Coating Formula

Following the procedure of Comparative Example 1, 2-(5-chloro-2H-benzotriazol-2-yl)-6-(1,1-dimethylethyl)-4-methylphenol, a commercial red shifted UV absorber, is added to the formulation at a concentration of three weight percent relative to resin solids. The UV absorbance is measured for the clear coated fused silica glass plate and converted to percent transmission.

| Coating Thickness | % T at 360 nm | % T at 400 nm | % T at 420 nm |
|---|---|---|---|
| 1.85 mil | 0.03 | 35.84 | 86.43 |
| 3.25 mil | 0.02 | 14.00 | 84.54 |
| 5.20 mil | 0.01 | 2.88 | 77.55 |
| 7.05 mil | 0.00 | 0.47 | 73.40 |

This formulation does not achieve the present UV transmission levels after four coating layers.

COMPARATIVE EXAMPLE 5

Clear Powder Coating Formula

Following the procedure of Comparative Example 1, 2-(5-chloro-2H-benzotriazol-2-yl)-6-(1,1-dimethylethyl)-4-methylphenol, a commercial red shifted UV absorber, is added to the formulation at a concentration of three weight percent relative to resin solids and hindered amine light stabilizer (8), is added to the formulation at a concentration of 1.5 percent relative to resin solids. The UV absorbance is measured for the clear coated fused silica glass plate and converted to percent transmission.

| Coating Thickness | % T at 360 nm | % T at 400 nm | % T at 420 nm |
|---|---|---|---|
| 1.85 mil | 0.03 | 36.93 | 86.48 |
| 3.25 mil | 0.04 | 14.91 | 84.53 |
| 5.20 mil | 0.01 | 2.96 | 76.40 |
| 7.05 mil | 0.02 | 1.20 | 74.62 |

This formulation does not achieve the present UV transmission levels after four coating layers.

EXAMPLE 1

Clear Powder Coating Formula

Following the procedure of Comparative Example 1, UVA1, a red shifted UV absorber, is added to the formulation at a concentration of three weight percent relative to resin solids. The UV absorbance is measured for the clear coated fused silica glass plate and converted to percent transmission.

| Coating Thickness | % T at 360 nm | % T at 400 nm | % T at 420 nm |
|---|---|---|---|
| 3.25 mil | 0.02 | 0.06 | 11.25 |

This formulation achieves the present UV transmission levels after one coating layer.

EXAMPLE 2

Clear Powder Coating Formula

Following the procedure of Example 1, UVA1, a red shifted UV absorber, is added to the formulation at a concentration of three weight percent relative to resin solids and hindered amine light stabilizer (8), is added to the formulation at a concentration of 1.5 percent relative to resin solids. The UV absorbance is measured for the clear coated fused silica glass plate and converted to percent transmission.

| Coating Thickness | % T at 360 nm | % T at 400 nm | % T at 420 nm |
|---|---|---|---|
| 3.25 mil | 0.02 | 0.04 | 9.61 |

This formulation achieves the present UV transmission levels after one coating layer.

EXAMPLE 3

Clear Powder Coating Formula

Following the procedure of Example 1, UVA1, a red shifted UV absorber, is added to the formulation at a concentration of two weight percent relative to resin solids, 2-[2-Hydroxy-4-[3-(2-ethylhexyl-1-oxy)-2-hydroxypropyloxy]phenyl]-4,6-bis(2,4-dimethylphenyl)-1,3,5-triazine, a commercial UV absorber, is added at a concentration of one weight percent relative to resin solids and hindered amine light stabilizer (8), is added to the formulation at a concentration of 1.5 percent relative to resin solids. The UV absorbance is measured for the clear coated fused silica glass plate and converted to percent transmission.

| Coating Thickness | % T at 360 nm | % T at 400 nm | % T at 420 nm |
|---|---|---|---|
| 5.20 mil | 0.01 | 0.04 | 8.67 |

This formulation achieves the present UV transmission levels after one coating layer.

EXAMPLE 4

Clear Powder Coating Formula

Following the procedure of Example 1, UVA1, a red shifted UV absorber, is added to the formulation at a concentration of two weight percent relative to resin solids, 2-(2H-benzotriazol-2-yl)-6-(1-methyl-1-phenylethyl)-4-(1,1,3,3-tetramethylbutyl) phenol, a commercial UV absorber, is added at a concentration of one weight percent relative to resin solids and hindered amine light stabilizer (8), is added to the formulation at a concentration of 1.5 percent relative to resin solids. The UV absorbance is measured for the clear coated fused silica glass plate and converted to percent transmission.

| Coating Thickness | % T at 360 nm | % T at 400 nm | % T at 420 nm |
|---|---|---|---|
| 5.20 mil | 0.00 | 0.06 | 7.36 |

This formulation achieves the present UV transmission levels after one coating layer.

EXAMPLE 5

Clear Powder Coating Formula

Following the procedure of Example 1, UVA1, a red shifted UV absorber, is added to the formulation at a concentration of two weight percent relative to resin solids, 2-(5-chloro-2H-benzotriazol-2-yl)-6-(1,1-dimethylethyl)-4-methylphenol, a commercial red shifted UV absorber, is added at a concentration of one weight percent relative to resin solids and hindered amine light stabilizer (8), is added to the formulation at a concentration of 1.5 percent relative to resin solids. The UV absorbance is measured for the clear coated fused silica glass plate and converted to percent transmission.

| Coating Thickness | % T at 360 nm | % T at 400 nm | % T at 420 nm |
|---|---|---|---|
| 5.20 mil | 0.02 | 0.07 | 7.08 |

This formulation achieves the present UV transmission levels after one coating layer.

EXAMPLE 6

Clear Powder Coating Formula

Following the procedure of Example 1, UVA1, a red shifted UV absorber, is added to the formulation at a concentration of two weight percent relative to resin solids, 2-(2H-benzotriazol-2-yl)-6-(1-methyl-1-phenylethyl)-4-(1,1,3,3-tetramethylbutyl) phenol, a commercial UV absorber, is added at a concentration of one weight percent relative to resin solids and hindered amine light stabilizer (9), is added to the formulation at a concentration of 1.5 percent relative to resin solids. The UV absorbance is measured for the clear coated fused silica glass plate and converted to percent transmission.

| Coating Thickness | % T at 360 nm | % T at 400 nm | % T at 420 nm |
|---|---|---|---|
| 5.20 mil | 0.01 | 0.05 | 7.78 |

This formulation achieves the present UV transmission levels after one coating layer.

EXAMPLE 7

Clear Powder Coating Formula

Following the procedure of Example 1, UVA1, a red shifted UV absorber, is added to the formulation at a concentration of two weight percent relative to resin solids, 2-(2H-benzotriazol-2-yl)-6-(1-methyl-1-phenylethyl)-4-(1,1,3,3-tetramethylbutyl) phenol, a commercial UV absorber, is added at a concentration of one weight percent relative to resin solids and hindered amine light stabilizer (35), is added to the formulation at a concentration of 1.5 percent relative to resin solids. The UV absorbance is measured for the clear coated fused silica glass plate and converted to percent transmission.

| Coating Thickness | % T at 360 nm | % T at 400 nm | % T at 420 nm |
|---|---|---|---|
| 5.20 mil | 0.01 | 0.05 | 8.18 |

This formulation achieves the present UV transmission levels after one coating layer.

EXAMPLE 8 stabilized Acrylic Hybrid Black Powder Coating Formula

Following the procedure of Example 1, UVA2 is added to the powder formulation listed below at 3 weight percent relative to resin solids and the oligomeric compound which is the condensation product of 4,4'-hexamethylenebis(amino-2,2,6,6-tetramethylpiperidine) and 2,4-dichloro-6-[(2,2,6,6-tetramethylpiperidin-4-yl)butylamino]-s-triazine end-capped with 2-chloro-4,6-bis(dibutylamino)-s-triazine, a hindered amine light stabilizer, is added at a concentration of 2 percent to resin solids.

| Materials | Parts by Weight |
|---|---|
| Resin 1 | 16.65 |
| ARALDITE GT 7013 | 39.90 |
| MODAFLOW III | 1.00 |
| benzoin | 0.50 |
| ACTIRON NXJ 60 | 0.25 |
| RAVEN 5000 | 0.70 |
| LANCOL 362D | 1.00 |
| barytes | 40.00 |
| total | 100.00 |
| Extrusion Parameters (BUSS PLK46) | |
| Zones 1 (kneading screw temperature) | 65° C. |
| Zones 2 (jacket temperature) | 115-120° C. |
| RPM | 200 |

EXAMPLE 9

Stabilized Acrylic Hybrid Pigmented Low Gloss Powder Coating Formula

Following the procedure of Example 1, UVA3 is added to the powder formulation listed below at 3 weight percent and 3-dodecyl-1-(2,2,6,6-tetramethyl-4-piperidyl)pyrrolidin-2,5-dione, a hindered amine light stabilizer, is added at a concentration of 2 weight percent to resin solids.

| Materials | White | Black |
|---|---|---|
| Resin 5 | 23.51 | 0 |
| Resin 2 | 4.59 | 15.99 |
| ARALDITE GT 6063 | 33.57 | 41.84 |
| MODAFLOW III | 0.50 | 1.00 |
| benzoin | 0.30 | 0.50 |
| ACTIRON NXJ 60 | 0.25 | 0 |
| TI-PURE R-960 | 37.28 | 0 |
| barytes | 0 | 40.00 |
| RAVEN 5000 | 0 | 0.67 |
| total | 100 parts | 100 parts |
| Extrusion Parameters (BUSS PLK46) | | |
| Zones 1 (kneading screw temperature) | | 65° C. |
| Zones 2 (jacket temperature) | | 105° C. |
| RPM | | 200 |

EXAMPLE 10 stabilized Acrylic Hybrid Pigmented High Gloss Powder Coating Formula

Following the procedure of Example 1, UVA4 is added to the powder formulation listed below at 4 weight percent and 3-n-octyl-7,7,9,9-tetramethyl-1,3,8-triazaspiro[4.5]decan-2,4-dione, a hindered amine light stabilizer, is added at a concentration of 2 weight percent to resin solids.

| Materials | Parts by Weight |
|---|---|
| Resin 3 | 33.25 |
| ARALDITE GT 6063 | 24.85 |
| MODAFLOW III | 0.70 |
| benzoin | 0.30 |
| TI-PURE R-960 | 37.07 |
| ACTIRON NXJ 60 | 0.23 |
| total | 100.00 |
| Formulation Attributes | |
| Pigment:Binder ratio | 0.60 |
| Acrylic:Epoxy ratio | 54:46 |

Extrusion Parameters

| BUSS PLK46 | APV 19 MM Twin Screw |
|---|---|
| Zones 1, 2 = 60° C., 105° C. | Zones 1, 2, 3, 4 = 25° C., 60° C., 105° C., 105° C. |
| RPM 200 | RPM 300 |

EXAMPLE 11

Stabilized Acrylic Hybrid Pigmented High & Low Gloss Powder Coating Formula

Following the procedure of Example 1, UVA2 is added to the powder formulation listed below at 3 weight percent and 1,1'-(1,2-ethanediyl)-bis(3,3,5,5-tetramethylpiperazinone), a hindered amine light stabilizer, is added at a concentration of 1 percent to resin solids.

| Materials | High Gloss Parts by Weight | Low Gloss Parts by Weight |
|---|---|---|
| Resin 4 | 33.30 | 23.47 |
| Resin 2 | 0.00 | 4.59 |
| ARALDITE GT 6063 | 30.40 | 33.48 |
| MODAFLOW III | 1.00 | 1.00 |
| benzoin | 0.30 | 0.30 |
| TI-PURE R-960 | 35.00 | 37.16 |
| total | 100.00 | 100.00 |

|                        | High Gloss | Low Gloss |
|---|---|---|
| Formulation Attributes | | |
| Pigment:Binder ratio   | 0.60  | 0.60  |
| Acrylic:Epoxy ratio    | 52:48 | 46:54 |
| Catalyst level on TRS  | 0.23% | 0.23% |
| Extrusion Parameters   | | |
| BUSS PLK46             | APV 19 MM Twin Screw | |
| Zones 1, 2 = 60° C., 105° C. | Zones 1, 2, 3, 4 = 25° C., 60° C., 105° C., 105° C. | |
| RPM 200                | RPM 300 | |

TRS = Total Resin Solids

EXAMPLE 12

Stabilized Acrylic Hybrid Pigmented High & Low Gloss Powder Coating Formula

Following the procedure of Example 1, UVA5 is added to the powder formulation listed below at 4 weight percent and tris(2,2,6,6-tetramethyl-4-piperidyl) nitrilotriacetate, a hindered amine light stabilizer, is added at a concentration of 2 percent to resin solids.

| Materials | High Gloss Parts by Weight | Low Gloss Parts by Weight |
|---|---|---|
| Resin 5         | 32.09  | 24.65  |
| Resin 2         | 0.00   | 3.69   |
| ARALDITE GT 6063| 29.39  | 33.15  |
| MODAFLOW III    | 1.00   | 1.00   |
| benzoin         | 0.30   | 0.30   |
| TI-PURE R-960   | 36.99  | 36.99  |
| ACTIRON NXJ 60  | 0.23   | 0.23   |
| total           | 100.00 | 100.00 |

|                        | High Gloss | Low Gloss |
|---|---|---|
| Formulation Attributes | | |
| Pigment:Binder ratio   | 0.60  | 0.60   |
| Acrylic:Epoxy ratio    | 52:48 | 40:6:54|
| Catalyst level on TRS  | 0.24% | 0.24%  |
| Extrusion Parameters   | | |
| BUSS PLK46             | APV 19 MM Twin Screw | |
| Zones 1, 2 = 60° C., 105° C. | Zones 1, 2, 3, 4 = 25° C., 60° C., 105° C., 105° C. | |
| RPM 200                | RPM 300 | |

TRS = Total Resin Solids

EXAMPLE 13

Stabilized Acrylic Hybrid Pigmented Powder Coating Formula

Following the procedure of Example 1, UVA6 is added to the powder formulation listed below at 5 weight percent and bis(1-octyloxy-2,2,6,6-tetramethylpiperidyl) succinate, a hindered amine light stabilizer, is added at a concentration of 2 percent to resin solids.

| Materials | Parts by Weight |
|---|---|
| Resin 6         | 36.67 |
| ARALDITE GT 6063| 24.80 |
| MODAFLOW III    | 1.00  |
| benzoin         | 0.30  |
| TI-PURE R-960   | 37.00 |
| ACTIRON NXJ 60  | 0.23  |
| total           | 100.00|

| Formulation Attributes | |
|---|---|
| Pigment:Binder ratio   | 0.60  |
| Acrylic:Epoxy ratio    | 60:40 |
| Catalyst level on TRS  | 0.23% |
| Extrusion Parameters   | |
| BUSS PLK46             | APV 19 MM Twin Screw |
| Zones 1, 2 = 60° C., 105° C. | Zones 1, 2, 3, 4 = 25° C., 60° C., 105° C., 105° C. |
| RPM 200                | RPM 300 |

TRS = Total Resin Solids

EXAMPLE 14

Stabilized Polyurethane Pigmented High Gloss Powder Coating Formula

Following the procedure of Example 1, UVA6 is added to the powder formulation listed below at 4 weight percent and di-(1,2,2,6,6-pentamethylpiperidin-4-yl) p-methoxybenzylidenemalonate, a hindered amine light stabilizer, is added at a concentration of 2 percent to resin solids.

| Materials | High Gloss White | High Gloss Black |
|---|---|---|
| Resin 7            | 50.40  | 79.14  |
| VESTAGON B-1530    | 11.00  | 17.36  |
| MODAFLOW Powder III| 1.20   | 1.20   |
| URAFLOW B          | 0.60   | 0.80   |
| TI-PURE R-960      | 36.80  | 0      |
| SPECIAL BLACK 4A   | 0      | 1.50   |
| total              | 100.00 | 100.00 |

EXAMPLE 15

Stabilized Polyurethane Clear High Gloss Powder Coating Formula

Following the procedure of Example 1, UVA7 is added to the powder formulation listed below at 4 weight percent and 1-(2-hydroxy-2-methylpropoxy)-4-octadecanoyloxy-2,2,6,6-tetramethylpiperidine, a hindered amine light stabilizer, is added at a concentration of 2 percent to resin solids.

| Materials | High Gloss Clear |
|---|---|
| Resin 7             | 80.30  |
| VESTAGON BF-1540    | 17.70  |
| MODAFLOW Powder III | 1.20   |
| URAFLOW B           | 0.80   |
| total               | 100.00 |

EXAMPLE 16

Stabilized Polyurethane Tinted High Gloss Powder Coating Formula

Following the procedure of Example 1, UVA8 is added to the powder formulation listed below at 4 weight percent and 1-(2-hydroxy-2-methylpropoxy)-4-octadecanoyloxy-2,2,6,6-tetramethylpiperidine, a hindered amine light stabilizer, is added at a concentration of 2 percent to resin solids.

| Materials | Weight |
|---|---|
| Resin 8 | 65.30 |
| VESTAGON B-1530 | 30.70 |
| MODAFLOW Powder III | 2.00 |
| URAFLOW B | 0.67 |
| SPECIAL BLACK 4A | 1.33 |
| total | 100.00 |
| Formulation Constants | |
| PVC | 1.0% |
| Gel time at 200° C. | 45 seconds |
| NCO:OH ratio | 1:1 |
| Extrusion Parameters (Buss PLK 46) | |
| Zone 1 (kneading screw temperature) | 50° C. |
| Zone 2 (jacket temperature) | 90° C. |
| RPM | 200 |

EXAMPLE 17

Stabilized Polyurethane Tinted Clear High Gloss Powder Coating Formula

Following the procedure of Example 1, UVA1 is added to the powder formulation listed below at 4 weight percent and 1-(2-hydroxy-2-methylpropoxy)-4-octadecanoyloxy-2,2,6,6-tetramethylpiperidine, a hindered amine light stabilizer, is added at a concentration of 2 percent to resin solids.

| Materials | Weight |
|---|---|
| Resin 8 | 65.30 |
| VESTAGON BF-1540 | 30.70 |
| MODAFLOW Powder III | 2.00 |
| URAFLOW B | 0.67 |
| SPECIAL BLACK 4A | 1.33 |
| total | 100.00 |
| Formulation Constants | |
| PVC | 1.0% |
| Gel time at 200° C. | 45 seconds |
| NCO:OH ratio | 1:1 |
| Extrusion Parameters (Buss PLK 46) | |
| Zone 1 (kneading screw temperature) | 50° C. |
| Zone 2 (jacket temperature) | 90° C. |
| RPM | 200 |

EXAMPLE 18

Stabilized Tinted Clear Powder Coating Formula

| Materials | Parts by Weight |
|---|---|
| polyester resin[1] | 350.5 |
| curing agent[2] | 66.85 |
| RESIFLOW PL200 | 5.3 |
| blanc fixe | 53.35 |
| benzoin | 2.45 |
| UVA1 | 7.35 |
| further UVA[3] | 3.7 |
| HALS (8) | 5.5 |
| pigment[4] | 5.0 |
| total | 500 |

[1]hydroxy functional polyester curable with blocked polyisocyantes, Tg ca. 56° C., OH value mg KOH/g ca. 40, viscosity mPa*s cone & plate @ 200° C., 3700-4900, acid value mg KOH/g ca. 15 (max)
[2]polymeric aliphatic isocyanate based on isophorone diisocyanate blocked with ε-caprolactam
[3]2-(2-hydroxy-3-α-cumyl-5-t-octylphenyl)-2H-benzotriazole
[4]LUMINA ROYAL EXTERIOR BLUE 6803H The components are blended in a Henschel blender for 10 minutes. The mixtures are then extruded through an APV MP19PC twin screw extruder at a temperature of 225° F. with drive screws set at 200 rpm. The extruded material is then ground using a Strand Lab Grinder S-101 to a particle size of 17-27 microns. The finished powder is electrostatically sprayed using a powder spray gun GX 3600M from Onoda onto a carbon fiber reinforced plastic panel obtained from Carbon Fiber Gear, backed with aluminum foil for conductivity, to a coating thickness of 5 mil. The coated carbon fiber reinforced plastic part is baked in an oven at 204° C. for 10 minutes. The following film properties are measured using a BYK color meter. CIE Lab color is L=39.09, a=−3.0, b is −7.19. Twenty (20) degree gloss is 86.1 and 60 degree gloss is 92.8.

EXAMPLE 19

Stabilized Tinted Clear Powder Coating Formula

| Materials | Parts by Weight |
|---|---|
| polyester resin[1] | 350.5 |
| curing agent[2] | 66.85 |
| RESIFLOW PL200 | 5.3 |
| blanc fixe | 53.35 |
| benzoin | 2.45 |
| UVA1 | 7.35 |
| further UVA[3] | 3.7 |
| HALS (8) | 5.5 |
| pigment[4] | 5.0 |
| total | 500 |

[1]hydroxy functional polyester curable with blocked polyisocyantes, Tg ca. 56° C., OH value mg KOH/g ca. 40, viscosity mPa*s cone & plate @ 200° C., 3700-4900, acid value mg KOH/g ca. 15 (max)
[2]polymeric aliphatic isocyanate based on isophorone diisocyanate blocked with ε-caprolactam
[3]2-(2-hydroxy-3-α-cumyl-5-t-octylphenyl)-2H-benzotriazole
[4]GLACIER FROST WHITE S1303D The components are blended in a Henschel blender for 10 minutes. The mixtures are then extruded through an APV MP19PC twin screw extruder at a temperature of 225° F. with drive screws set at 200 rpm. The extruded material is then ground using a Strand Lab Grinder S-101 to a particle size of 17-27 microns. The finished powder is electrostatically sprayed using a powder spray gun GX 3600M from Onoda onto a carbon fiber reinforced plastic panel obtained from Carbon Fiber Gear, backed with aluminum foil for conductivity, to a coating thickness of 5 mil. The coated carbon fiber reinforced plastic part is baked in an oven at 204° C. for 10 minutes. The following film properties are measured using a BYK color meter. CIE Lab color is L=48.5, a=−5.93, b is 3.09. Twenty (20) degree gloss is 68.0 and 60 degree gloss is 84.8.

EXAMPLE 20

Stabilized Tinted Clear Powder Coating Formula

| Materials | Parts by Weight |
| --- | --- |
| polyester resin[1] | 346.5 |
| curing agent[2] | 65.85 |
| RESIFLOW PL200 | 5.3 |
| blanc fixe | 53.35 |
| benzoin | 2.45 |
| UVA1 | 7.35 |
| further UVA[3] | 3.7 |
| HALS (9) | 5.5 |
| pigment[4] | 10.0 |
| total | 500 |

[1]hydroxy functional polyester curable with blocked polyisocyantes, Tg ca. 56° C., OH value mg KOH/g ca. 40, viscosity mPa*s cone & plate @ 200° C., 3700-4900, acid value mg KOH/g ca. 15 (max)
[2]polymeric aliphatic isocyanate based on isophorone diisocyanate blocked with ε-caprolactam
[3]2-(2-hydroxy-3-α-cumyl-5-t-octylphenyl)-2H-benzotriazole
[4]LUMINA ROYAL EXTERIOR BLUE 6803H The components are blended in a Henschel blender for 10 minutes. The mixtures are then extruded through an APV MP19PC twin screw extruder at a temperature of 225° F. with drive screws set at 200 rpm. The extruded material is then ground using a Strand Lab Grinder S-101 to a particle size of 17-27 microns. The finished powder is electrostatically sprayed using a powder spray gun GX 3600M from Onoda onto a carbon fiber reinforced plastic panel obtained from Carbon Fiber Gear, backed with aluminum foil for conductivity, to a coating thickness of 5 mil. The coated carbon fiber reinforced plastic part is baked in an oven at 204° C. for 10 minutes. The following film properties are measured using a BYK color meter. CIE Lab color is L=37.33, a=−2.88, b is −4.68. Twenty (20) degree gloss is 78.0 and 60 degree gloss is 88.4.

EXAMPLE 21

Stabilized Tinted Clear Powder Coating Formula

| Materials | Parts by Weight |
| --- | --- |
| polyester resin[1] | 350.5 |
| curing agent[2] | 66.85 |
| RESIFLOW PL200 | 5.3 |
| blanc fixe | 53.35 |
| benzoin | 2.45 |
| UVA1 | 7.35 |
| further UVA[3] | 3.7 |
| HALS (9) | 5.5 |
| pigment[4] | 5.0 |
| total | 500 |

[1]hydroxy functional polyester curable with blocked polyisocyantes, Tg ca. 56° C., OH value mg KOH/g ca. 40, viscosity mPa*s cone & plate @ 200° C., 3700-4900, acid value mg KOH/g ca. 15 (max)
[2]polymeric aliphatic isocyanate based on isophorone diisocyanate blocked with ε-caprolactam
[3]2-(2-hydroxy-3-α-cumyl-5-t-octylphenyl)-2H-benzotriazole
[4]GLACIER FROST WHITE S1303D The components are blended in a Henschel blender for 10 minutes. The mixtures are then extruded through an APV MP19PC twin screw extruder at a temperature of 225° F. with drive screws set at 200 rpm. The extruded material is then ground using a Strand Lab Grinder S-101 to a particle size of 17-27 microns. The finished powder is electrostatically sprayed using a powder spray gun GX 3600M from Onoda onto a carbon fiber reinforced plastic panel obtained from Carbon Fiber Gear, backed with aluminum foil for conductivity, to a coating thickness of 5 mil. The coated carbon fiber reinforced plastic part is baked in an oven at 204° C. for 10 minutes. The following film properties are measured using a BYK color meter. CIE Lab color is L=40.88 a=−3.28, b is 1.53. Twenty (20) degree gloss is 82.1 and 60 degree gloss is 91.6.

EXAMPLE 22

Stabilized Tinted Clear Powder Coating Formula

| Materials | Parts by Weight |
| --- | --- |
| polyester resin[1] | 346.5 |
| curing agent[2] | 65.85 |
| RESIFLOW PL200 | 5.3 |
| blanc fixe | 53.35 |
| benzoin | 2.45 |
| UVA1 | 7.35 |
| further UVA[3] | 3.7 |
| HALS (35) | 5.5 |
| pigment[4] | 10.0 |
| total | 500 |

[1]hydroxy functional polyester curable with blocked polyisocyantes, Tg ca. 56° C., OH value mg KOH/g ca. 40, viscosity mPa*s cone & plate @ 200° C., 3700-4900, acid value mg KOH/g ca. 15 (max)
[2]polymeric aliphatic isocyanate based on isophorone diisocyanate blocked with ε-caprolactam
[3]2-(2-hydroxy-3-α-cumyl-5-t-octylphenyl)-2H-benzotriazole
[4]LUMINA ROYAL EXTERIOR BLUE 6803H The components are blended in a Henschel blender for 10 minutes. The mixtures are then extruded through an APV MP19PC twin screw extruder at a temperature of 225° F. with drive screws set at 200 rpm. The extruded material is then ground using a Strand Lab Grinder S-101 to a particle size of 17-27 microns. The finished powder is electrostatically sprayed using a powder spray gun GX 3600M from Onoda onto a carbon fiber reinforced plastic panel obtained from Carbon Fiber Gear, backed with aluminum foil for conductivity, to a coating thickness of 5 mil. The coated carbon fiber reinforced plastic part is baked in an oven at 204° C. for 10 minutes. The following film properties are measured using a BYK color meter. CIE Lab color is L=36.53, a=−1.81, b is −7.89. Twenty (20) degree gloss is 83.6 and 60 degree gloss is 91.8.

EXAMPLE 23

Stabilized Tinted Clear Powder Coating Formula

| Materials | Parts by Weight |
| --- | --- |
| polyester resin[1] | 350.5 |
| curing agent[2] | 66.85 |
| RESIFLOW PL200 | 5.3 |
| blanc fixe | 53.35 |
| benzoin | 2.45 |
| UVA1 | 7.35 |
| further UVA[3] | 3.7 |

-continued

| Materials | Parts by Weight |
|---|---|
| HALS (35) | 5.5 |
| pigment[4] | 5.0 |
| total | 500 |

[1]hydroxy functional polyester curable with blocked polyisocyantes, Tg ca. 56° C., OH value mg KOH/g ca. 40, viscosity mPa*s cone & plate @ 200° C., 3700-4900, acid value mg KOH/g ca. 15 (max)
[2]polymeric aliphatic isocyanate based on isophorone diisocyanate blocked with ε-caprolactam
[3]2-(2-hydroxy-3-α-cumyl-5-t-octylphenyl)-2H-benzotriazole
[4]GLACIER FROST WHITE S1303D The components are blended in a Henschel blender for 10 minutes. The mixtures are then extruded through an APV MP19PC twin screw extruder at a temperature of 225° F. with drive screws set at 200 rpm. The extruded material is then ground using a Strand Lab Grinder S-101 to a particle size of 17-27 microns. The finished powder is electrostatically sprayed using a powder spray gun GX 3600M from Onoda onto a carbon fiber reinforced plastic panel obtained from Carbon Fiber Gear, backed with aluminum foil for conductivity, to a coating thickness of 5 mil. The coated carbon fiber reinforced plastic part is baked in an oven at 204° C. for 10 minutes. The following film properties are measured using a BYK color meter. CIE Lab color is L=41.89 a=−4.09, b is 1.79. Twenty (20) degree gloss is 77.1 and 60 degree gloss is 88.1.

The invention claimed is:

1. A composition comprising a carbon fiber reinforced plastic part and a coating layer in adherence thereto,
  wherein a single layer of the coating layer is from about 2 mil to about 10 mil thick and the coating layer is a cured powder coating formulation comprising
  a) a powder coating resin,
  b) a red-shifted hydroxyphenylbenzotriazole ultraviolet light absorber,
  c) a hindered amine light stabilizer and optionally
  d) a compound selected from the group consisting of further ultraviolet light absorbers, phenolic antioxidants and organic or inorganic pigments,
  where the red-shifted hydroxyphenylbenzotriazoles are of formulae (I) or (II)

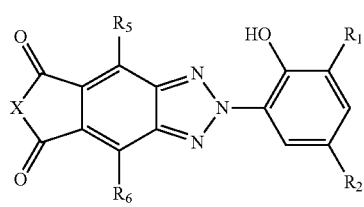

(I)

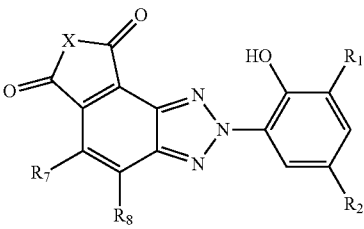

(II)

wherein
  $R_1$ is hydrogen, straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms; or
  $R_1$ is a group

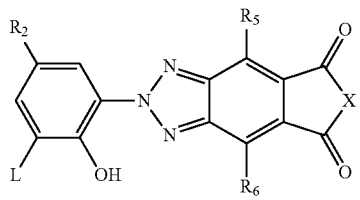

or a group

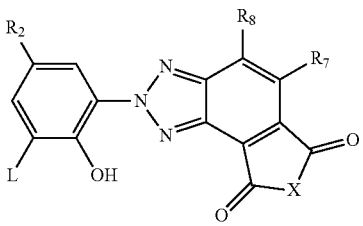

wherein L is alkylene of 1 to 12 carbon atoms, alkylidene of 2 to 12 carbon atoms, benzylidene, p-xylylene or cycloalkylene of 5 to 7 carbon atoms;
  $R_2$ is straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or
  said alkyl substituted by one or more —OH, —OCO—$R_{11}$, —$OR_{14}$, —NCO or —$NH_2$ groups or mixtures thereof, or said alkyl or said alkenyl interrupted by one or more —O—, —NH— or —$NR_{14}$ groups or mixtures thereof and which can be unsubstituted or substituted by one or more —OH, —$OR_{14}$ or —$NH_2$ groups or mixtures thereof; where
  $R_{11}$ is hydrogen, straight or branched chain $C_1$-$C_{18}$ alkyl, $C_5$-$C_{12}$ cycloalkyl, straight or branched chain $C_3$-$C_8$ alkenyl, phenyl, naphthyl or $C_7$-$C_{15}$ phenylalkyl; and
  $R_{14}$ is hydrogen, straight or branched chain alkyl of 1 to 24 carbon atoms; or
  $R_2$ is —$OR_{14}$, a group —C(O)—O—$R_{14}$, —C(O)—$NHR_{14}$ or —C(O)—$NR_{14}R'_{14}$ wherein $R'_{14}$ has the same meaning as $R_{14}$; or
  $R_2$ is —$SR_{13}$, —$NHR_{13}$ or —$N(R_{13})_2$; or
  $R_2$ is —$(CH_2)_m$—CO—$X_1$—$(Z)_p$—Y—$R_{15}$ wherein
  $X_1$ is —O— or —$N(R_{16})$—,
  Y is —O— or —$N(R_{17})$— or a direct bond,
  Z is $C_2$-$C_{12}$-alkylene, $C_4$-$C_{12}$alkylene interrupted by one to three nitrogen atoms, oxygen atoms or a mixture thereof, or is $C_3$-$C_{12}$ alkylene, butenylene, butynylene, cyclohexylene or phenylene, each of which may be additionally substituted by a hydroxyl group;

or a group

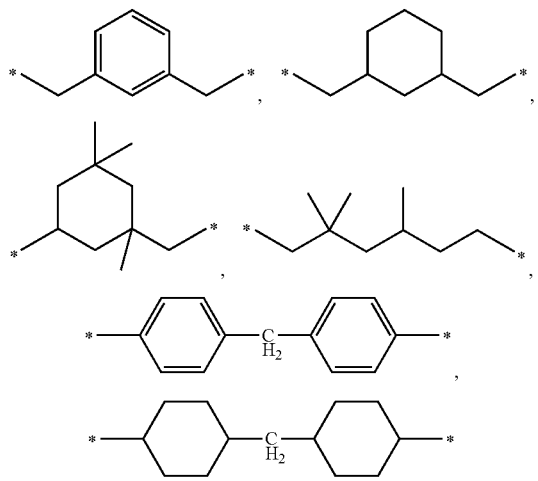

wherein * denotes a bond; or when Y is a direct bond, Z can additionally also be a direct bond;

m is zero, 1 or 2, p is 1, or p is also zero when X and Y are —N(R$_{16}$)— and —N(R$_{17}$)—, respectively, R$_{15}$ is hydrogen, C$_1$-C$_{12}$ alkyl, a group

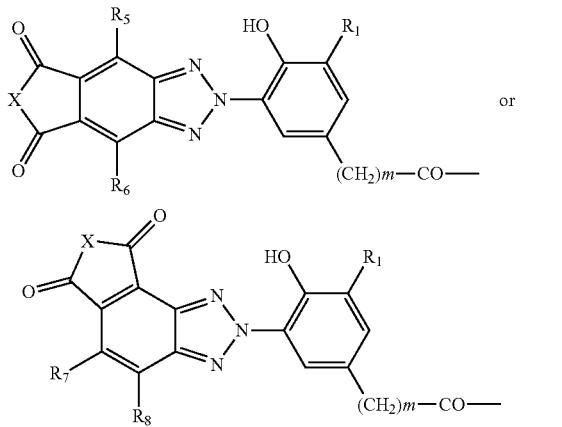

or a group —CO—C(R$_{18}$)═C(H)R$_{19}$ or, when Y is —N(R$_{17}$)—, forms together with R$_{17}$ a group —CO—CH═CH—CO— wherein R$_{18}$ is hydrogen or methyl and R$_{19}$ is hydrogen, methyl or —CO—X$_1$—R$_{20}$, wherein —R$_{20}$ is hydrogen, C$_1$-C$_{12}$ alkyl or a group of formulae

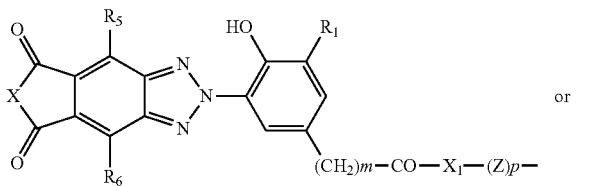

or

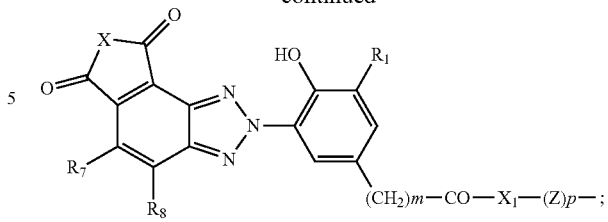

R$_5$, R$_6$, R$_7$ and R$_8$ are independently hydrogen, halogen, CN, NO$_2$ or NH$_2$;

R$_{13}$ is alkyl of 1 to 20 carbon atoms, hydroxyalkyl of 2 to 20 carbon atoms, alkenyl of 3 to 18 carbon atoms, cycloalkyl of 5 to 12 carbon atoms, phenylalkyl of 7 to 15 carbon atoms, phenyl or naphthyl, which both may be substituted by one or two alkyl of 1 to 4 carbon atoms;

R$_{16}$ and R$_{17}$ independently of one another are hydrogen, C$_1$-C$_{12}$-alkyl, C$_3$-C$_{12}$-alkyl interrupted by 1 to 3 oxygen atoms, or is cyclohexyl or C$_7$-C$_{15}$ phenylalkyl and R$_{16}$ together with R$_{17}$ in the case where Z is ethylene, also forms ethylene;

X is O or NE$_1$ wherein

E$_1$ is hydrogen, straight or branched chain C$_1$-C$_{24}$ alkyl, straight or branched chain C$_2$-C$_{18}$ alkenyl, C$_2$-C$_6$ alkyinyl, C$_5$-C$_{12}$ cycloalkyl, phenyl, naphthyl or C$_7$C$_{15}$ phenylalkyl; or said straight or branched chain C$_1$-C$_{24}$ alkyl, straight or branched chain C$_2$-C$_{24}$ alkenyl, C$_5$-C$_{12}$ cycloalkyl, C$_2$-C$_6$ alkynyl can be substituted by one or more —F, —OH, —OR$_{22}$, —NH$_2$, —NHR$_{22}$, —N(R$_{22}$)$_2$, —NHCOR$_{23}$, —NR$_{22}$COR$_{23}$, —OCOR$_{24}$, —COR$_{25}$, —SO$_2$R$_{26}$, —PO(R$_{27}$)$_n$(R$_{28}$)$_{2-n}$, —Si(R$_{29}$)$_n$(R$_{30}$)$_{3-n}$, —Si(R$_{22}$)$_3$, —N$^+$(R$_{22}$)$_3$A$^-$, —S$^+$(R$_{22}$)$_{24}^-$, -oxiranyl groups or mixtures thereof; said straight or branched chain C$_1$-C$_{24}$ alkyl, straight or branched chain unsubstituted or substituted C$_2$-C$_{24}$ alkenyl, C$_5$-C$_{12}$ cycloalkyl or C$_2$-C$_6$ alkynyl can also be interrupted by one or more —O—, —S—, —NH— or —NR$_{22}$— groups or combinations thereof;

said phenyl, naphthyl or C$_7$-C$_{15}$ phenylalkyl can also be substituted by one or more halogen, —CN, —CF$_3$, —NO$_2$, —NHR$_{22}$, —N(R$_{22}$)$_2$, —SO$_2$R$_{26}$, —PO(R$_{27}$)$_n$(R)$_n$(R$_{28}$)$_{2-n}$, —OH, —OR$_{22}$, —COR$_{25}$, —R$_{25}$;

wherein n is 0, 1 or 2;

R$_{22}$ is straight or branched chain C$_1$—C$_{18}$ alkyl, straight or branched chain C$_2$—C$_{18}$ alkenyl, C$_5$-C$_{10}$ cycloalkyl, phenyl or naphthyl, C$_7$-C$_{15}$ phenylalkyl, or two R$_{22}$ when attached to an N or Si atom can form together with the atom to which they are bonded a pyrrolidine, piperidine or morpholine ring;

R$_{23}$ is hydrogen, OR$_{22}$, NHR$_{22}$, N(R$_{22}$)$_2$ or has the same meaning as R$_{22}$, R$_{24}$ is OR$_{22}$, NHR$_{22}$, N(R$_{22}$)$_2$ or has the same meaning as R$_{22}$, R$_{25}$ is hydrogen, OH, OR$_{22}$, NHR$_{22}$ or N(R$_{22}$)$_2$, O-glycidyl or has the same meaning as R$_{22}$, R$_{26}$ is OH, OR$_{22}$, NHR$_{22}$ or N(R$_{22}$)$_2$, R$_{27}$ is NH$_2$, NHR$_{22}$ or N(R$_{22}$)$_2$, R$_{28}$ is OH or OR$_{22}$, R$_{29}$ is Cl or OR$_{22}$, R$_{30}$ is straight or branched chain C$_1$-C$_{18}$ alkyl; or $E_1$ is a group

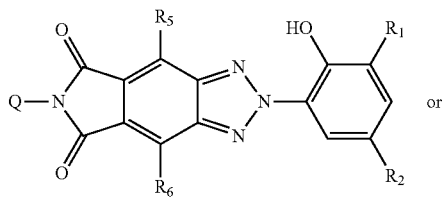

or

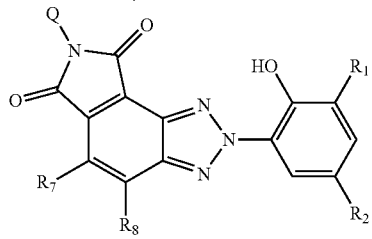

wherein
$R_1$ to $R_8$ have the meanings as defined above and
Q is straight or branched $C_2$-$C_{12}$alkylene, $C_2$-$C_{12}$alkylene, which is interrupted by one or more —O—, NH or $NR_{14}$ atoms, $C_5$-$C_{10}$ cycloalkylene, para-phenylene or a group

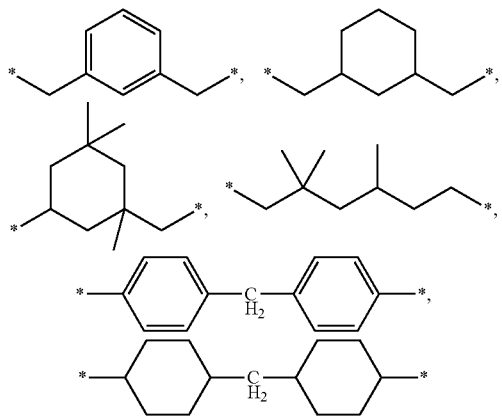

wherein * denotes a bond.

2. A composition according to claim 1 where in the compounds of formulae (I) or (II),
$R_1$ is hydrogen, straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms; or
$R_1$ is a group

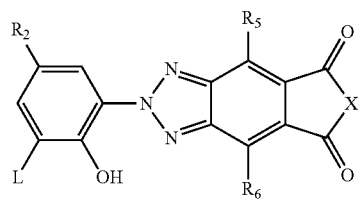

or a group

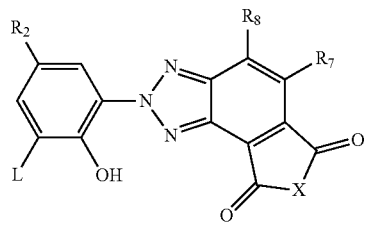

wherein L is alkylene of 1 to 12 carbon atoms, alkylidene of 2 to 12 carbon atoms, benzylidene, p-xylylene or cycloalkylene of 5 to 7 carbon atoms;
$R_2$ is straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or
$R_2$ is —$(CH_2)_m$—CO—$X_1$—$(Z)_p$—Y—$R_{15}$ wherein
$X_1$ is —O—,
Y is —O— or a direct bond,
Z is $C_2$-$C_{12}$-alkylene, $C_4$-$C_{12}$ alkylene interrupted by one to three nitrogen atoms, oxygen atoms or a mixture thereof, or when Y is a direct bond, Z can additionally also be a direct bond;
m is 2,
p is 1,
$R_{15}$ is hydrogen, $C_1$-$C_{12}$ alkyl or a group

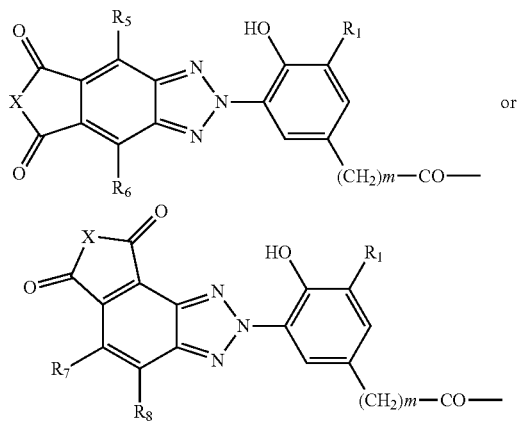

$R_5$, $R_6$, $R_7$ and $R_8$ are independently hydrogen, Cl or Br;
X is O or $NE_1$ wherein
$E_1$ is hydrogen, straight or branched chain $C_1$-$C_{24}$ alkyl, straight or branched chain $C_2$-$C_{18}$ alkenyl, $C_2$-$C_6$ alkynyl, $C_5$-$C_{12}$ cycloalkyl, phenyl, naphthyl or $C_7$-$C_{15}$ phenylalkyl; or said straight or branched chain $C_1$-$C_{24}$ alkyl, straight or branched chain $C_2$-$C_{24}$ alkenyl, $C_5$-$C_{12}$ cycloalkyl, $C_2$-$C_6$ alkynyl can be substituted by one or more —F, —OH, —$OR_{22}$, —$NH_2$, —$NHR_{22}$, —N$(R_{22})_2$, —$NHCOR_{23}$, —$NR_{22}COR_{23}$, —$OCOR_{24}$, —$COR_{25}$, —$SO_2R_{26}$, —$PO(R_{27})_n(R_{28})_{2-n}$, —$Si(R_{29})_n(R_{30})_{3-n}$, —$Si(R_{22})_3$, —$N^+(R_{22})_3A^-$, —$S^+(R_{22})_2A^-$, -oxiranyl groups or mixtures thereof; said straight or branched chain $C_1$-$C_{24}$ alkyl, straight or branched chain unsubstituted or substituted $C_2$-$C_{24}$ alkenyl, $C_5$-$C_{12}$ cycloalkyl or $C_2$-$C_6$ alkynyl can also be interrupted by one or more —O—, —S—, —NH— or —$NR_{22}$— groups or combinations thereof;

said phenyl, naphthyl or $C_7$-$C_{15}$ phenylalkyl can also be substituted by one or more halogen, —CN, —$CF_3$, —$NO_2$, —$NHR_{22}$, —$N(R_{22})_2$—$SO_2R_{26}$, —$PO(R_{27})_n(R_{28})_{2-n}$, —OH, —$OR_{22}$, —$COR_{25}$, —$R_{25}$; wherein n is 0, 1 or 2;

$R_{22}$ is straight or branched chain $C_1$-$C_{18}$ alkyl, straight or branched chain $C_2$-$C_{18}$ alkenyl, $C_5$-$C_{10}$ cycloalkyl, phenyl or naphthyl, $C_7$-$C_{15}$ phenylalkyl, or two $R_{22}$ when attached to an N or Si atom can form together with the atom to which they are bonded a pyrrolidine, piperidine or morpholine ring;

$R_{23}$ is hydrogen, $OR_{22}$, $NHR_{22}$, $N(R_{22})_2$ or has the same meaning as $R_{22}$, $R_{24}$ is $OR_{22}$, $NHR_{22}$, $N(R_{22})_2$ or has the same meaning as $R_{22}$, $R_{25}$ is hydrogen, OH, $OR_{22}$, $NHR_{22}$ or $N(R_{22})_2$, O-glycidyl or has the same meaning as $R_{22}$, $R_{26}$ is OH, $OR_{22}$, $NHR_{22}$ or $N(R_{22})_2$, $R_{27}$ is $NH_2$, $NHR_{22}$ or $N(R_{22})_2$, $R_{28}$ is OH or $OR_{22}$, $R_{29}$ is Cl or $OR_{22}$, $R_{30}$ is straight or branched chain $C_1$-$C_{18}$ alkyl; or $E_1$ is a group

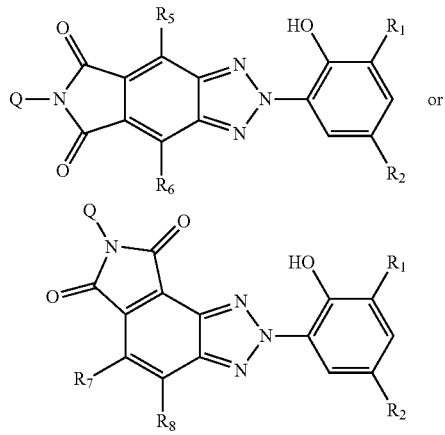

wherein $R_1$ to $R_8$ have the meanings as defined above and

Q is straight or branched $C_2$-$C_{12}$ alkylene, $C_5$-$C_{10}$ cycloalkylene, para-phenylene or a group,

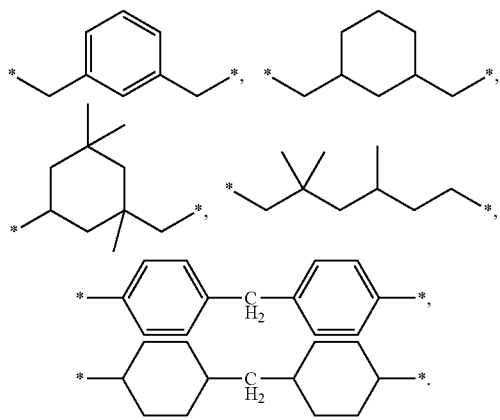

3. A composition according to claim 1 where in the compounds of formula (I) or (II), $R_1$ is hydrogen, straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms, $R_2$ is straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or $R_2$ is —$(CH_2)_2$—CO—O—(Z)—O—$R_{15}$ wherein Z is $C_2$-$C_{12}$-alkylene, $C_4$-$C_{12}$ alkylene interrupted by one to three oxygen atoms;

$R_{15}$ is hydrogen, $C_1$-$C_{12}$ alkyl or a group

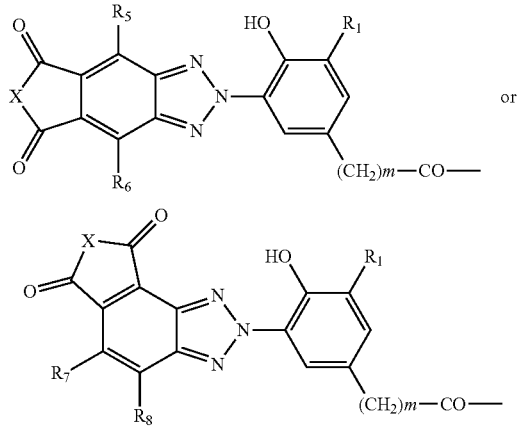

$R_5$, $R_6$, $R_7$ and $R_8$ are independently hydrogen, Cl or Br;

X is O or $NE_1$ wherein $E_1$ is hydrogen, straight or branched chain $C_1$-$C_{24}$ alkyl, $C_5$-$C_{12}$ cycloalkyl, phenyl or $C_7$-$C_{15}$ phenylalkyl; or said straight or branched chain $C_1$-$C_{24}$ alkyl or $C_5$-$C_{12}$ cycloalkyl can be substituted by one or more —F, —OH, —$OR_{22}$, —$NH_2$, —$NHR_{22}$, —$N(R_{22})_2$;

said phenyl or $C_7$-$C_{15}$ phenylalkyl can also be substituted by one or more -halogen, —CN, —$CF_3$, —OH, —$OR_{22}$, —$COR_{22}$, —$R_{22}$; wherein $R_{22}$ is straight or branched chain $C_1$-$C_{18}$ alkyl, straight or branched chain $C_2$-$C_{18}$ alkenyl, $C_5$-$C_{10}$ cycloalkyl, $C_6$-$C_{16}$ phenyl or naphthyl, $C_7$-$C_{15}$ phenylalkyl; or $E_1$ is a group

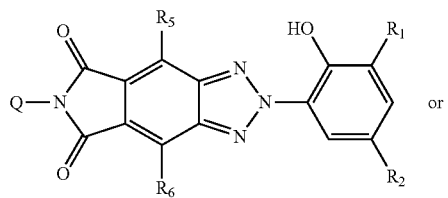

-continued

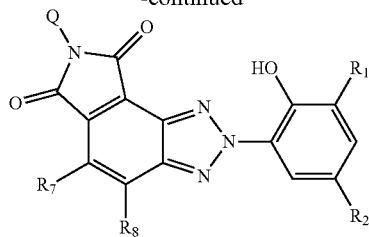

wherein
R₁ to R₈ have the meanings as defined above and
Q is $C_2$-$C_{12}$ alkylene, $C_5$-$C_7$ cycloalkylene, para-phenylene or a group

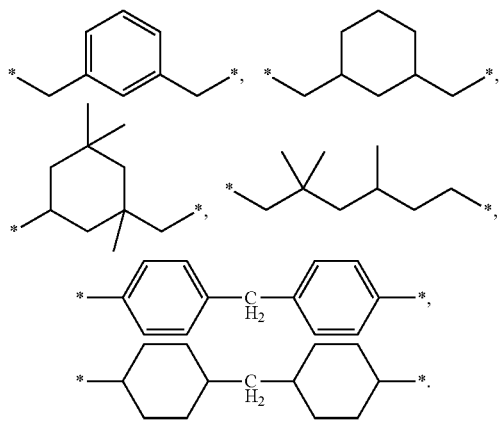

4. A composition according to claim 1 where in the compounds of formula (I) or (II),
  R₁ is hydrogen, straight or branched chain alkyl of 1 to 12 carbon atoms or phenylalkyl of 7 to 15 carbon atoms;
  R₂ is straight or branched chain alkyl of 1 to 12 carbon atoms or phenylalkyl of 7 to 15 carbon atoms, phenyl, or said phenyl or said phenylalkyl substituted on the phenyl ring by 1 to 3 alkyl of 1 to 4 carbon atoms;
  R₅ and R₆ are hydrogen or one of both is Cl or Br;
  R₇ and R₈ are independently hydrogen, Cl or Br;
  X is O or NE₁ wherein
  E₁ is hydrogen, straight or branched chain $C_1$-$C_6$ alkyl, which is unsubstituted or substituted by 1 to 4 OH, phenyl which is unsubstituted or substituted by F, CF₃, CN or Cl, or $C_7$-$C_9$phenylalkyl.

5. A composition according to claim 4 where the red-shifted hydroxyphenylbenzotriazoles are of formula (I).

6. A composition according to claim 1 where the red-shifted hydroxyphenylbenzotriazole is selected from the group consisting of UVA1-UVA12

UVA1
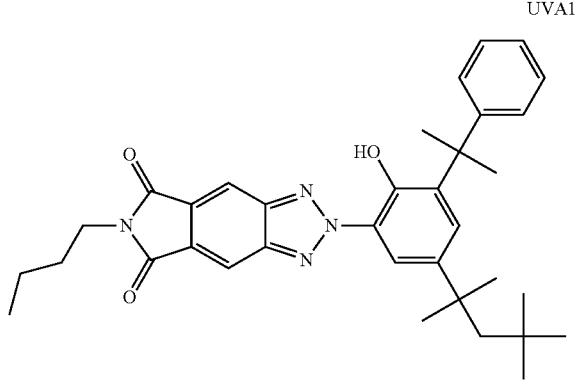

UVA2
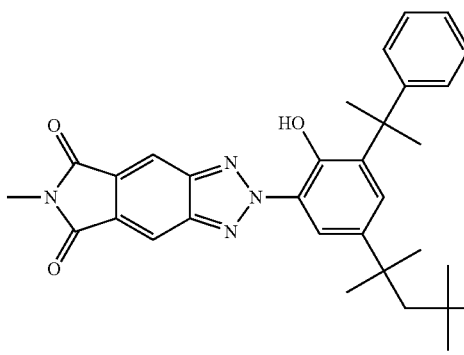

UVA3
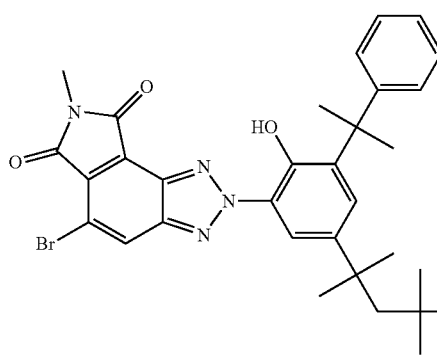

UVA4
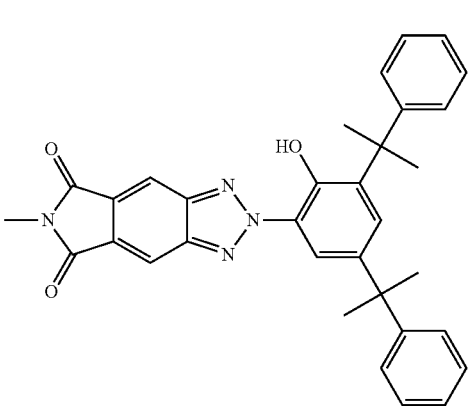

UVA5
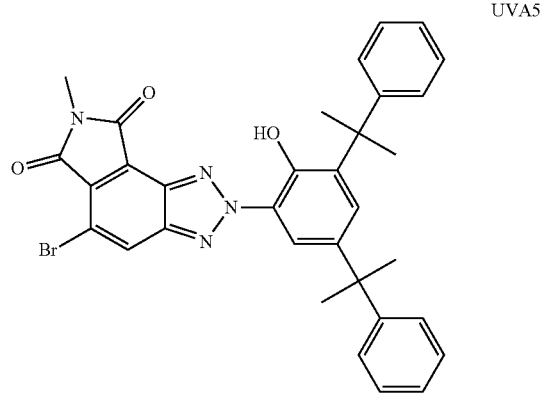

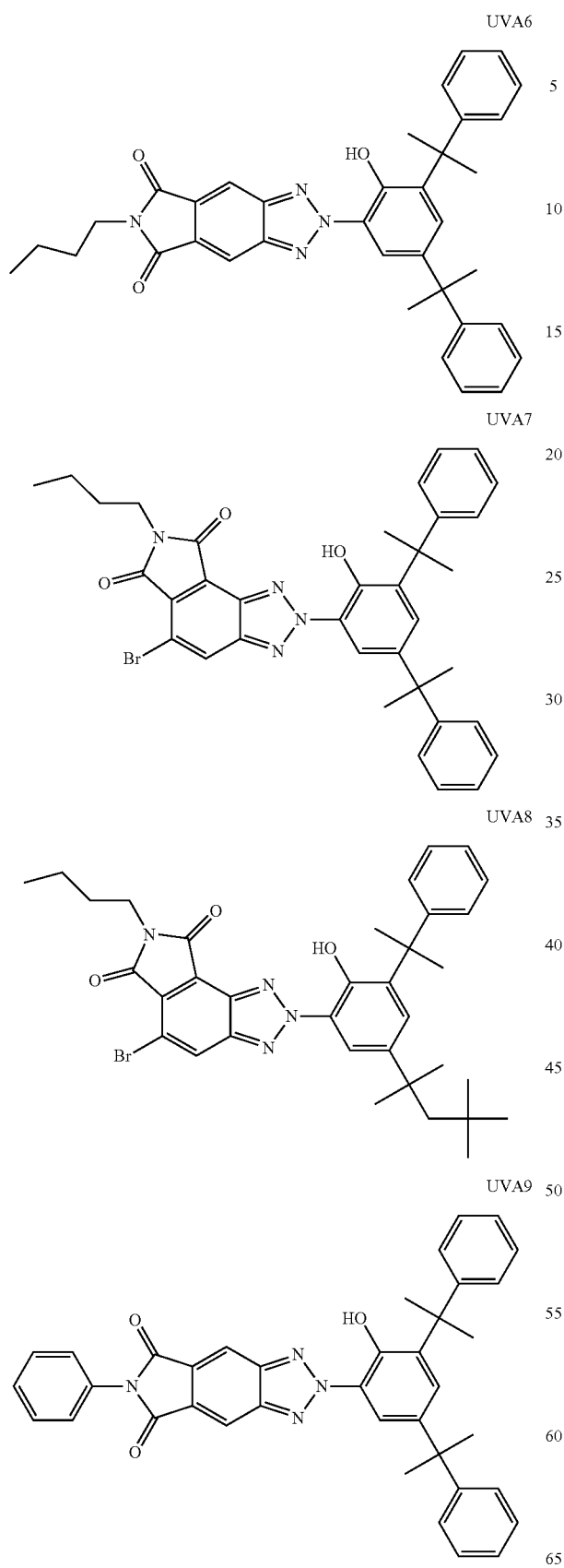
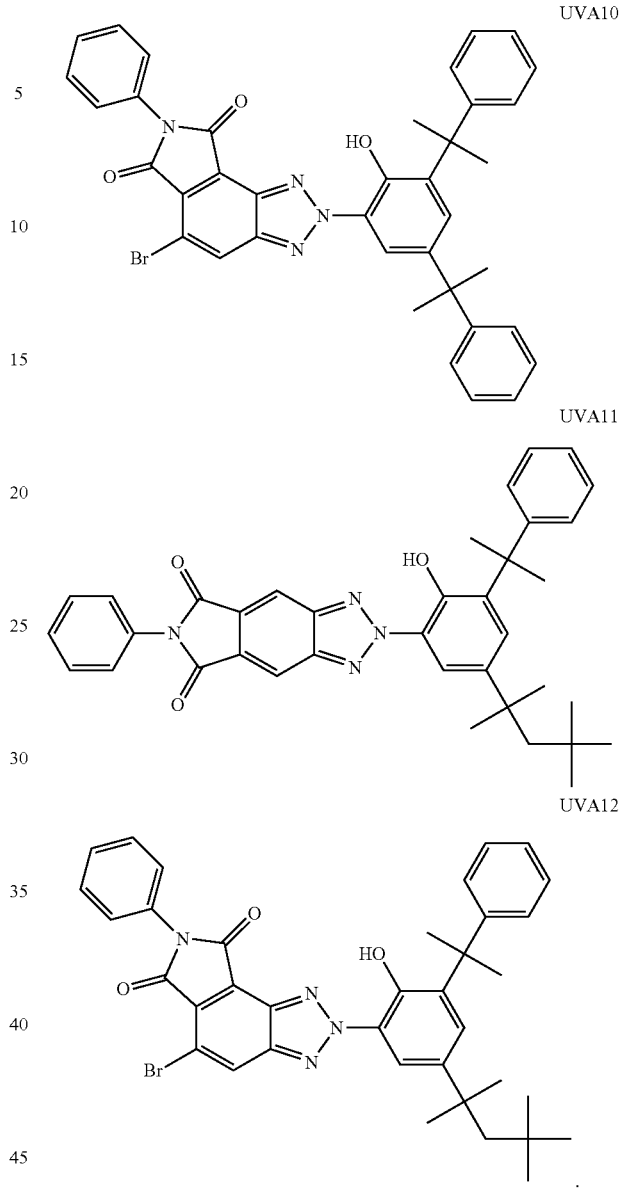

7. A composition according to claim 1 where the powder coating resin is selected from the group consisting of epoxy resins, polyester resins, polyurethane resins, epoxy/polyester hybrid resins, acrylic resins, polysiloxane resins and acrylate resins.

8. A composition according to claim 1 where the hindered amine light stabilizers are selected from the group consisting of
   (1) 1-cyclohexyloxy-2,2,6,6-tetramethyl-4-octadecylaminopiperidine,
   (2) bis(2,2,6,6-tetramethylpiperidin-4-yl)sebacate,
   (3) bis(1-acetoxy-2,2,6,6-tetramethylpiperidin-4-yl)sebacate,
   (4) bis(1,2,2,6,6-pentamethyl-4-yl)sebacate,
   (5) bis(1-cyclohexyloxy-2,2,6,6-tetramethylpiperidin-4-yl)sebacate,
   (6) bis(1-octyloxy-2,2,6,6-tetramethylpiperidin-4-yl)sebacate,
   (7) bis(1-acyl-2,2,6,6-tetramethylpiperidin-4-yl)sebacate, (8) bis(1,2,2,6,6-pentamethyl-4-piperidyl)n-butyl-3,5-di-tert-butyl-4-hydroxybenzylmalonate,
(9) 2,4-bis[(1-cyclohexyloxy-2,2,6,6-tetramethylpiperidin-4-yl)butylamino]-6-(2-hydroxyethyl-amino-s-triazine,
(10) bis(1-cyclohexyloxy-2,2,6,6-tetramethylpiperidin-4-yl)adipate,
(11) bis(2,4-bis[(1-cyclohexyloxy-2,2,6,6-piperidin-4-yl)butylamino]-6-chloro-s-triazine,
(12) 1-(2-hydroxy-2-methylpropoxy)-4-hydroxy-2,2,6,6-tetramethylpiperidine,
(13) 1-(2-hydroxy-2-methylpropoxy)-4-oxo-2,2,6,6-tetramethylpiperidine,
(14) 1-(2-hydroxy-2-methylpropoxy)-4-octadecanoyloxy-2,2,6,6-tetramethylpiperidine,
(15) bis(1-(2-hydroxy-2-methylpropoxy)-2,2,6,6-tetramethylpiperidin-4-yl)sebacate,
(16) bis(1-(2-hydroxy-2-methylpropoxy)-2,2,6,6-tetramethylpiperidin-4-yl)adipate,
(17) 2,4-bis{N-[1-(2-hydroxy-2-methylpropoxy)-2,2,6,6-tetramethylpiperidin-4-yl]-N-butyl-amino}-6-(2-hydroxyethylamino)-s-triazine,
(18) 4-benzoyl-2,2,6,6-tetramethylpiperidine,
(19) di-(1,2,2,6,6-pentamethylpiperidin-4-yl)p-methoxybenzylidenemalonate,
(20) 4-stearyloxy-2,2,6,6-tetramethylpiperidine,
(21) bis(1-octyloxy-2,2,6,6-tetramethylpiperidyl)succinate,
(22) 1,2,2,6,6-pentamethyl-4-aminopiperidine,
(23) 2-undecyl-7,7,9,9-tetramethyl-1-oxa-3,8-diaza-4-oxo-spiro[4,5]decane,
(24) tris(2,2,6,6-tetramethyl-4-piperidyl)nitrilotriacetate,
(25) tris(2-hydroxy-3-(amino-(2,2,6,6-tetramethylpiperidin-4-yl)propyl)nitrilotriacetate,
(26) tetrakis(2,2,6,6-tetramethyl-4-piperidyl)-1,2,3,4-butane-tetracarboxylate,
(27) tetrakis(1,2,2,6,6-pentamethyl-4-piperidyl)-1,2,3,4-butane-tetracarboxylate,
(28) 1,1'-(1,2-ethanediyl)-bis(3,3,5,5-tetramethylpiperazinone),
(29) 3-n-octyl-7,7,9,9-tetramethyl-1,3,8-triazaspiro[4.5]decan-2,4-dione,
(30) 8-acetyl-3-dodecyl-7,7,9,9-tetramethyl-1,3,8-triazaspiro[4.5]decane-2,4-dione,
(31) 3-dodecyl-1-(2,2,6,6-tetramethyl-4-piperidyl)pyrrolidin-2,5-dione,
(32) 3-dodecyl-1-(1,2,2,6,6-pentamethyl-4-piperidyl)pyrrolidine-2,5-dione,
(33) N,N'-bis-formyl-N,N'-bis(2,2,6,6-tetramethyl-4-piperidyl)hexamethylenediamine,
(34) the reaction product of 2,4-bis[(1-cyclohexyloxy-2,2,6,6-piperidin-4-yl)butylamino]-6-chloro-s-triazine with N,N'-bis(3-aminopropyl)ethylenediamine),
(35) the condensate of 1-(2-hydroxyethyl)-2,2,6,6-tetramethyl-4-hydroxypiperidine and succinic acid,
(36) linear or cyclic condensates of N,N'-bis-(2,2,6,6-tetramethyl-4-piperidyl)-hexamethylenediamine and 4-tert-octylamino-2,6-dichloro-1,3,5-triazine,
(37) linear or cyclic condensates of N,N'-bis-(2,2,6,6-tetramethyl-4-piperidyl)-hexamethylenediamine and 4-cyclohexylamino-2,6-dichloro-1,3,5-triazine,
(38) linear or cyclic condensates of N,N'-bis-(2,2,6,6-tetramethyl-4-piperidyl)-hexamethylenediamine and 4-morpholino-2,6-dichloro-1,3,5-triazine,
(39) linear or cyclic condensates of N,N'-bis-(1,2,2,6,6-pentamethyl-4-piperidyl)-hexamethylenediamine and 4-morpholino-2,6-dichloro-1,3,5-triazine,
(40) the condensate of 2-chloro-4,6-bis-(4-n-butylamino-2,2,6,6-tetramethylpiperidyl)-1,3,5-triazine and 1,2-bis (3-aminopropylamino)ethane,
(41) the condensate of 2-chloro-4,6-di-(4-n-butylamino-1,2,2,6,6-pentamethylpiperidyl)-1,3,5-triazine and 1,2-bis-(3-aminopropylamino)ethane,
(42) a reaction product of 7,7,9,9-tetramethyl-2-cycloundecyl-1-oxa-3,8-diaza-4-oxospiro[4,5]decane and epichlorohydrin,
(43) poly[methyl,(3-oxy-(2,2,6,6-tetramethylpiperidin-4-yl)propyl)]siloxane,
CAS#182635-99-0,
(44) reaction product of maleic acid anhydride-$C_{18}$-$C_{22}$-α-olefin-copolymer with 2,2,6,6- tetramethyl-4-aminopiperidine,
(45) the oligomeric compound which is the condensation product of 4,4'-hexamethylene-bis(amino-2,2,6,6-tetramethylpiperidine) and 2,4-dichloro-6-[(2,2,6,6-tetramethylpiperidin-4-yl)butyl-amino]-s-triazine end-capped with 2-chloro-4,6-bis(dibutylamino)-s-triazine,
(46) the oligomeric compound which is the condensation product of 4,4'-hexamethylene-bis(amino-1,2,2,6,6 pentamethylpiperidine) and 2,4-dichloro-6-((1,2,2,6,6 pentamethylpiperidin-4-yl)butylamino]-s-triazine end-capped with 2-chloro-4,6-bis(dibutylamino)-s-triazine,
(47) the oligomeric compound which is the condensation product of 4,4'-hexamethylene-bis(amino-1-propoxy-2,2,6,6-tetramethylpiperidine) and 2,4-dichloro-6-[(1-propoxy-2,2,6,6-tetramethyl-piperidin-4-yl)butylamino]-s-triazine end-capped with 2-chloro-4,6-bis(dibutylamino)-s-triazine,
(48) the oligomeric compound which is the condensation product of 4,4'-hexamethylene-bis(amino-1-acyloxy-2,2,6,6-tetramethylpiperidine) and 2,4-dichloro-6-[(1-acyloxy-2,2,6,6-tetramethylpiperidin-4-yl)butylamino]-s-triazine end-capped with 2-chloro-4,6-bis(dibutylamino)-s-triazine, and
(49) product obtained by reacting a product, obtained by reacting 1,2-bis(3-amino-propylamino)ethane with cyanuric chloride, with (2,2,6,6-tetramethylpiperidin-4-yl) butylamine.

9. A composition according to claim 1 where the powder coating formulation comprises a further ultraviolet light absorber selected from the groups consisting of other hydroxyphenylbenzotriazoles, hydroxyphenyl-s-triazines, benzophenones, esters of benzoic acids, acrylates, malonates and oxamides.

10. A composition according to claim 1 where the powder coating formulation comprises a further ultraviolet light absorber selected from the group consisting of hydroxyphenyl-s-triazines.

11. A composition according to claim 1 where the powder coating formulation comprises a phenolic antioxidant.

12. A composition according to claim 1 where the red-shifted hydroxyphenylbenzotriazoles are present from about 0.05% to about 1.0% by weight and the hindered amine light stabilizers are present from about 0.5% to about 3.0% by weight, each based on the weight of the powder coating resin solids.

13. A composition according to claim 1 where the coating layer exhibits a UV transmission of ≤0.1% at 290 nm to 360 nm, ≤0.5% at 400 nm and ≤12% at 420 nm.

14. A composition according to claim 1 where the coating layer is a tinted coating layer.

15. A composition according to claim 1 where the coating layer is a pigmented coating layer.

16. A composition according to claim 1 where the formulation comprises an effect pigment.

17. A composition according to claim 1 where the coating layer is a clear coat layer.

* * * * *